(12) United States Patent
Trottier et al.

(10) Patent No.: US 11,439,124 B2
(45) Date of Patent: Sep. 13, 2022

(54) USE OF SEMANTIC BOARDS AND SEMANTIC BUTTONS FOR TRAINING AND ASSISTING THE EXPRESSION AND UNDERSTANDING OF LANGUAGE

(71) Applicant: CLEVERPET, INC, San Diego, CA (US)

(72) Inventors: Leo Trottier, San Diego, CA (US); Jelmer Tiete, Oakland, CA (US); Gary Stephen Shuster, Vancouver (CA)

( * ) Notice: Subject to any disclaimer, the term of this patent is extended or adjusted under 35 U.S.C. 154(b) by 0 days.

(21) Appl. No.: 17/369,868

(22) Filed: Jul. 7, 2021

(65) Prior Publication Data

US 2021/0337767 A1    Nov. 4, 2021

Related U.S. Application Data

(63) Continuation of application No. PCT/US2020/064122, filed on Dec. 9, 2020.

(60) Provisional application No. 63/030,312, filed on May 27, 2020, provisional application No. 62/945,574, filed on Dec. 9, 2019.

(51) Int. Cl.
| | |
|---|---|
| G09B 1/34 | (2006.01) |
| A01K 15/02 | (2006.01) |
| G09B 21/00 | (2006.01) |
| G09B 5/04 | (2006.01) |
| A63F 3/04 | (2006.01) |
| G09B 1/36 | (2006.01) |
| G09B 5/02 | (2006.01) |
| A63F 3/00 | (2006.01) |

(52) U.S. Cl.
CPC ............ *A01K 15/021* (2013.01); *A01K 15/02* (2013.01); *A63F 3/0402* (2013.01); *A63F 3/0421* (2013.01); *G09B 1/36* (2013.01); *G09B 5/02* (2013.01); *G09B 5/04* (2013.01); *G09B 21/00* (2013.01); *A63F 2003/00482* (2013.01)

(58) Field of Classification Search
CPC ... G09B 1/00; G09B 1/02; G09B 1/04; G09B 1/16; G09B 1/32; G09B 1/325; G09B 1/34; A01K 15/02; A01K 15/021; G08B 3/00; G08B 3/10
See application file for complete search history.

(56) References Cited

U.S. PATENT DOCUMENTS

| | | | | |
|---|---|---|---|---|
| 5,823,782 | A * | 10/1998 | Marcus | G09B 7/04 434/335 |
| 7,699,693 | B2 * | 4/2010 | Schwartz | A63F 1/02 463/9 |
| 9,128,661 | B2 * | 9/2015 | Zilber | A63F 13/80 |
| 10,334,823 | B2 * | 7/2019 | Foster | A01K 15/021 |
| 10,607,502 | B2 * | 3/2020 | Butler | G09B 17/006 |
| 10,847,045 | B2 * | 11/2020 | Ross | G09B 1/06 |
| 2009/0051548 | A1 * | 2/2009 | Dundon | A01K 1/035 340/573.3 |

(Continued)

*Primary Examiner* — Kurt Fernstrom
(74) *Attorney, Agent, or Firm* — Coleman & Horowitt, LLP; Sherrie M. Flynn

(57) ABSTRACT

Devices for providing language-like abilities for dogs. Using polygonal layouts, audible, scent, visible and other cues, the devices provide an efficient and novel ability to communicate with dogs in a granular manner. Devices for capturing and releasing scents are provided. Novel button designs and functions are taught with particular suitability for animal training.

24 Claims, 33 Drawing Sheets

(56) References Cited

U.S. PATENT DOCUMENTS

2012/0312247 A1\* 12/2012 Ebersole ............... A01K 15/02
　　　　　　　　　　　　　　　　　　　340/573.3
2015/0133023 A1\* 5/2015 Lewis .................... A63H 33/26
　　　　　　　　　　　　　　　　　　　446/91

\* cited by examiner

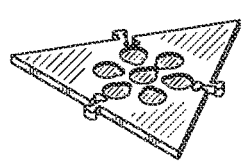 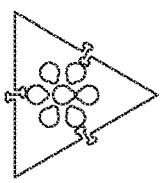 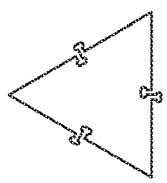 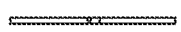
FIG. 15A    FIG. 15B    FIG. 15C    FIG. 15D
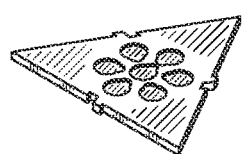 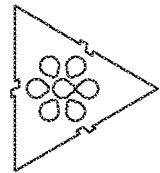 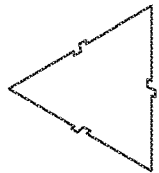 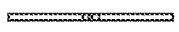
FIG. 16A    FIG. 16B    FIG. 16C    FIG. 16D
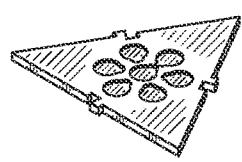 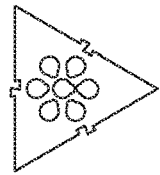 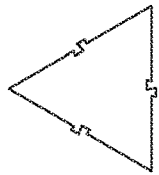 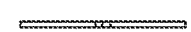
FIG. 17A    FIG. 17B    FIG. 17C    FIG. 17D
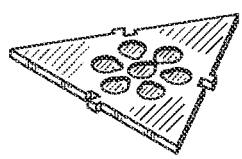 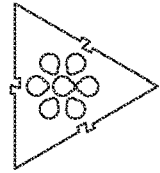 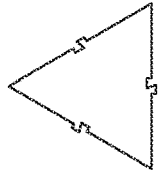 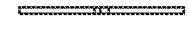
FIG. 18A    FIG. 18B    FIG. 18C    FIG. 18D
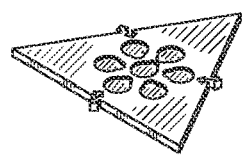 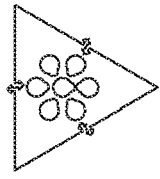 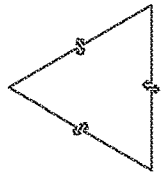 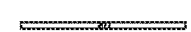
FIG. 19A    FIG. 19B    FIG. 19C    FIG. 19D
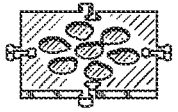 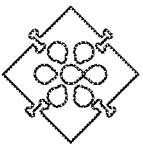 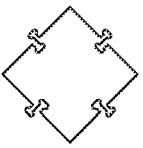 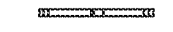
FIG. 20A    FIG. 20B    FIG. 20C    FIG. 20D
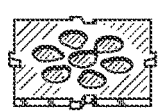 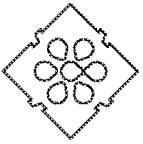 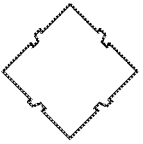 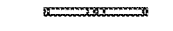
FIG. 21A    FIG. 21B    FIG. 21C    FIG. 21D

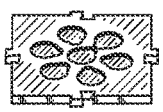 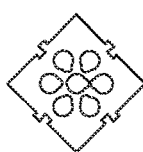 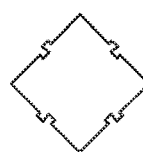 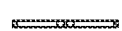
FIG. 22A  FIG. 22B  FIG. 22C  FIG. 22D
 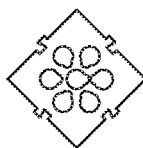 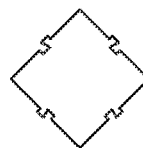 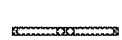
FIG. 23A  FIG. 23B  FIG. 23C  FIG. 23D
 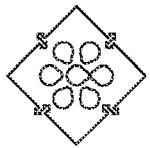 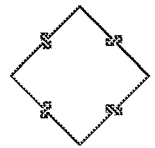 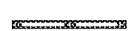
FIG. 24A  FIG. 24B  FIG. 24C  FIG. 24D
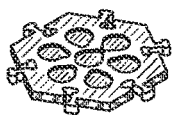 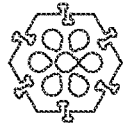 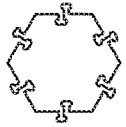 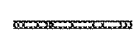
FIG. 25A  FIG. 25B  FIG. 25C  FIG. 25D
 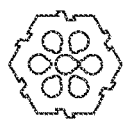 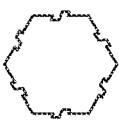 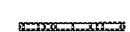
FIG. 26A  FIG. 26B  FIG. 26C  FIG. 26D
 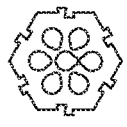 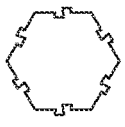 
FIG. 27A  FIG. 27B  FIG. 27C  FIG. 27D
 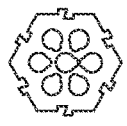 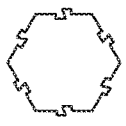 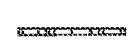
FIG. 28A  FIG. 28B  FIG. 28C  FIG. 28D

 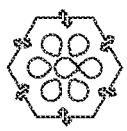 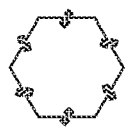 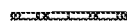
FIG. 29A        FIG. 29B        FIG. 29C        FIG. 29D
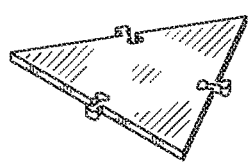 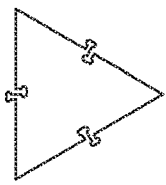 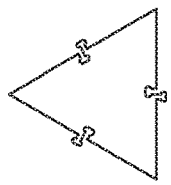 
FIG. 30A        FIG. 30B        FIG. 30C        FIG. 30D
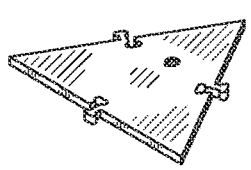 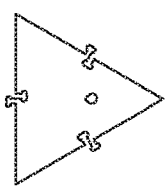 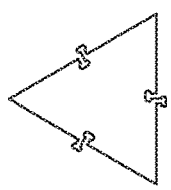 
FIG. 31A        FIG. 31B        FIG. 31C        FIG. 31D
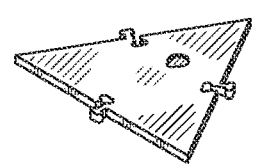 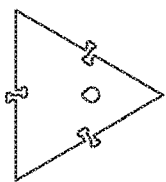 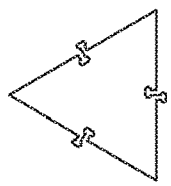 
FIG. 32A        FIG. 32B        FIG. 32C        FIG. 32D
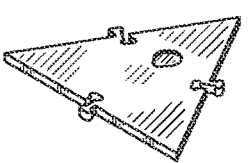 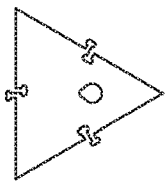 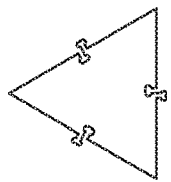 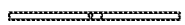
FIG. 33A        FIG. 33B        FIG. 33C        FIG. 33D
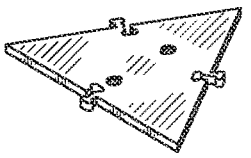 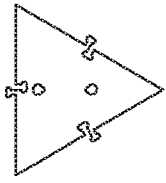 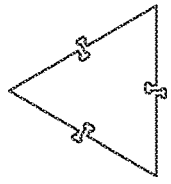 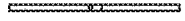
FIG. 34A        FIG. 34B        FIG. 34C        FIG. 34D
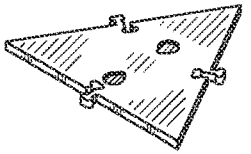 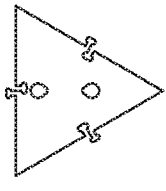 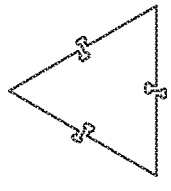 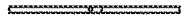
FIG. 35A        FIG. 35B        FIG. 35C        FIG. 35D

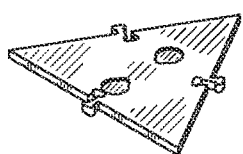 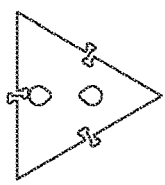 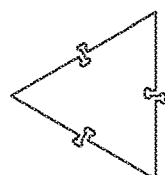 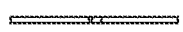
FIG. 36A  FIG. 36B  FIG. 36C  FIG. 36D
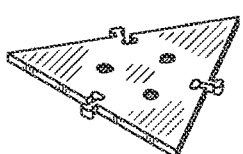 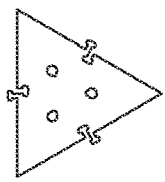 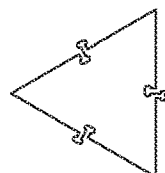 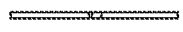
FIG. 37A  FIG. 37B  FIG. 37C  FIG. 37D
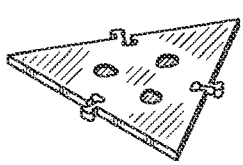 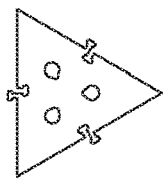 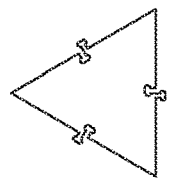 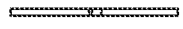
FIG. 38A  FIG. 38B  FIG. 38C  FIG. 38D
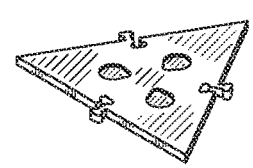 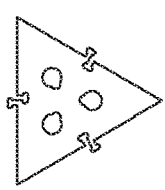 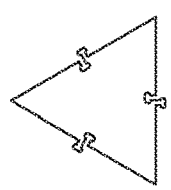 
FIG. 39A  FIG. 39B  FIG. 39C  FIG. 39D
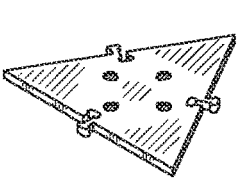 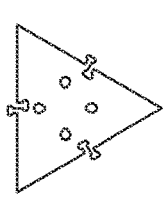 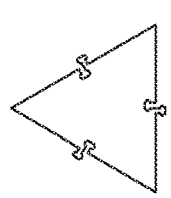 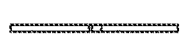
FIG. 40A  FIG. 40B  FIG. 40C  FIG. 40D
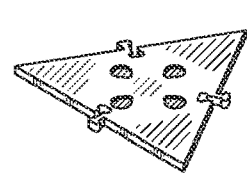 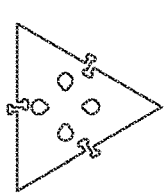 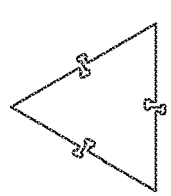 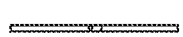
FIG. 41A  FIG. 41B  FIG. 41C  FIG. 41D
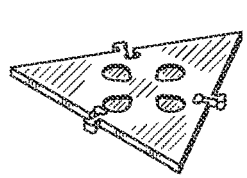 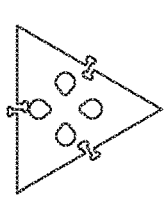 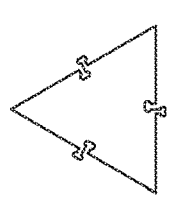 
FIG. 42A  FIG. 42B  FIG. 42C  FIG. 42D

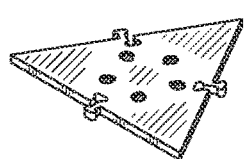 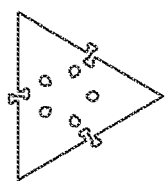 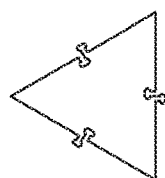 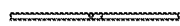
FIG. 43A        FIG. 43B        FIG. 43C        FIG. 43D
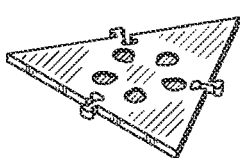 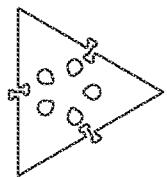 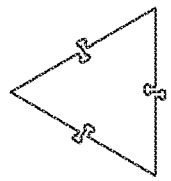 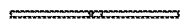
FIG. 44A        FIG. 44B        FIG. 44C        FIG. 44D
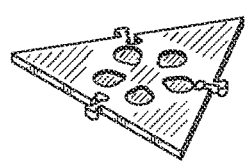 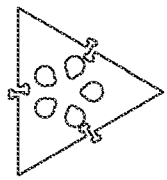 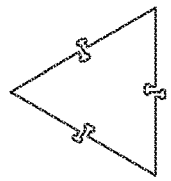 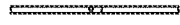
FIG. 45A        FIG. 45B        FIG. 45C        FIG. 45D
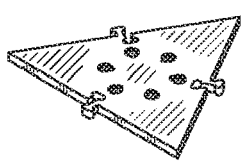 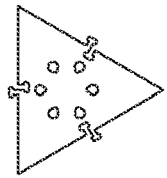 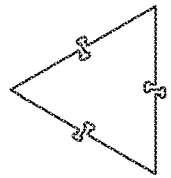 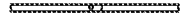
FIG. 46A        FIG. 46B        FIG. 46C        FIG. 46D
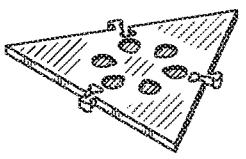 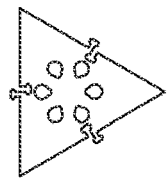 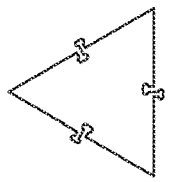 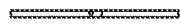
FIG. 47A        FIG. 47B        FIG. 47C        FIG. 47D
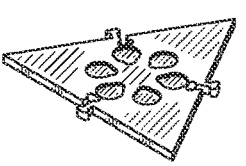 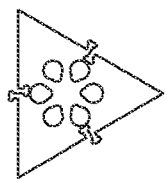 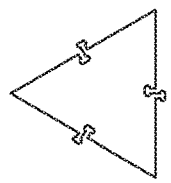 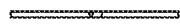
FIG. 48A        FIG. 48B        FIG. 48C        FIG. 48D
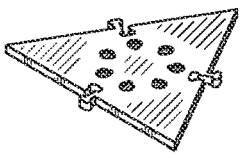 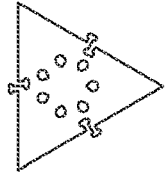 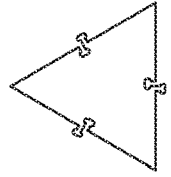 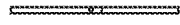
FIG. 49A        FIG. 49B        FIG. 49C        FIG. 49D

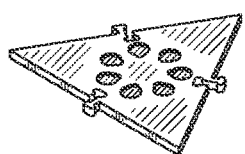 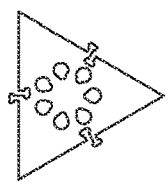 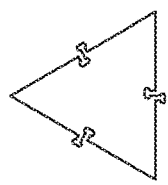 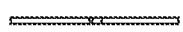
FIG. 50A  FIG. 50B  FIG. 50C  FIG. 50D
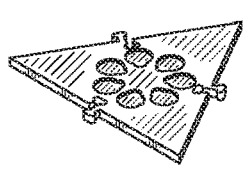 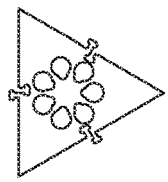 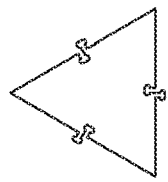 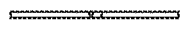
FIG. 51A  FIG. 51B  FIG. 51C  FIG. 51D
 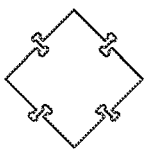 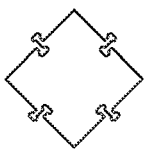 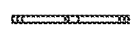
FIG. 52A  FIG. 52B  FIG. 52C  FIG. 52D
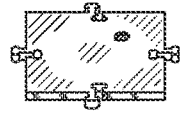 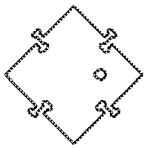 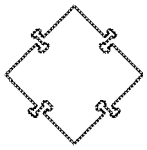 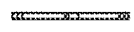
FIG. 53A  FIG. 53B  FIG. 53C  FIG. 53D
 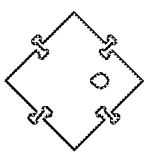 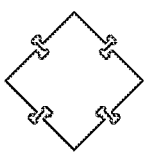 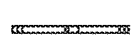
FIG. 54A  FIG. 54B  FIG. 54C  FIG. 54D
 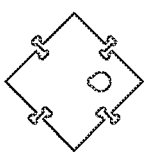 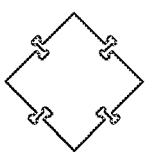 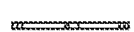
FIG. 55A  FIG. 55B  FIG. 55C  FIG. 55D
 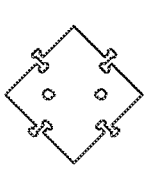 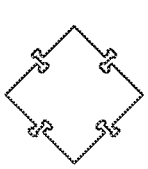 
FIG. 56A  FIG. 56B  FIG. 56C  FIG. 56D

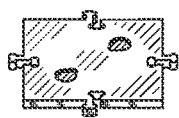 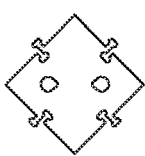 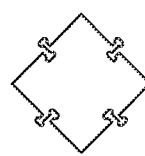 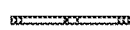
FIG. 57A     FIG. 57B     FIG. 57C     FIG. 57D
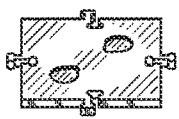 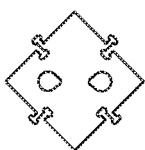 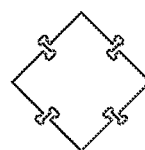 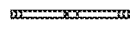
FIG. 58A     FIG. 58B     FIG. 58C     FIG. 58D
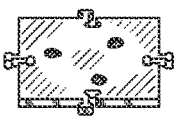 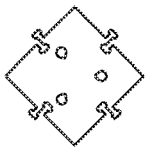 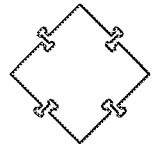 
FIG. 59A     FIG. 59B     FIG. 59C     FIG. 59D
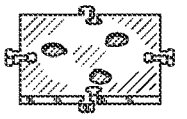 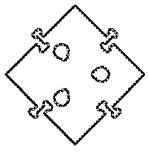 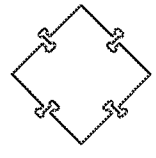 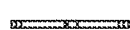
FIG. 60A     FIG. 60B     FIG. 60C     FIG. 60D
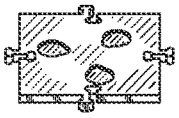 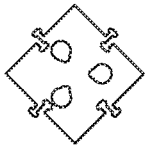 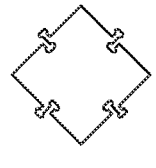 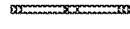
FIG. 61A     FIG. 61B     FIG. 61C     FIG. 61D
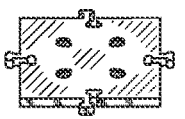 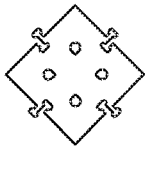 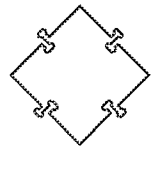 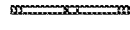
FIG. 62A     FIG. 62B     FIG. 62C     FIG. 62D
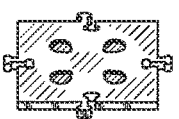 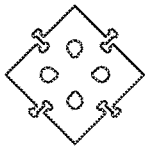 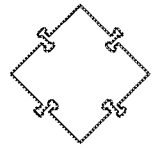 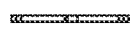
FIG. 63A     FIG. 63B     FIG. 63C     FIG. 63D

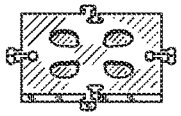 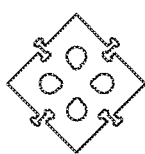 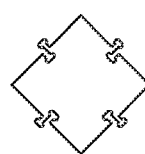 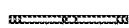
FIG. 64A  FIG. 64B  FIG. 64C  FIG. 64D
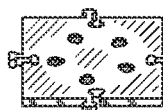 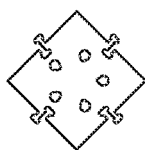 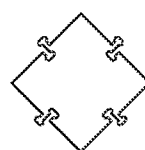 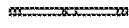
FIG. 65A  FIG. 65B  FIG. 65C  FIG. 65D
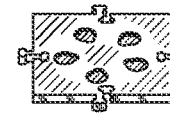 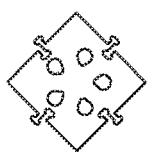 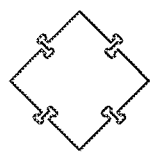 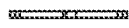
FIG. 66A  FIG. 66B  FIG. 66C  FIG. 66D
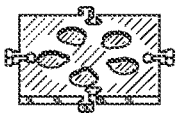 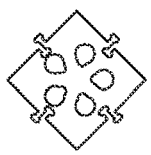 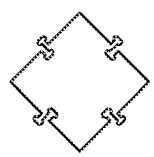 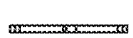
FIG. 67A  FIG. 67B  FIG. 67C  FIG. 67D
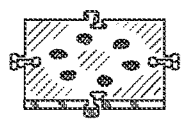 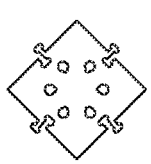 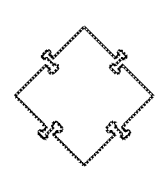 
FIG. 68A  FIG. 68B  FIG. 68C  FIG. 68D
 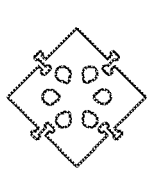 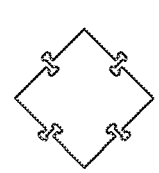 
FIG. 69A  FIG. 69B  FIG. 69C  FIG. 69D
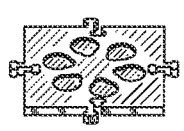 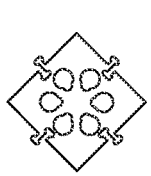 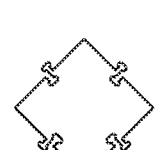 
FIG. 70A  FIG. 70B  FIG. 70C  FIG. 70D

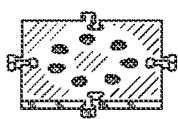 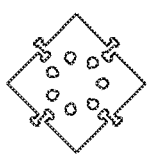 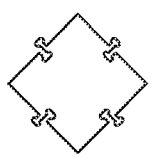 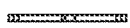
FIG. 71A  FIG. 71B  FIG. 71C  FIG. 71D
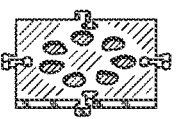 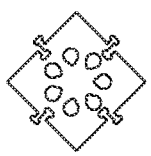 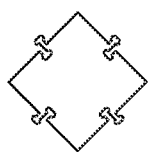 
FIG. 72A  FIG. 72B  FIG. 72C  FIG. 72D
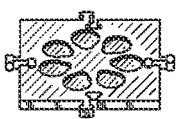 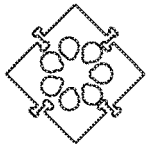 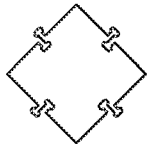 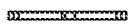
FIG. 73A  FIG. 73B  FIG. 73C  FIG. 73D
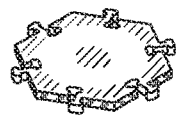 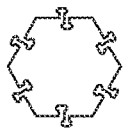 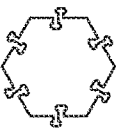 
FIG. 74A  FIG. 74B  FIG. 74C  FIG. 74D
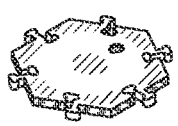 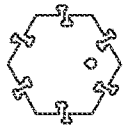 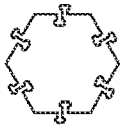 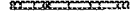
FIG. 75A  FIG. 75B  FIG. 75C  FIG. 75D
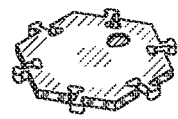 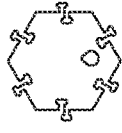 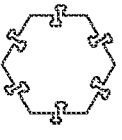 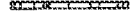
FIG. 76A  FIG. 76B  FIG. 76C  FIG. 76D
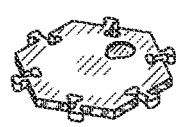 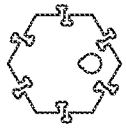 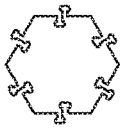 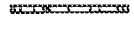
FIG. 77A  FIG. 77B  FIG. 77C  FIG. 77D

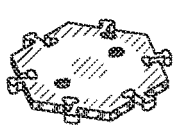 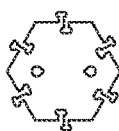 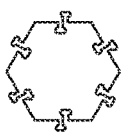
FIG. 78A  FIG. 78B  FIG. 78C  FIG. 78D
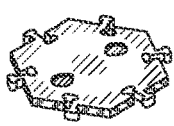 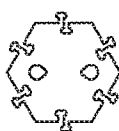 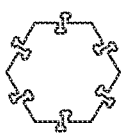
FIG. 79A  FIG. 79B  FIG. 79C  FIG. 79D
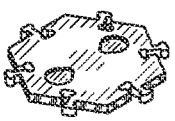  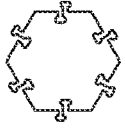
FIG. 80A  FIG. 80B  FIG. 80C  FIG. 80D
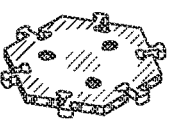 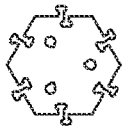 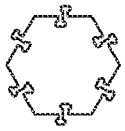
FIG. 81A  FIG. 81B  FIG. 81C  FIG. 81D
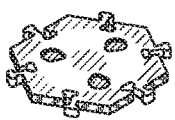 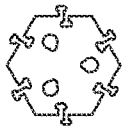 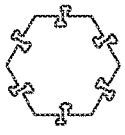
FIG. 82A  FIG. 82B  FIG. 82C  FIG. 82D
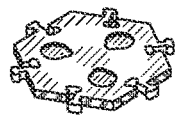 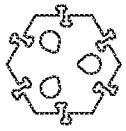 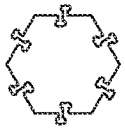
FIG. 83A  FIG. 83B  FIG. 83C  FIG. 83D
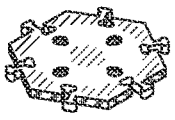 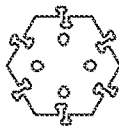 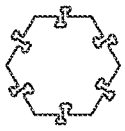
FIG. 84A  FIG. 84B  FIG. 84C  FIG. 84D

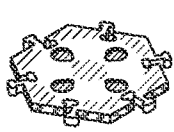 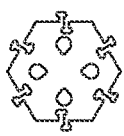 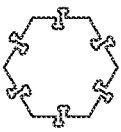 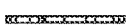
FIG. 85A  FIG. 85B  FIG. 85C  FIG. 85D
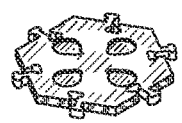 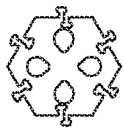 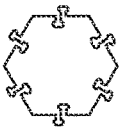 
FIG. 86A  FIG. 86B  FIG. 86C  FIG. 86D
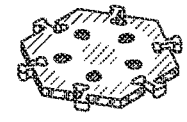 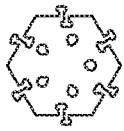 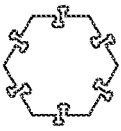 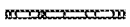
FIG. 87A  FIG. 87B  FIG. 87C  FIG. 87D
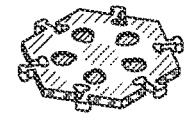 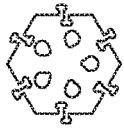 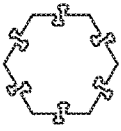 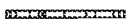
FIG. 88A  FIG. 88B  FIG. 88C  FIG. 88D
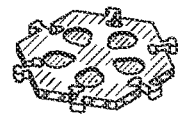 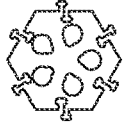 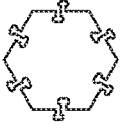 
FIG. 89A  FIG. 89B  FIG. 89C  FIG. 89D
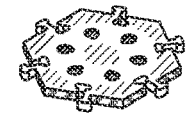 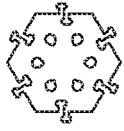 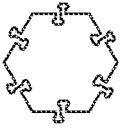 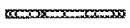
FIG. 90A  FIG. 90B  FIG. 90C  FIG. 90D
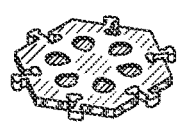 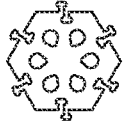 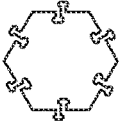 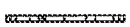
FIG. 91A  FIG. 91B  FIG. 91C  FIG. 91D

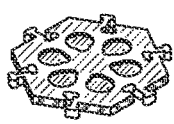 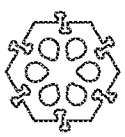 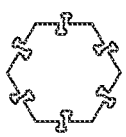 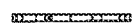
FIG. 92A     FIG. 92B     FIG. 92C     FIG. 92D
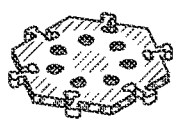 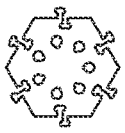 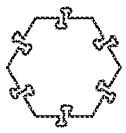 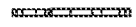
FIG. 93A     FIG. 93B     FIG. 93C     FIG. 93D
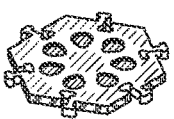 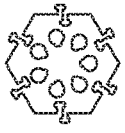 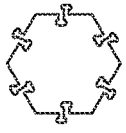 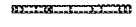
FIG. 94A     FIG. 94B     FIG. 94C     FIG. 94D
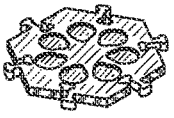 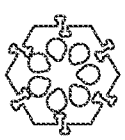 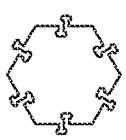 
FIG. 95A     FIG. 95B     FIG. 95C     FIG. 95D
 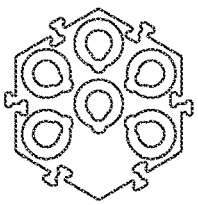 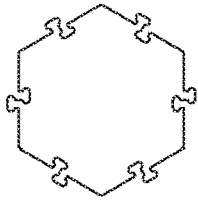
FIG. 96A     FIG. 96B     FIG. 96C     FIG. 96D
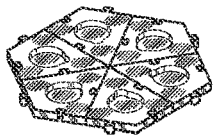 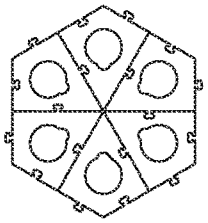 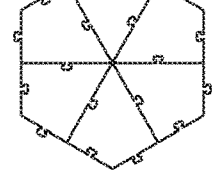
FIG. 97A     FIG. 97B     FIG. 97C     FIG. 97D
 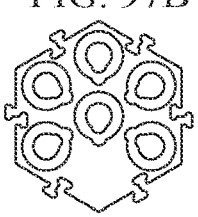 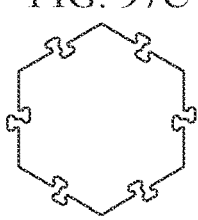
FIG. 98A     FIG. 98B     FIG. 98C     FIG. 98D

USE OF SEMANTIC BOARDS AND SEMANTIC BUTTONS FOR TRAINING AND ASSISTING THE EXPRESSION AND UNDERSTANDING OF LANGUAGE

CROSS-REFERENCE TO RELATED APPLICATIONS

This application claims priority to and is a continuation application of PCT/US202/064122 filed Dec. 9, 2020, which claims priority pursuant to 35 U.S.C. § 119(e) to U.S. Provisional Application Ser. No. 62/945,574 filed on Dec. 9, 2019, and U.S. Provisional Application Ser. No. 63/030,312 filed on May 27, 2020, which are incorporated herein, in their entireties, by reference.

FIELD OF THE INVENTION

The present disclosure relates to the design of devices, systems, and methods to facilitate the development of animal communication.

INTRODUCTION

It has been shown that dogs can use buttons that produce the sound of words in order to express themselves, including to humans. At present, spatial arrangement of these buttons for use by dogs is almost entirely arbitrary as perceived by humans, and likely arbitrary as perceived by dogs, as is demonstrated by videos showing dozens of individuals using button grids with different, and often haphazard, layouts. Moreover, the buttons themselves are hard for language learners to identify the meaning of, as they are not distinct from each other in a manner perceptible and/or appreciated by a dog. We note that while we use the term "dog" herein, unless the context clearly requires otherwise, that term should be understood to include other trainable animals (e.g., cats, rabbits, ferrets, pigs, etc.). In many cases, very young children and humans with communication disorders or limitations may also be included in the term.

Research in word and concept relationships includes the work of researchers in speech language pathology to organize words using constructs such as the "Fitzgerald Key" (see FIG. 5A & FIG. 5B) or concepts from speech language pathology. In addition, caretakers of individuals with special needs may desire to use actual physical instantiations of objects to make it easier for learners to identify the objects that they represent.

The combination of neuroscientific and cognitive scientific design principles with physical hardware design principles in a set of extensible devices represents a substantial and novel departure from any techniques previously known. From a learning perspective, the polygonal grid design simultaneously provides local cues to learners regarding word meaning while also implying semantic vectors that suggest methods by which word meanings can be elaborated, all in the context of a low-cost, easy to configure and use, and durable design.

As a preliminary matter, we teach the inventions herein in a manner easily accessible to those skilled in the art. To make the teachings herein more accessible, we do not sharply distinguish between a discussion of the background of the field and discussing the instant inventions. Accordingly, while we discuss background material outside of the summary and detailed description of invention sections, we may also discuss novel, non-obvious and useful inventions outside of those sections, such as in the introduction or the background section. Inclusion of matter within a given section is not an acknowledgement that the matter is prior art, and should not be so construed. Put another way, much of the material throughout the document is intended to provide a general overview of material that might help to teach those skilled in the art how to implement the inventions. No admission or acknowledgement regarding whether any of the material discussed in these sections is prior art is intended, nor should one be inferred.

BACKGROUND

Dogs are thought to have developed their relationship with humans approximately 14,000 to 30,000 years ago. It is not yet certain how they came to develop their symbiotic relationship, but a current popular hypothesis is that dogs "self-domesticated" by spending time eating scraps, garbage, and carcasses discarded by humans. Humans would have quickly killed aggressive dogs, while the nicer and most useful (or those with traits such as large eyes that are associated with human caring) would have managed to successfully win over human hearts, perhaps first acting as a kind of warning system. Since then, of course, dogs' roles in human life have significantly expanded to the point where many now regard dogs as "part of the family."

Just several hundreds of years ago, it was common for women to have children while teenagers. In the past several centuries, nearly all women who bore children would have had children not later than their early or mid-20's. However, today, as people postpone marriage and child-rearing, the urge many individuals and couples experience to have something to care for is not being met. Instead of babies, many are turning to pets, and in particular dogs. The "cuteness" babies exhibit, and humans perceive, is an evolutionary adaptation that compels human care-giving, and it is very likely this same trait that dogs (especially puppies and kittens) exploit. As proto-babies, then, dogs elicit from their care-givers many of the same caring behaviors. In particular, one care-giver impulse is the normally-frustrated desire for higher bandwidth communication. The need for better understanding and to "get inside their head." This is evidenced in part by the frequent use of high-pitched "baby talk" in speaking with dogs. "Baby talk", also known as infant-directed speech, and formerly called "motherese," is a form of speech production that has been found to speed language learning through the use of phonetic and intonational exaggeration.

The utility of dogs in improving the mental health of those in isolation, such as prisoners or hospital patients, has long been a subject of research. However, the COVID-19 pandemic and associated restrictions has underscored the critical role that dogs play in assisting those in isolation—or even those simply living alone. In recognition of the importance of pets to human happiness and mental health, some jurisdictions, such as Vancouver, Canada, have adopted motions supporting a public policy prohibiting "no pets" clauses in leases. As pets come to play a more central and crucial role in human wellbeing and mental health, it is critical that interspecies communication modalities be developed exceeding what is made possible by existing technology.

Dogs, for their part, are famously social animals who hunt, travel, and live in packs. A successful pack thus requires some amount of communication among its members, and since packs are social constructs, and/or to the extent they are hierarchical, an understanding of social situations is highly evolutionarily adaptive to the pack's members. This understanding of the organization of groups of individuals is likely what led to dogs becoming useful as aids to human shepherds. After humans and dogs began to co-evolve, dogs gradually became bred for their ability to herd and protect, as well as how to learn and follow commands. The extent of differences in dog morphology (size and shape) is a testament to the speed and productivity of selective breeding for physical attributes—it stands to reason that similar magnitude effects would have found themselves manifested in the evolution of the dog's cognitive and behavioral attributes.

Most dogs today exist as pets and act as human companions. Indeed, most households regard dogs as "members of the family". As family members, and as "proto-babies" partaking in many family activities, many households have a keen interest in having better communication with their dog. Currently, this need is only partially met through the hiring of dog trainers and through learning of dog training techniques. Such training techniques are widely considered varieties of learning/training by classical and operant conditioning. In the case of classical conditioning, learning is a kind of prediction: a bell's ring is associated with food for a dog, and food is associated with mucus production in that dog, and thus a bell's ringing can "cause" mucus production in the same dog. In the case of operant conditioning, a dog performs a behavior and receives either positive or negative feedback for having done so, causing a corresponding increase or decrease in the future performance of the behavior.

Of course, most dog behaviors are not a direct result of deliberate classical or operant conditioning. Stories abound of dogs learning words and social conventions within the home entirely incidentally, absent any intentional training. Like all animals, dogs are sensitive to the rich environmental context of their behaviors and the environmental consequences of their behaviors. As such, they can learn novel and clever behaviors in the absence of a punishment or a food reward, be it repeatedly tossing a ball down a set of stairs, lifting a latch to escape from a cage, or coming to the aid of a person in distress.

Were humans exclusively trained through direct operant conditioning, it is unlikely that I would be able to write this sentence. There are relatively few "human obedience schools" because the existence of language has enabled the kind of rich communication that both obviates and provides alternatives to the kinds of acting out that infants might perform. Both unhappy dogs and infants will act out to get attention, the unwanted behavior often persisting until attention is gotten, or the problem has resolved.

Thus, providing dogs with the ability to understand and express words is likely to have benefits not just of novelty, but also to the wellbeing of dogs and people alike. The trust that higher bandwidth communication engenders is a universal factor in preventing unwanted behavior. Individuals in richer communication with each other are better able to predict each other's reaction, which serves to both prevent unwanted behaviors and help select more prosocial ones. For instance, dogs able to express that they need to urinate are much less likely to do so in a location where they're not allowed to, like indoors. One particular need is disambiguation of meaning. Without a common language, such as that proposed by embodiments of the inventions herein, a dog may develop a signaling system that presents as ambiguous for humans. In a simple example, a dog may sit at the feet of a human and stare when the dog is hungry and when the dog needs to be walked.

Taking another example, dogs bark for a variety of reasons. Excitement, a call for attention, food-seeking, boredom, fear, anxiety, territoriality, pain, surprise, reaction to unexpected stimuli, dementia, warning and other reasons can cause a dog to bark. Although the dog's body language and the characteristics of the bark sound may provide a clue as to the reason for the bark, it is frustrating for humans— and likely for dogs—that humans normally do not understand which of these reasons has triggered the barking. Indeed, it is likely that communications between dogs are supplemented by signals that humans do not perceive. For example, a dog's superior senses of hearing and smell may provide the context for other dogs to determine whether another dog's bark is in response to a distant, quiet barking sound or in response to the nearby presence of an unknown human as indicated in part by the presence of the scent of that human.

By allowing dogs to be more precise and/or specific in their communication, the bark may be characterized by the dog. For example, a bark accompanied by a button press for "play" may indicate boredom; accompanied by "danger" may mean warning; accompanied by "treat" may mean hunger, etc. In one aspect, a bark may be detected by an audio detection device operably coupled to a network that is also operatively coupled to at least one button. Certain combinations—such as a bark combined with "warning"— may trigger a signal to a device capable of communicating to a human, such as a portable phone. In some cases it may be that the availability of the button may mean a loud and disruptive bark may no longer be required.

As a consequence of these benefits, the market for a device, system, and method for rich communication with dogs is likely of value in nearly every household (or business, community or similar construct) that has a dog. If puppies can be taught to understand and express their needs, wants, feelings, and thoughts, and this leads to richer interactions with other species, the impact will be hard to overstate. Advanced communication with dogs will improve and enable better participation of working dogs in the economy, enabling them to be trained more quickly and perform their tasks more precisely. For example, dogs already make excellent aids in a security context, in helping with patrols. With rudimentary language abilities, dogs could potentially even replace humans in this role—or at least operate with a higher ratio of dogs to human handlers. They will also be in a better position to entertain themselves when left by themselves at home, enabling them to be more independent and less anxious in this context. Just as a dog might play with a ball even though there is nobody present to throw it, so too might the dog play with language as expressed via the inventions. They will also be able to provide richer and more meaningful companionship to billions of people entering old-age, potentially helping alleviate the current crisis of loneliness, and perhaps even to transform old-age facilities as they're currently understood.

Protection and service dogs cost tens of thousands of dollars to train: word-based communication, however, would potentially mean a significant reduction in training time and thus, potentially, costs. Since we know dogs can detect such things as the early signs of cancer, Parkinson's, Alzheimer's, and seizures, word-based communication could result in major medical advances. Similarly, dogs and many other animals are capable of detecting an impending natural event in advance of the event taking place. Using earthquakes as an example, it is thought that animals are capable of detecting primary waves, or "P-waves", earthquake waves that precede the dangerous later waves.

It is important to note that the range of canine to human communication methods normally available is very limited. For example, a dog might bark out of excitement, boredom, in response to auditory stimuli, in response to an intruder, to simply alert humans to something happening, or for other reasons. Without the ability to further clarify, however, the human is left wondering what the dog is feeling or trying to convey. This is similar to a dog scratching at the door to the outside. The dog might need to urinate or defecate; the dog may be bored; the dog may want to go outdoors; or the dog might want to visit somebody. Again, with such a blunt communications tool, the human is left wondering what the dog wants. By allowing the dog to further refine the expression, such as a bark accompanied by pressing the button for "scared", the dog can refine the communication. Furthermore, by allowing such refinement, the dog's press of a button may be used to trigger real world responses. For example, pressing the "scared" button might send a signal to the owner's mobile device together with video of the room, the front porch, etc. Pressing the "light" button might turn on a light.

Indeed, service dogs could even be trained to press a button that summons help in the event that the owner appears incapacitated. In one implementation, an alert would be triggered (such as an alarm, a light, a signal to a mobile device, or otherwise) and the owner given a set amount of time (such as 60 seconds) to cancel the alert before emergency responders are summoned. In another implementation, the reverse of the normal warning/cancellation sequence may be utilized. In this implementation, a device may alarm to indicate a problem with or for the human, such as a burglar alarm or a cardiac event detected by a watch with an EKG or pulse monitor or a loss of consciousness causing a fall detected by sensors. The dog would have a button for "help", confirming the signal, and a button for "ok", canceling the signal or redirecting it to a lower priority recipient, such as a redirection from ambulance to a neighbor.

In another aspect, "drug dogs" and other animals trained to sniff out things such as contraband may be able to differentiate between different drugs (or other materials). Taking Fang, an airport drug dog, as an example, Fang may have been trained to identify heroin, cocaine, and Adderall. Fang may alert in response to a carry-on bag only to have the owner say that they have a prescription for Adderall and there must have been remnants of a pill in the bag. Rather than search the bag and detain the person, it may be possible to have Fang press the button for "Adderall" (if it is Adderall) and the officers could then tell the person that they should have their partner text them a photograph of their prescription bottle. Without such disambiguation, the officers would likely have to respond as if the dog had detected the worst case scenario. This may be similar to a bomb sniffing dog alerting to nitrogen fertilizer. Because the officers do not know whether the dog is alerting to a very energy-dense material such as C-4 explosive that could be hidden on a person, the officers would be forced to search the person. If the dog could press a button saying "nitrogen fertilizer", the officers would know they were searching for a far less energy-dense potential explosive—allowing them to avoid searching extremely small spaces for example. Another embodiment is where the dog may augment the alert by indicating the relative strength of the scent with buttons. A dog can be trained to detect and differentiate different substances, but it is much harder for them to indicate their certainty level. Current technology allows for an essentially binary "yes" or "no" indicator, while buttons may be assigned to indicate "a little bit", "probably", "very certain", etc. Indeed, even a single button may be configured so that the rapidity, firmness, cadence, and repetitiveness of button presses are processed and utilized to enhance the communication.

It is unknown whether canine language abilities will lead to a substantial improvement in canine intelligence. Language acquisition plays a critical role in the development of much of humanity's most advanced cognitive abilities. Feral children—individuals who have reached adolescence without exposure to language—almost all display significantly diminished cognitive capacity. This is in part because complex cognition is thought to be scaffolded on words and how we use them. For instance, the word "if" is believed to have originated from a word having to do with things being "doubtful". Now that we have "if", however, we're able to have a new kind of conversation that goes beyond the concept of mere doubt. For example, "if you hit the glass it will break", or perhaps even more powerfully, the use of "if" in the context of computer programming. While we may not see a canine Albert Einstein anytime soon, we might see canine word use enabling new abilities not previously available.

Of interest is that enabling linguistic capabilities in dogs may result in improved inter-canine communication. For example, one dog may press the "play" button, and the other dog may then press "play" and "outside". The dogs could then run out of the dog door.

It would also be unsurprising for the canine to suffer less mental distress if the canine can communicate its needs. A dog that is less distressed is less likely to engage in destructive behaviors.

The market for a product like this is likely to be massive. Perhaps even category-creating. Currently over 50 million US households have dogs, and the pets market exceeds $90 billion in the United States alone. Customer spending will likely double or triple if and when many dogs can deploy simple language abilities.

Various devices have been invented to attempt to train non-human animals to use language. Kanzi, a chimp, was taught to point at icons on a board in order to communicate.

Other approaches to language training in dogs have only been successful in the area of word comprehension, and not really made an attempt at word production or meaning expression, and even then such efforts were only accessible to experts using home-customized hardware. Anna Jane Grossman, a trainer at "School for the Dogs" in New York City, trained a limited number of dogs to touch the visual images of "yes" or "no" on an iPad.

The late Dr. John Pilley, a retired professor of psychology, trained his dog Chaser the names of over a thousand objects. Doing so took many years of deliberate effort, and still, the result was only that Chaser could recognize words, not produce them. Chaser had neither any understanding, ability, or need to generate those words herself.

In addition, the CleverPet Hub device, which entered the market in 2016, was designed by cognitive scientists and neuroscientists to use software to facilitate learning of complex tasks. In 2019, CleverPet released the source code that enables CleverPet-based training, enabling community members to create games that, e.g., trained dogs to learn the names of different colors. Doing so required the use of a secondary computer. Patents and applications related to the Hub device, use or improvements thereon, at least in part, include without limitation U.S. Pat. No. 10,506,794 ("Animal interaction device, system and method"), U.S. Pat. No. 10,349,625 ("Animal interaction device, system and method"), U.S. D775769S1 ("Animal interaction device"), applications PCT/US2015/047431, Ser. Nos. 16/896,042, and 16/839,003, together with certain non-US counterparts.

Most recently Christina Hunger, a Speech Language Pathologist, used buttons that play recorded words to teach her dog Stella to "say" over 29 words (as of the time of writing). She was able to do so in a time period comparable to that of human language learning—less than 12 months. Remarkably, Stella appears to be able to express new concepts through word combinations, e.g. "water outside" when the button for "beach" wasn't working. Stella also seems to be able to construct proto-sentences (e.g. "want eat play"). The buttons Christina used for this purpose are readily available for sale, and in the hands of a speech language pathologist, can be used for teaching. She distributed the buttons on a Cartesian grid "word board."

SUMMARY OF INVENTION

The present disclosure presents devices, systems, and methods for training both non-humans and humans to communicate more effectively than previously possible. While domestic dogs are used in this disclosure as an exemplary animal, it should be understood that unless the context clearly requires otherwise, from this point forward, terms that refer to dogs are meant without loss of generality to refer to any animal lacking the ability to make their needs and thoughts understood at the level of a typical human adult. Unless the context clearly requires otherwise, the term includes humans who are preverbal or with communication impairments.

BRIEF DESCRIPTION OF THE DRAWINGS

FIGS. 15A-15D show, respectively, a perspective view, a top view, a bottom view and an orthogonal side view of a tile having a triangle shape, seven cutouts for placement of buttons, and connectors resembling a bone shape, according to an embodiment of the invention.

FIGS. 16A-16D show, respectively, a perspective view, a top view, a bottom view and an orthogonal side view of a tile having a triangle shape, seven cutouts for placement of buttons, and connectors resembling a parallelogram shape, according to an embodiment of the invention.

FIGS. 17A-17D show, respectively, a perspective view, a top view, a bottom view and an orthogonal side view of a tile having a triangle shape, seven cutouts for placement of buttons, and connectors resembling a isosceles trapezoid shape, according to an embodiment of the invention.

FIGS. 18A-18D show, respectively, a perspective view, a top view, a bottom view and an orthogonal side view of a tile having a triangle shape, seven cutouts for placement of buttons, and connectors resembling a trapezoid shape, according to an embodiment of the invention.

FIGS. 19A-19D show, respectively, a perspective view, a top view, a bottom view and an orthogonal side view of a tile having a triangle shape, seven cutouts for placement of buttons, and connectors resembling an arrow shape, according to an embodiment of the invention.

FIGS. 20A-20D show, respectively, a perspective view, a top view, a bottom view and an orthogonal side view of a tile having a square shape, seven cutouts for placement of buttons, and connectors resembling a bone shape, according to an embodiment of the invention.

FIGS. 21A-21D show, respectively, a perspective view, a top view, a bottom view and an orthogonal side view of a tile having a square shape, seven cutouts for placement of buttons, and connectors resembling a parallelogram shape, according to an embodiment of the invention.

FIGS. 22A-22D show, respectively, a perspective view, a top view, a bottom view and an orthogonal side view of a tile having a square shape, seven cutouts for placement of buttons, and connectors resembling a isosceles trapezoid shape, according to an embodiment of the invention.

FIGS. 23A-23D show, respectively, a perspective view, a top view, a bottom view and an orthogonal side view of a tile having a square shape, seven cutouts for placement of buttons, and connectors resembling a trapezoid shape, according to an embodiment of the invention.

FIGS. 24A-24D show, respectively, a perspective view, a top view, a bottom view and an orthogonal side view of a tile having a square shape, seven cutouts for placement of buttons, and connectors resembling an arrow shape, according to an embodiment of the invention.

FIGS. 25A-25D show, respectively, a perspective view, a top view, a bottom view and an orthogonal side view of a tile having a hexagonal shape, seven cutouts for placement of buttons, and connectors resembling a bone shape, according to an embodiment of the invention.

FIGS. 26A-26D show, respectively, a perspective view, a top view, a bottom view and an orthogonal side view of a tile having a hexagonal shape, seven cutouts for placement of buttons, and connectors resembling a parallelogram shape, according to an embodiment of the invention.

FIGS. 27A-27D show, respectively, a perspective view, a top view, a bottom view and an orthogonal side view of a tile having a hexagonal shape, seven cutouts for placement of buttons, and connectors resembling a isosceles trapezoid shape, according to an embodiment of the invention.

FIGS. 28A-28D show, respectively, a perspective view, a top view, a bottom view and an orthogonal side view of a tile having a hexagonal shape, seven cutouts for placement of buttons, and connectors resembling a trapezoid shape, according to an embodiment of the invention.

FIGS. 29A-29D show, respectively, a perspective view, a top view, a bottom view and an orthogonal side view of a tile having a hexagonal shape, seven cutouts for placement of buttons, and connectors resembling an arrow shape, according to an embodiment of the invention.

FIGS. 30A-30D show, respectively, a perspective view, a top view, a bottom view and an orthogonal side view of a tile having a triangle shape, zero cutouts, and connectors resembling a bone shape, according to an embodiment of the invention.

FIGS. 31A-31D show, respectively, a perspective view, a top view, a bottom view and an orthogonal side view of a tile having a triangle shape, one cutout for placement of a small sized button, and connectors resembling a bone shape, according to an embodiment of the invention.

FIGS. 32A-32D show, respectively, a perspective view, a top view, a bottom view and an orthogonal side view of a tile having a triangle shape, one cutout for placement of a medium sized button, and connectors resembling a bone shape, according to an embodiment of the invention.

FIGS. 33A-33D show, respectively, a perspective view, a top view, a bottom view and an orthogonal side view of a tile having a triangle shape, one cutout for placement of a large sized button, and connectors resembling a bone shape, according to an embodiment of the invention.

FIGS. 34A-34D show, respectively, a perspective view, a top view, a bottom view and an orthogonal side view of a tile having a triangle shape, two cutouts for placement of small sized buttons, and connectors resembling a bone shape, according to an embodiment of the invention.

FIGS. 35A-35D show, respectively, a perspective view, a top view, a bottom view and an orthogonal side view of a tile having a triangle shape, two cutouts for placement of medium sized buttons, and connectors resembling a bone shape, according to an embodiment of the invention.

FIGS. 36A-36D show, respectively, a perspective view, a top view, a bottom view and an orthogonal side view of a tile having a triangle shape, two cutouts for placement of large sized buttons, and connectors resembling a bone shape, according to an embodiment of the invention.

FIGS. 37A-37D show, respectively, a perspective view, a top view, a bottom view and an orthogonal side view of a tile having a triangle shape, three cutouts for placement of small sized buttons, and connectors resembling a bone shape, according to an embodiment of the invention.

FIGS. 38A-38D show, respectively, a perspective view, a top view, a bottom view and an orthogonal side view of a tile having a triangle shape, three cutouts for placement of medium sized buttons, and connectors resembling a bone shape, according to an embodiment of the invention.

FIGS. 39A-39D show, respectively, a perspective view, a top view, a bottom view and an orthogonal side view of a tile having a triangle shape, three cutouts for placement of large sized buttons, and connectors resembling a bone shape, according to an embodiment of the invention.

FIGS. 40A-40D show, respectively, a perspective view, a top view, a bottom view and an orthogonal side view of a tile having a triangle shape, four cutouts for placement of small sized buttons, and connectors resembling a bone shape, according to an embodiment of the invention.

FIGS. 41A-41D show, respectively, a perspective view, a top view, a bottom view and an orthogonal side view of a tile having a triangle shape, four cutouts for placement of medium sized buttons, and connectors resembling a bone shape, according to an embodiment of the invention.

FIGS. 42A-42D show, respectively, a perspective view, a top view, a bottom view and an orthogonal side view of a tile having a triangle shape, four cutouts for placement of large sized buttons, and connectors resembling a bone shape, according to an embodiment of the invention.

FIGS. 43A-43D show, respectively, a perspective view, a top view, a bottom view and an orthogonal side view of a tile having a triangle shape, five cutouts for placement of small sized buttons, and connectors resembling a bone shape, according to an embodiment of the invention.

FIGS. 44A-44D show, respectively, a perspective view, a top view, a bottom view and an orthogonal side view of a tile having a triangle shape, five cutouts for placement of medium sized buttons, and connectors resembling a bone shape, according to an embodiment of the invention.

FIGS. 45A-45D show, respectively, a perspective view, a top view, a bottom view and an orthogonal side view of a tile having a triangle shape, five cutouts for placement of large sized buttons, and connectors resembling a bone shape, according to an embodiment of the invention.

FIGS. 46A-46D show, respectively, a perspective view, a top view, a bottom view and an orthogonal side view of a tile having a triangle shape, six cutouts for placement of small sized buttons, and connectors resembling a bone shape, according to an embodiment of the invention.

FIGS. 47A-47D show, respectively, a perspective view, a top view, a bottom view and an orthogonal side view of a tile having a triangle shape, six cutouts for placement of medium sized buttons, and connectors resembling a bone shape, according to an embodiment of the invention.

FIGS. 48A-48D show, respectively, a perspective view, a top view, a bottom view and an orthogonal side view of a tile having a triangle shape, six cutouts for placement of large sized buttons, and connectors resembling a bone shape, according to an embodiment of the invention.

FIGS. 49A-49D show, respectively, a perspective view, a top view, a bottom view and an orthogonal side view of a tile having a triangle shape, seven cutouts for placement of small sized buttons, and connectors resembling a bone shape, according to an embodiment of the invention.

FIGS. 50A-50D show, respectively, a perspective view, a top view, a bottom view and an orthogonal side view of a tile having a triangle shape, seven cutouts for placement of medium sized buttons, and connectors resembling a bone shape, according to an embodiment of the invention.

FIGS. 51A-51D show, respectively, a perspective view, a top view, a bottom view and an orthogonal side view of a tile having a triangle shape, seven cutouts for placement of large sized buttons, and connectors resembling a bone shape, according to an embodiment of the invention.

FIGS. 52A-52D show, respectively, a perspective view, a top view, a bottom view and an orthogonal side view of a tile having a square shape, zero cutouts for placement of small sized buttons, and connectors resembling a bone shape, according to an embodiment of the invention.

FIGS. 53A-53D show, respectively, a perspective view, a top view, a bottom view and an orthogonal side view of a tile having a square shape, one cutout for placement of small sized buttons, and connectors resembling a bone shape, according to an embodiment of the invention.

FIGS. 54A-54D show, respectively, a perspective view, a top view, a bottom view and an orthogonal side view of a tile having a square shape, one cutout for placement of medium sized buttons, and connectors resembling a bone shape, according to an embodiment of the invention.

FIGS. 55A-55D show, respectively, a perspective view, a top view, a bottom view and an orthogonal side view of a tile having a square shape, one cutout for placement of large sized buttons, and connectors resembling a bone shape, according to an embodiment of the invention.

FIGS. 56A-56D show, respectively, a perspective view, a top view, a bottom view and an orthogonal side view of a tile having a square shape, two cutouts for placement of small sized buttons, and connectors resembling a bone shape, according to an embodiment of the invention.

FIGS. 57A-57D show, respectively, a perspective view, a top view, a bottom view and an orthogonal side view of a tile having a square shape, two cutouts for placement of medium sized buttons, and connectors resembling a bone shape, according to an embodiment of the invention.

FIGS. 58A-58D show, respectively, a perspective view, a top view, a bottom view and an orthogonal side view of a tile having a square shape, two cutouts for placement of large sized buttons, and connectors resembling a bone shape, according to an embodiment of the invention.

FIGS. 59A-59D show, respectively, a perspective view, a top view, a bottom view and an orthogonal side view of a tile having a square shape, three cutouts for placement of small sized buttons, and connectors resembling a bone shape, according to an embodiment of the invention.

FIGS. 60A-60D show, respectively, a perspective view, a top view, a bottom view and an orthogonal side view of a tile having a square shape, three cutouts for placement of medium sized buttons, and connectors resembling a bone shape, according to an embodiment of the invention.

FIGS. 61A-61D show, respectively, a perspective view, a top view, a bottom view and an orthogonal side view of a tile having a square shape, three cutouts for placement of large sized buttons, and connectors resembling a bone shape, according to an embodiment of the invention.

FIGS. 62A-62D show, respectively, a perspective view, a top view, a bottom view and an orthogonal side view of a tile having a square shape, four cutouts for placement of small sized buttons, and connectors resembling a bone shape, according to an embodiment of the invention.

FIGS. 63A-63D show, respectively, a perspective view, a top view, a bottom view and an orthogonal side view of a tile having a square shape, four cutouts for placement of medium sized buttons, and connectors resembling a bone shape, according to an embodiment of the invention.

FIGS. 64A-64D show, respectively, a perspective view, a top view, a bottom view and an orthogonal side view of a tile having a square shape, four cutouts for placement of large sized buttons, and connectors resembling a bone shape, according to an embodiment of the invention.

FIGS. 65A-65D show, respectively, a perspective view, a top view, a bottom view and an orthogonal side view of a tile having a square shape, five cutouts for placement of small sized buttons, and connectors resembling a bone shape, according to an embodiment of the invention.

FIGS. 66A-66D show, respectively, a perspective view, a top view, a bottom view and an orthogonal side view of a tile having a square shape, five cutouts for placement of medium sized buttons, and connectors resembling a bone shape, according to an embodiment of the invention.

FIGS. 67A-67D show, respectively, a perspective view, a top view, a bottom view and an orthogonal side view of a tile having a square shape, five cutouts for placement of large sized buttons, and connectors resembling a bone shape, according to an embodiment of the invention.

FIGS. 68A-68D show, respectively, a perspective view, a top view, a bottom view and an orthogonal side view of a tile having a square shape, six cutouts for placement of small sized buttons, and connectors resembling a bone shape, according to an embodiment of the invention.

FIGS. 69A-69D show, respectively, a perspective view, a top view, a bottom view and an orthogonal side view of a tile having a square shape, six cutouts for placement of medium sized buttons, and connectors resembling a bone shape, according to an embodiment of the invention.

FIGS. 70A-70D show, respectively, a perspective view, a top view, a bottom view and an orthogonal side view of a tile having a square shape, six cutouts for placement of large sized buttons, and connectors resembling a bone shape, according to an embodiment of the invention.

FIGS. 71A-71D show, respectively, a perspective view, a top view, a bottom view and an orthogonal side view of a tile having a square shape, seven cutouts for placement of small sized buttons, and connectors resembling a bone shape, according to an embodiment of the invention.

FIGS. 72A-72D show, respectively, a perspective view, a top view, a bottom view and an orthogonal side view of a tile having a square shape, seven cutouts for placement of medium sized buttons, and connectors resembling a bone shape, according to an embodiment of the invention.

FIGS. 73A-73D show, respectively, a perspective view, a top view, a bottom view and an orthogonal side view of a tile having a square shape, seven cutouts for placement of large sized buttons, and connectors resembling a bone shape, according to an embodiment of the invention.

FIGS. 74A-74D show, respectively, a perspective view, a top view, a bottom view and an orthogonal side view of a tile having a hexagonal shape, zero cutouts for placement of small sized buttons, and connectors resembling a bone shape, according to an embodiment of the invention.

FIGS. 75A-75D show, respectively, a perspective view, a top view, a bottom view and an orthogonal side view of a tile having a hexagonal shape, one cutout for placement of small sized buttons, and connectors resembling a bone shape, according to an embodiment of the invention.

FIGS. 76A-76D show, respectively, a perspective view, a top view, a bottom view and an orthogonal side view of a tile having a hexagonal shape, one cutout for placement of medium sized buttons, and connectors resembling a bone shape, according to an embodiment of the invention.

FIGS. 77A-77D show, respectively, a perspective view, a top view, a bottom view and an orthogonal side view of a tile having a hexagonal shape, one cutout for placement of large sized buttons, and connectors resembling a bone shape, according to an embodiment of the invention.

FIGS. 78A-78D show, respectively, a perspective view, a top view, a bottom view and an orthogonal side view of a tile having a hexagonal shape, two cutouts for placement of small sized buttons, and connectors resembling a bone shape, according to an embodiment of the invention.

FIGS. 79A-79D show, respectively, a perspective view, a top view, a bottom view and an orthogonal side view of a tile having a hexagonal shape, two cutouts for placement of medium sized buttons, and connectors resembling a bone shape, according to an embodiment of the invention.

FIGS. 80A-80D show, respectively, a perspective view, a top view, a bottom view and an orthogonal side view of a tile having a hexagonal shape, two cutouts for placement of large sized buttons, and connectors resembling a bone shape, according to an embodiment of the invention.

FIGS. 81A-81D show, respectively, a perspective view, a top view, a bottom view and an orthogonal side view of a tile having a hexagonal shape, three cutouts for placement of small sized buttons, and connectors resembling a bone shape, according to an embodiment of the invention.

FIGS. 82A-82D show, respectively, a perspective view, a top view, a bottom view and an orthogonal side view of a tile having a hexagonal shape, three cutouts for placement of medium sized buttons, and connectors resembling a bone shape, according to an embodiment of the invention.

FIGS. 83A-83D show, respectively, a perspective view, a top view, a bottom view and an orthogonal side view of a tile having a hexagonal shape, three cutouts for placement of large sized buttons, and connectors resembling a bone shape, according to an embodiment of the invention.

FIGS. 84A-84D show, respectively, a perspective view, a top view, a bottom view and an orthogonal side view of a tile having a hexagonal shape, four cutouts for placement of small sized buttons, and connectors resembling a bone shape, according to an embodiment of the invention.

FIGS. 85A-85D show, respectively, a perspective view, a top view, a bottom view and an orthogonal side view of a tile having a hexagonal shape, four cutouts for placement of medium sized buttons, and connectors resembling a bone shape, according to an embodiment of the invention.

FIGS. 86A-86D show, respectively, a perspective view, a top view, a bottom view and an orthogonal side view of a tile having a hexagonal shape, four cutouts for placement of large sized buttons, and connectors resembling a bone shape, according to an embodiment of the invention.

FIGS. 87A-87D show, respectively, a perspective view, a top view, a bottom view and an orthogonal side view of a tile having a hexagonal shape, five cutouts for placement of small sized buttons, and connectors resembling a bone shape, according to an embodiment of the invention.

FIGS. 88A-88D show, respectively, a perspective view, a top view, a bottom view and an orthogonal side view of a tile having a hexagonal shape, five cutouts for placement of medium sized buttons, and connectors resembling a bone shape, according to an embodiment of the invention.

FIGS. 89A-89D show, respectively, a perspective view, a top view, a bottom view and an orthogonal side view of a tile having a hexagonal shape, five cutouts for placement of large sized buttons, and connectors resembling a bone shape, according to an embodiment of the invention.

FIGS. 90A-90D show, respectively, a perspective view, a top view, a bottom view and an orthogonal side view of a tile having a hexagonal shape, six cutouts for placement of small sized buttons, and connectors resembling a bone shape, according to an embodiment of the invention.

FIGS. 91A-91D show, respectively, a perspective view, a top view, a bottom view and an orthogonal side view of a tile having a hexagonal shape, six cutouts for placement of medium sized buttons, and connectors resembling a bone shape, according to an embodiment of the invention.

FIGS. 92A-92D show, respectively, a perspective view, a top view, a bottom view and an orthogonal side view of a tile having a hexagonal shape, six cutouts for placement of large sized buttons, and connectors resembling a bone shape, according to an embodiment of the invention.

FIGS. 93A-93D show, respectively, a perspective view, a top view, a bottom view and an orthogonal side view of a tile having a hexagonal shape, seven cutouts for placement of small sized buttons, and connectors resembling a bone shape, according to an embodiment of the invention.

FIGS. 94A-94D show, respectively, a perspective view, a top view, a bottom view and an orthogonal side view of a tile having a hexagonal shape, seven cutouts for placement of medium sized buttons, and connectors resembling a bone shape, according to an embodiment of the invention.

FIGS. 95A-95D show, respectively, a perspective view, a top view, a bottom view and an orthogonal side view of a tile having a hexagonal shape, seven cutouts for placement of large sized buttons, and connectors resembling a bone shape, according to an embodiment of the invention.

FIGS. 96A-96D show, respectively, a perspective view, a top view, a bottom view and an orthogonal side view of a hexagonal tile that can accommodate two different sizes of buttons, and connectors resembling a bone shape, according to an embodiment of the invention.

FIGS. 97A-97D show, respectively, a perspective view, a top view, a bottom view and an orthogonal side view of a hexagonal tile that can be disassembled into six separate kite shaped pieces, with each piece having four connectors resembling a bone shape, according to an embodiment of the invention.

FIGS. 98A-98D show, respectively, a perspective view, a top view, a bottom view and an orthogonal side view of a hexagonal tile that can accommodate two different sizes of buttons, according to an embodiment of the invention.

DETAILED DESCRIPTION OF THE INVENTION

Figure 1A:
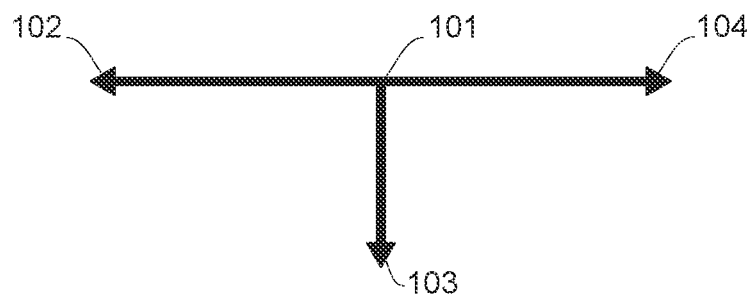
FIG. 1A is a simplified diagram showing certain primary linguistic components (semantic axes) of a communication apparatus.

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

Abbreviations and Definitions

To facilitate understanding of the invention, a number of terms and abbreviations as used herein are defined below as follows:

Semantic button: As used herein, the term "semantic button" refers to a physical or digital (e.g. touchscreen-based) object that can be actuated (e.g. pressed) by a learner, in the process causing the expression of the concept to which the semantic button refers (e.g. via emission of the sound of the word referred to by the concept).

Semantic board or tile: As used herein, the term "semantic board" or "semantic tile" refers to a physical or digital object on which semantic buttons can be arranged. In one embodiment, the board is preferably a hexagon but could also be another shape. In a different embodiment, interlocking or otherwise proximate tiles may be located in a manner that creates a large board comprised of the tiles.

Elaboration: As used herein, the term "elaboration" (or "elaborate") is broadly defined to mean the set of concepts or words that are more abstract, complex, elaborate, obscure, specific, or esoteric than the ones under consideration or otherwise closer to the center of the semantic axes. It includes concepts that are combinations of the ones under consideration with others. For example, an elaboration of "dog" could be "Daschund" (a dog breed).

Semantic vector: As used herein, the term "semantic vector" refers to a direction, travel along which leads to elaboration of concepts or words located along this vector.

Semantic axes: the three semantic vectors representing sentence subjects, sentence verbs, and sentence objects, with all three originating from the same point, and with sentence subjects and sentence objects proceeding in away from each other in opposite directions and sentence verbs elaborating at a right angle to the axis defined by sentence subjects and sentence objects.

Trainer: As used herein, the term "trainer" is broadly defined to include any agent (human or non-human animal, or digital/electronic entity) that has the intention of communicating with a learner or training (or teaching) a learner to communicate.

Learner: As used herein, the term "learner" is broadly defined to include any agent (human or non-human animal, or digital/electronic entity) that is learning to use semantic buttons or semantic boards.

Where we utilize the term "CleverPet® Hub" herein, it should be understood to include some of the technology described in U.S. patent application Ser. No. 14/771,995 as well as other devices with similar functionality, to the extent that such devices exist or will exist. We also use the term "button" herein to mean any touch or other interface that can be activated by a dog.

The present application discloses a number of language-training devices and systems. A number of them consist of devices comprising one or more polygon-shaped semantic boards, including but not limited to semantic boards with shapes that are triangular, square, pentagonal, hexagonal, heptagonal, octagonal, nonagonal, or decagonal. The semantic boards accommodate sound-producing semantic buttons on a side of the semantic board, and the semantic boards may be placed horizontally, such as on a floor, vertically, such as on a wall, or sloped, such as on a tilted surface. The semantic boards are designed so that sound-causing semantic buttons can be securely affixed to the face shown to the learner. In one embodiment, the sound and button are not co-located. For example, the sound may come from the tile, another button, a mobile device, speakers, an alarm system, the dog's collar or other wearable, or other sound generator. In one aspect, the sound may be within the range of human and dog hearing. In another aspect, the sound may be within the range of dog hearing only. In one aspect, two sounds may be produced, one in the range of human hearing and one outside of the range of human hearing but within the range of dog hearing, which sounds may optionally differ in one or more of volume, duration, number of repetitions, or otherwise. In one embodiment, a sound may be emitted from a first button that in turn triggers sound to be made by a separate sound source. In one embodiment, the sound may be encoded, as modems used to encode data for transmission over phone lines, and received by a receiver that is operably connected to a speaker. In one aspect, the triggering sound may be outside of the range of human hearing. In another aspect, the triggering sound may be outside of the range of dog hearing.

Thus, a language training device may comprise: a plurality of polygonal boards, each polygonal board placed on a horizontal, a vertical or a sloped surface, each polygonal board comprising a face; and one or more semantic buttons, each semantic button connected to the face, wherein (i) a corner of each polygonal board is without a semantic button so as to provide a cue as to the board's orientation; and (ii) the plurality of polygonal boards are arranged to facilitate the learning of words and word categories. New polygonal boards may be added to the device along semantic vectors.

In some embodiments, the semantic button produces an audible word. In other embodiments, the polygonal boards may comprise one or more of a visual, textural, or olfactory cue to help a learner identify a category of words located on the board. In still other embodiments, each semantic button has a compartment for placement of an object, and a button face, which may be removable to permit placement of objects inside, is transparent enabling a viewer to see the object. The button face may also comprise hole for passage of smells from the object.

In another embodiment, each tile may contain, on some or all of the tile's bottom surface, hook and loop connectors. Similarly, each button may contain, on some or all of the button's bottom surface, hook and loop connectors. In applications where floor space is sparse, the buttons and/or tiles may be affixed to a wall or door. Such affixing may be accomplished with hook and loop connectors, an adhesive method such as 3M's COMMAND® strips, magnets, or other connection modalities.

In some embodiments, the semantic boards have a clear orientation cue in the form of a single corner in which a semantic button is omitted. The particular arrangement of the multiple semantic boards is designed to facilitate the learning and elaboration of conceptual or word categories.

Other embodiments consist of similarly polygonal semantic boards with particular visual, textural, or olfactory cues that provide intuitive cues for identifying the concept or word category.

Yet other embodiments consist of semantic boards, and semantic buttons within the boards, arranged in a way that facilitates learning of the meaning and location of the semantic buttons, as well as cuing the kinds of conceptual or grammatical changes that take place along different semantic vectors across arrangements of the semantic boards. In particular, the semantic buttons associated with sentence subjects (e.g. people and animals) expand in one direction away from a midline of the set of arranged semantic boards, the semantic buttons associated with sentence objects expand in the opposite direction on the device, and action or verb concepts expand at a right angle to the line defined by axis implied by the subject-object expansion lines (see e.g., FIG. 1A).

Still other embodiments consist of a language expression and comprehension device comprising one or more semantic buttons, in which the semantic button has a compartment within it that accommodates the holding of a range of different objects or scents to which a learner may ascribe meaning, and the face of the semantic button enables viewing of any object or image within it. The device may allow the trainer (and potentially learner) to remove the face of the semantic button to gain access to the compartment so that objects can be placed inside it. Further, the face of the semantic button may also be permeable in order to permit the passage of smells emitted by the object to the space outside the button.

A language training system is described comprising one or more semantic sound producing buttons, such as those described above, and one or more polygonal semantic board(s), such as those described above, arranged according to a recommended layout. The system described here integrates the semantic buttons and the semantic boards through the description of preferred semantic board placement, as well as preferred semantic button placement on the semantic boards.

A language training method is described, which comprises placing semantic boards on a horizontal surface, (e.g. a floor or table), a vertical surface (e.g. a wall or door), or a sloped surface (e.g. a ramp). Then, placing semantic buttons into the semantic boards in an order and arrangement that facilitates concept learning by a learner. Then, training a learner in the meanings of the semantic buttons. Then, expanding the learner's vocabulary by adding semantic boards and semantic buttons along one or more semantic axes.

Figure 104:
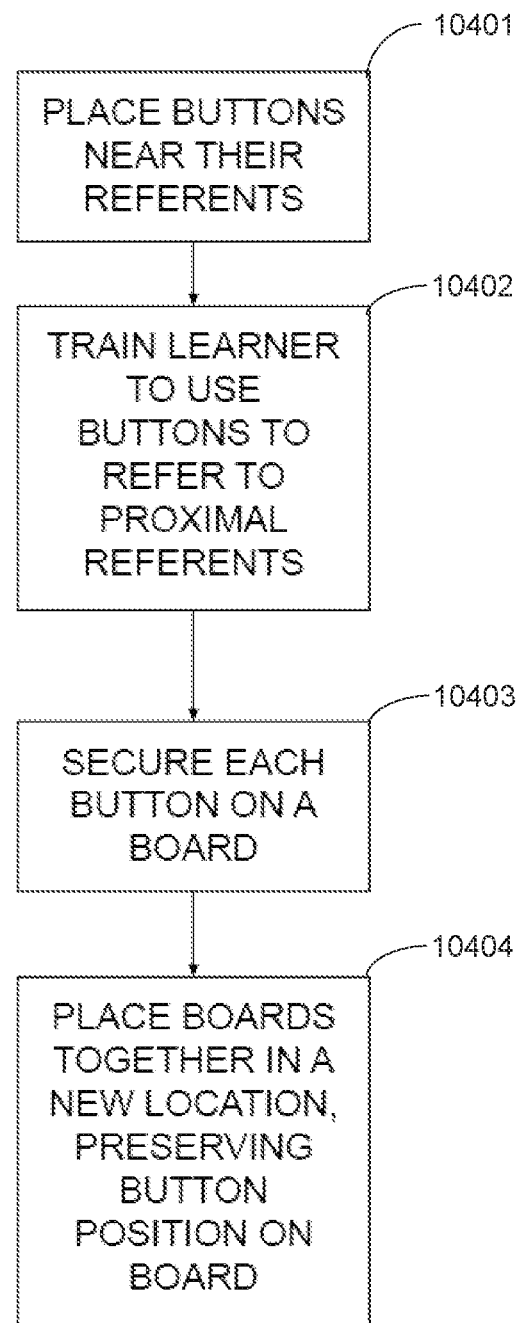
FIG. 104 is a flow diagram of a language training method.

Thus, as shown in FIG. 104, a language training method may comprise: (i) locating one or more sound-producing buttons on a hexagonal board proximal to a referent 10401; (ii) training a learner to use each sound-producing button 10402; (iii) securing the one or more sound-producing buttons on a hexagonal board while maintaining each button's location proximal to the referent 10403; and (iv) connecting the hexagonal board with one or more other hexagonal boards 10404, wherein the one or more other hexagonal boards are added along semantic vectors. The hexagonal board and the other hexagonal boards may comprise between one and seven sound-producing buttons.

Additionally, in some embodiments the method may further comprise: (v) infusing a scent in each sound-producing button to aid in the training; and/or (vi) placing an object to which the learner ascribes a meaning in the one or more sound-producing buttons to aid in the training.

The present teachings include compositions for the design of buttons and boards in which these buttons can be placed in a way that facilitates learning to use the buttons in order to express meaning. The buttons trigger the production of sounds that refer to concepts (e.g. words) known by a trainer (e.g., a dog's owner/parent) that the trainer believes are relevant for the dog to learn (e.g. "outside"). As such, we term these devices "semantic buttons". They are secured in place on boards, so that when pressed by a learner (e.g. a dog) they do not move unintentionally.

In order to facilitate learning, the boards are arranged so that movement in a single direction from one board to the next is more likely to generate a meaningful sentence, and to provide cues to a learner as to the categories of words and where they can fit within expressions. In one embodiment, these semantic boards are arranged so that typical sentence subjects (such as people and animals) are located on the left side of the board layout, sentence verbs are located in the middle, and sentence objects (such as toys and places) are located on the right side of the board layout, opposite the sentence subjects.

The present teachings also describe a board design that has within it a strong orientation cue that helps a learner better remember the placement of buttons within a grid, as well as providing to a learner a space on which to put their foot or paw and recognize the orientation of the same version of a board in a different location. While a strong cue is preferable in most cases, the cue may be less than strong in some embodiments. In one embodiment, the board is a hexagon accommodating space for semantic buttons at all but one corner, and room for a single semantic button in the center of the board.

Consequently, in one aspect, a language training device may comprise one or more hexagonal boards, each hexagonal board comprising: (i) one or more buttons; (ii) spaces for secure placement of the one or more buttons, the spaces preventing unintentional movement of the buttons while allowing easy removal and replacement of the buttons; (iii) a marker on a surface indicating orientation of the hexagonal board relative to a viewer, wherein each hexagonal board is configured to be physically connected to an adjacent board to prevent relative movement when connected, and physically disconnected from the adjacent board to permit placement in different locations when disconnected, and wherein the arrangement of the one or more buttons on the board providing one or more semantic cues.

In some embodiments, each hexagonal board may comprise from one to seven buttons, and the buttons may have a scent infused in a plastic element of the button. Additionally, in some aspects, each button may have a scent unique to a meaning represented by the button.

In various aspects, buttons may be activated by various means. For example, buttons may be activated by capacitive touch sensors, a camera, a learner's gaze, a learner's neural signal, a magnetic sensor or an infrared sensor. These various activation means are more fully described below.

Figure 4:
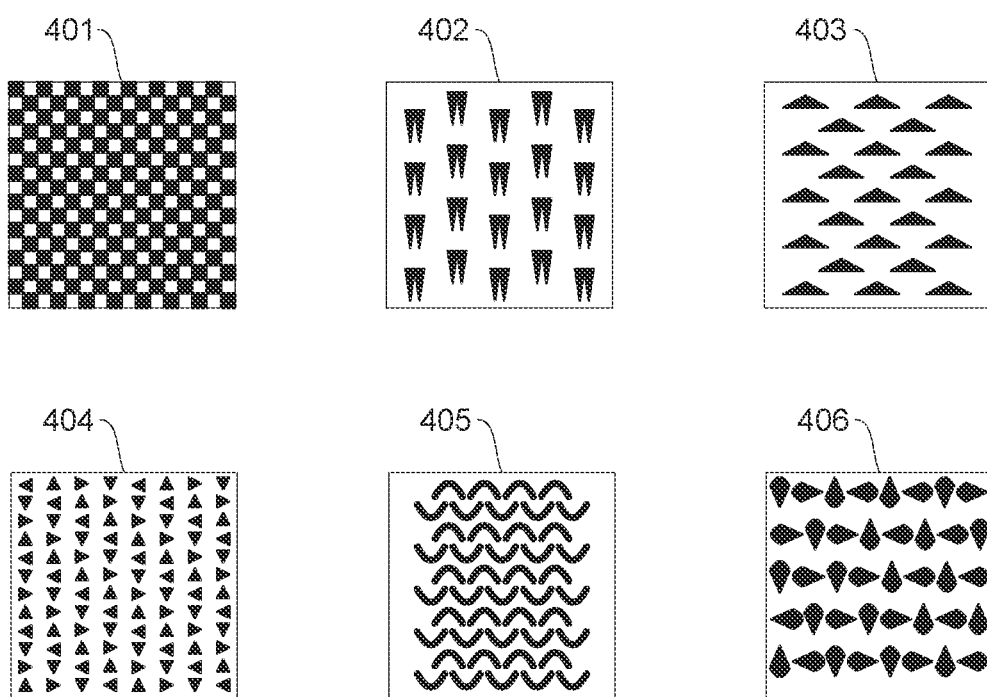
FIG. 4 is a set of patterns which may be printed on tiles.

FIG. 4 shows a set of printed patterns 401-406 that may be placed on the surface of the boards (e.g., by digital printing, screen printing, 3D printing, or other conventional methods of printing or depositing patterns on, or molding patterns into a surface) for helping learners better remember and distinguish the category of words presented on the boards. In one aspect, the pattern for nouns or noun phrases may be a set of triangles (e.g., pattern 402 for sentence subjects, pattern 403 for places, and pattern for sentence objects 404), and the pattern for actions and verbs may be a set of curves (e.g., pattern 405). The sharp angles of the edge of the triangle yield a higher visual spatial frequency, and thus can help elicit a sense within a viewer of "particulars" that can be referred to. A curve pattern, by contrast, can help a viewer recognize that the concept is one of movement, motion, or action. Additionally, the pattern for adverbs and adjectives may combine triangles and curves (e.g., pattern 406), and the pattern for social words may be a checkerboard pattern (e.g. pattern 401).

The present teachings also describe an arrangement of semantic boards along a set of semantic axes in order to improve concept learning and to facilitate the expression of sentences. In one aspect, the subject nouns such as humans and animals extend toward the left of the midline of the arranged semantic boards, objects nouns such as toys and places extend toward the right of the midline of the arranged semantic boards, and verbs or actions extend at a right angle to an imagined line between subject nouns and object nouns. This arrangement enables a learner to construct many phrases with a minimal need for changes in direction of movement. For example, "Mom play ball outside" would, in this arrangement, involve travel from the left side of the arranged semantic boards to the right side.

The present teachings include a system for training the expression and understanding of language that guides the training of learners to use semantic buttons as well as the expansion of the device as the learner increases his or her vocabulary.

In some aspects, a language training system may comprise: a computer network; a button connected to the computer network and programmed to produce an initial sensory trigger comprising one or more of a smell, a texture, a pattern or a sound perceptible to a learner (e.g. a dog or a cat), the button configured to be triggered by the learner (e.g., the dog or the cat); the button further configured to be reprogrammed by a human user to produce a different sensory trigger than the initial sensory trigger; and the button capable of being remotely triggered.

In some aspects, the initial sensory trigger may be a sound perceptible to a human or a sound not perceptible to a human. A second sound may also be produced when the initial sensory trigger is a sound not perceptible to the human, and where the second sound is perceptible to the human. The initial sensory trigger may comprise a word, a smell, a texture and/or a pattern. It should also be understood that when using scent as a trigger, dogs are capable of far greater scent detection and differentiation than humans. As a result, even a scent that humans might find unpleasant, such as urine, may be presented in such a faint amount that humans cannot detect it while dogs can. Similarly, while humans may be frustrated or annoyed by a cacophony of smells, it may be desirable to present dogs with a variety of smells they can differentiate but humans largely cannot.

The present teachings include a device for training language expression and comprehension. The device consists of a user-programmable sound producing button with a transparent cover, behind and/or under which trainers can place objects, or the representation of an object, for a learner to recognize. In one aspect, the button may include holes enabling a learner to smell the contents added to the button, thereby providing to the learner an additional cue for recognizing and remembering the meaning of the semantic button. In another aspect, scent may be imbued into some or all of the components of the button.

The present teachings include methods for placing semantic boards on a surface, placing semantic buttons into the semantic boards according to a pre-described semantic arrangement, training a learner as to the meanings of the semantic buttons, and expanding the vocabulary of the learner through the addition of semantic boards or semantic buttons along a set of given semantic axes.

These and other features, aspects and advantages of the present teachings will become better understood with reference to the following description, examples and appended claims.

Turning to FIG. 1A, therein is shown a high level semantic multi-axis diagram 101 describing semantic vectors that define a conceptual space. Words or concepts placed further away from the origin of the semantic axes should be elaborations along a semantic vector. Words or concepts likely to qualify as sentence "subjects" 102 begin left of the midline, while those more likely to qualify as sentence "objects" 104 begin and are elaborated right of the midline. In the same respect, action words 103 (such as verbs) begin in the middle and become elaborated as their distance increases from the origin of the semantic axes.

Figure 1B:
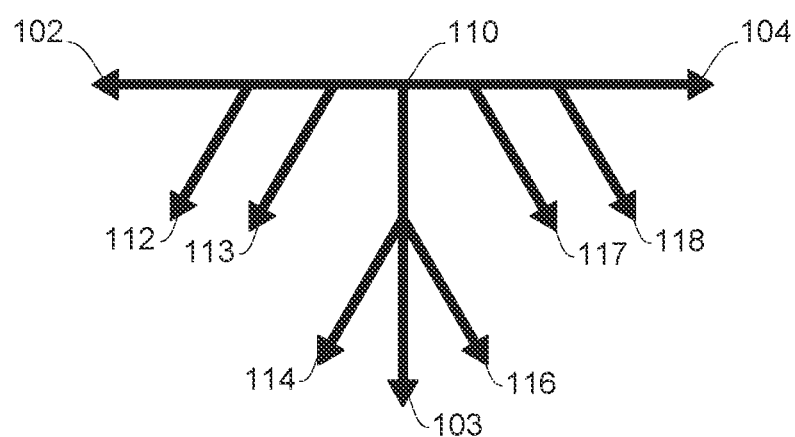
FIG. 1B is a more complex diagram showing certain primary linguistic components of a communication apparatus.

FIG. 1B is an expanded semantic axis diagram 110. In addition to subjects 102, objects 104 and verbs 103, social words 113, adverbs or adjectives 117, and verb variants 114, 116 are present together with object variants 118 and subject variants 112. The hexagonal layout easily lends itself to the development of directions beyond left, right, and down. Words or concepts that are conceptually "intermediate" can be placed along the appropriate diagonal. Thus, in this representation, "social words" 113 such as greetings, are placed left of the actions semantic vector and closer to the sentence subjects 102 semantic vector. In the same respect, words for modifying verbs or objects (i.e., adverbs and adjectives) 117, 118 find themselves right of the midline between verbs 103, 114, 116 and typical sentence objects 104.

Figure 1C:
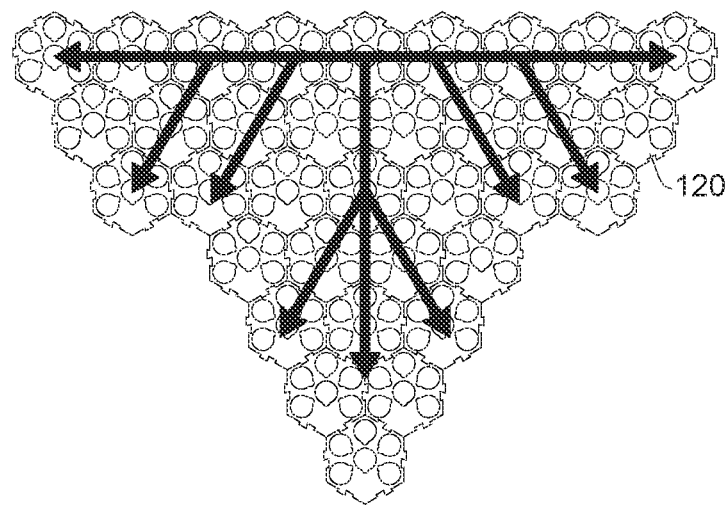
FIG. 1C is a diagram showing certain primary linguistic components of a communication apparatus as overlaid over a set of tiles capable of containing buttons or button-like functionality.

FIG. 1C is an expanded semantic axis diagram overlaid on a hexagonal tile set 120. The diagram of FIG. 1C demonstrates how an unlimited number of semantic vectors can emerge with increasing elaboration as the grid 120 expands, facilitating learner learning and generalization.

By organizing the distribution of tiles and buttons in accordance with the organizing principles set forth in FIGS. 1A-1C, the likelihood of success of a dog (or other learner) in learning and utilizing the system is enhanced.

Figure 2A:
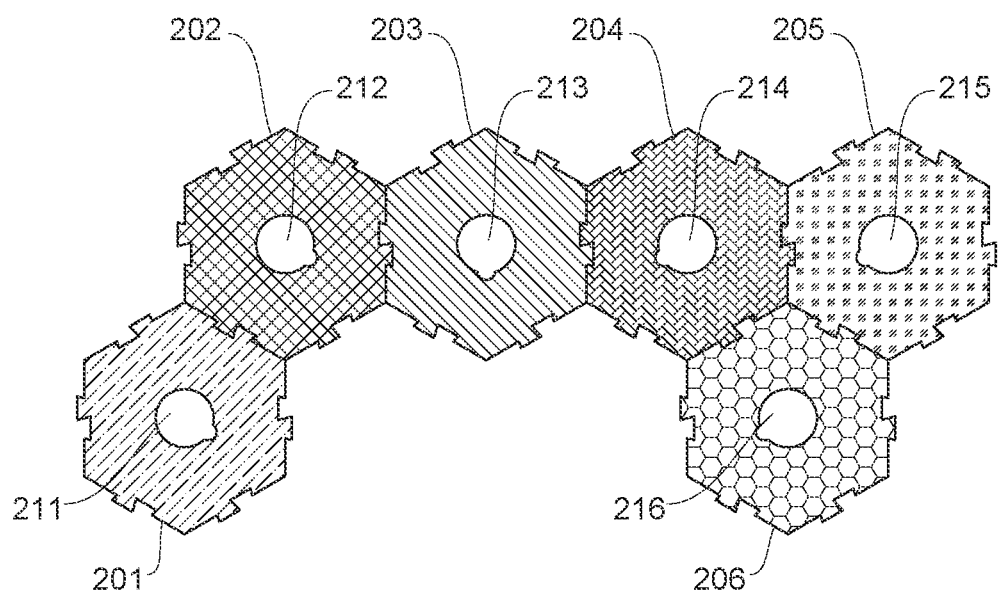
FIG. 2A is a simplified representation of interlocked tiles with different patterns organized to promote communication.

Turning to FIG. 2A, we present another example of semantic segmentation and organization. A tile is present for social words 201 with an accompanying button 211. A tile is present for sentence subjects such as other people and animals 202 with an accompanying button 212. A tile is present for verbs and action words 203 with an accompanying button 213. A tile is present for sentence objects and inanimate things 204 together with an accompanying button 214. A tile is present for places 205 with an accompanying button 215. A tile is present for descriptors, such as adjectives and adverbs 206 with an accompanying button 216.

A trainer can begin with one or two semantic boards with words such as "outside" (e.g., button 215 on semantic board 205) and "toy 1" (e.g., button 214 on semantic board 204), and then add additional semantic boards as the learner gains competence. For example, the semantic boards 203 and 202 may then be added to the left of semantic board 204, with for example, the words, "play" (button 213) and "person 1" (button 212), with "person 1" representing the "who," and "play" representing the "doing." "Toy 1" (button 214) on semantic board 204 represents the "what" and "outside" 215 on semantic board 205 representing the "where".

Additional semantic boards may be added to the left of the semantic board 202 to represent other people or animals, and additional semantic boards may be added to the right of semantic board 205 to represent other objects and locations. Similarly, semantic board 206 may be added with the word "now" (button 216; descriptors, e.g., an adjective or adverb) and semantic board 201 may be added with the word "love you" (button 211; a social word, e.g., greetings or manners).

Figure 2B:
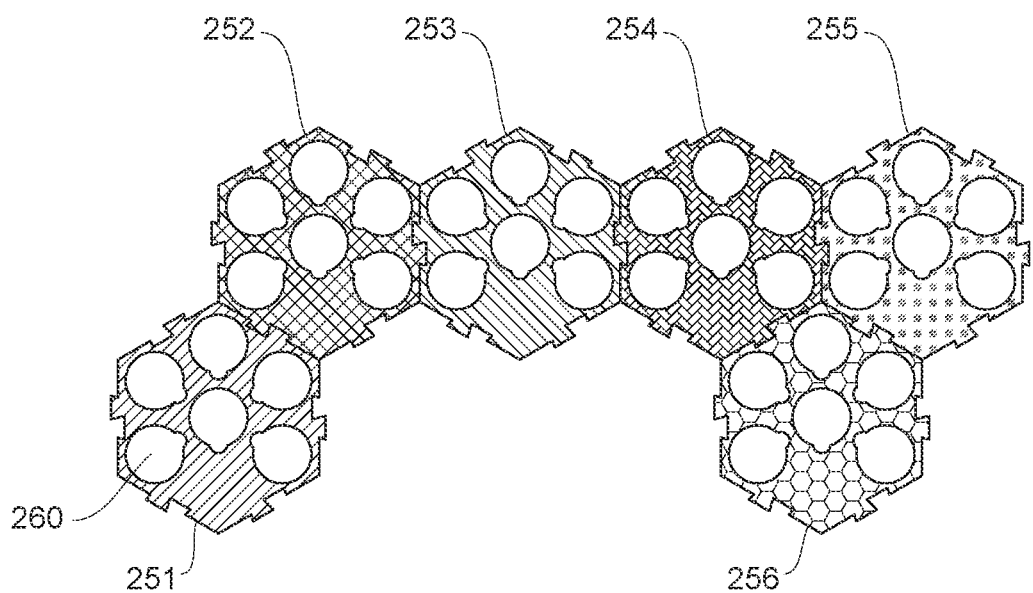
FIG. 2B is a complex representation of interlocked tiles with different patterns organized to promote communication.

Turning to FIG. 2B, therein is shown another example of semantic segmentation and organization. A tile is present for social words 251 with a plurality of accompanying buttons. A tile is present for sentence subjects 252 such as other people and animals with a plurality of accompanying buttons. A tile is present for verbs and action words 253 with a plurality of accompanying buttons. A tile is present for sentence objects and inanimate things 254 together with a plurality of accompanying buttons. A tile is present for places 255 with a plurality of accompanying buttons. A tile is present for descriptors, such as adjectives and adverbs 256 with a plurality of accompanying buttons. A plurality of buttons are shown, such as button 260.

Figure 3:
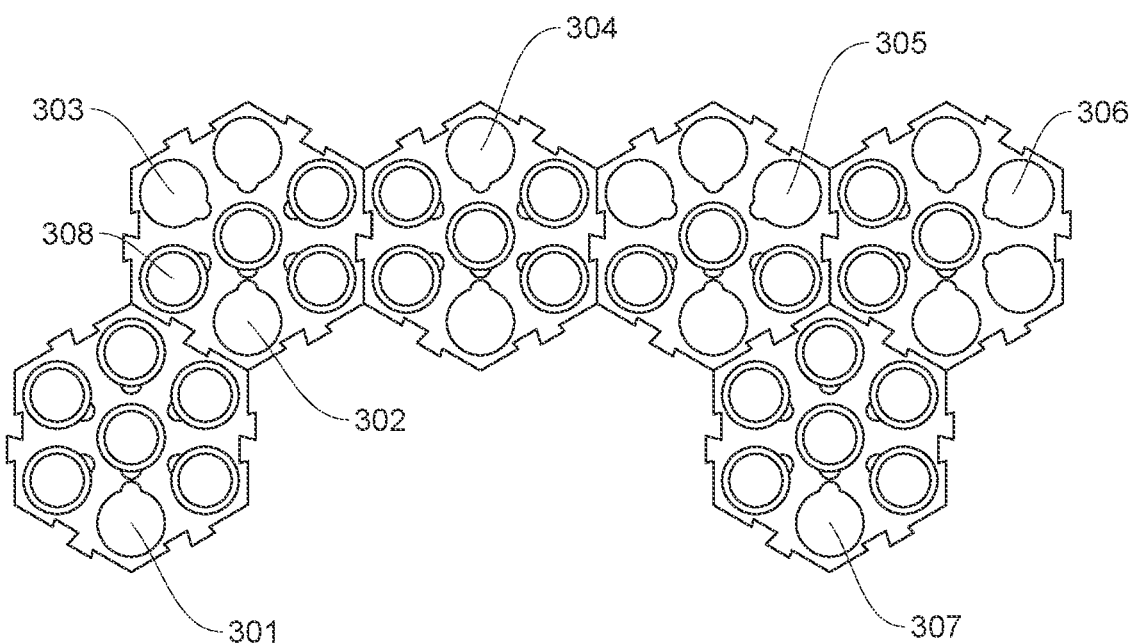
FIG. 3 is a diagram of interlocked tiles with buttons.

Turning to FIG. 3, we see an exemplary set of interconnected tiles with cutouts (spaces) for buttons. A plurality of semantic boards (similar to semantic boards 201-206 in FIG. 2A and semantic boards 251-256 in FIG. 2B) are shown, each board having semantic buttons (e.g. 308) distributed thereon. In the embodiment of FIG. 3, the semantic boards have between three and six semantic buttons, but the number of buttons on each board may vary from between zero and seven buttons (e.g., 0, 1, 2, 3, 4, etc.). Likewise, the arrangement of semantic boards in FIG. 3 is exemplary only, and an arrangement may contain more or less boards, and the boards may be arranged differently to those shown. Semantic buttons may be located in any cutouts (spaces) on a semantic board. Spaces 301-307 are representative of locations where additional semantic buttons may be placed.

To use the device comprising a combination of semantic boards and semantic buttons, the trainer distributes the semantic boards (e.g., as shown FIG. 2B) according to the semantic tree shown in FIG. 1B. The trainer then places semantic buttons (e.g. button 260 on board 251 of FIG. 2B) that a learner has already learned, or that the trainer intends to teach, in the appropriate locations within the semantic boards, removing as needed any inserts. Inserts (not shown) are used to fill in or cover cutouts/spaces (e.g., space 303 of FIG. 3). As the learner learns new concepts, the trainer can add new semantic buttons. As new categories of words are learned, new semantic boards can be added, with a semantic button in the center of the semantic board in order to act as a memorable canonical representation of the category implied by the semantic board.

A method of using the semantic buttons and boards is to add semantic buttons to the semantic boards of the correct conceptual category, or, if the concept referred to by the semantic button is not appropriate for any of the conceptual categories implied by the boards, to add a new semantic board along the appropriate semantic vector.

To use the semantic button comprising a compartment with a transparent cover, a trainer (or potentially learner) separates the parts of the device, adds an appropriately sized, looking, or smelling, object, and then reassembles the semantic button. The button may then be placed in a semantic board, or left elsewhere independently.

Facilitation of Word Training Through Spatial Sound Correspondences

Certain challenges exist in training dogs to use a touch interface to express meaning using an array of buttons that produce sounds.

These challenges include:

Compactness: Maximizing the spatial density of the buttons to minimize the space requirements for the buttons' distribution, without confusing the dog as to the button's meaning or compromising the dog's ability to physically use and traverse the interface.

Learnability: How to distribute buttons in a way that is easy to learn, easy to remember, and which facilitates the development of more complex and/or subtle semantics.

Ease of use: How to distribute buttons to speedup, encourage, and facilitate the construction of word combinations.

Location independence: Ensuring dogs can remember the meaning of the words even if the buttons are moved to different locations, such as different rooms within a household, other households or any location where the learner would benefit from access to the board.

Dog portability: Enabling dogs to express meaning to each other through the use of the buttons.

Expandability: Maximize ability to add buttons without compromising the button meanings already remembered, and while minimizing confusion to the dog. Potentially even providing additional semantic cues to the structure of the meanings they are learning.

Facilitation of human training: Training dogs to use the buttons is time consuming and can quickly lead to obstacles that frustrate both the humans and dogs involved.

Sensory translation: Senses vary between species. As an example, it is estimated that dogs have approximately 220 million olfactory receptors, while humans are estimated to have approximately 5 million olfactory receptors. Similarly, eyesight in dogs is thought to vary significantly from that in humans. The inventions are designed to function in a manner that effectively translates between these different sensory schemes.

In order to address the above challenges, we teach a novel design for the semantically-meaningful laying out of buttons, which we call a FluentPet Board (also identified here as a "board" or "tile" (see e.g., 201).

The FluentPet board is of a hexagonal shape, allowing for the placement of, typically, six or seven buttons, with cutouts (e.g., spaces or indentations) 303 to accommodate the buttons 308. Some embodiments, however, may have more than seven buttons. In some embodiments, the board may be of a triangular, square, or other polygonal shape. The ability to accommodate buttons does not mean that the full complement of buttons that may be accommodated must or should be deployed.

Various embodiments of boards (tiles) are shown in FIGS. 15A-15D through 99A-99D. Each set of figures (e.g. 15A-15D, 16A-16D, 17A-17D, etc.) show an embodiment, which may vary from other embodiments, with respect to the shape of the board, the number, size and/or arrangement of cutouts (spaces) for buttons, and the type of connectors.

FIGS. 15A-15D show, respectively, a perspective view, a top view, a bottom view and an orthogonal side view of a tile having a triangle shape, seven cutouts for placement of buttons, and connectors resembling a bone shape.

FIGS. 16A-16D show, respectively, a perspective view, a top view, a bottom view and an orthogonal side view of a tile having a triangle shape, seven cutouts for placement of buttons, and connectors resembling a parallelogram shape.

FIGS. 17A-17D show, respectively, a perspective view, a top view, a bottom view and an orthogonal side view of a tile having a triangle shape, seven cutouts for placement of buttons, and connectors resembling a isosceles trapezoid shape.

FIGS. 18A-18D show, respectively, a perspective view, a top view, a bottom view and an orthogonal side view of a tile having a triangle shape, seven cutouts for placement of buttons, and connectors resembling a trapezoid shape.

FIGS. 19A-19D show, respectively, a perspective view, a top view, a bottom view and an orthogonal side view of a tile having a triangle shape, seven cutouts for placement of buttons, and connectors resembling an arrow shape.

FIGS. 20A-20D show, respectively, a perspective view, a top view, a bottom view and an orthogonal side view of a tile having a square shape, seven cutouts for placement of buttons, and connectors resembling a bone shape.

FIGS. 21A-21D show, respectively, a perspective view, a top view, a bottom view and an orthogonal side view of a tile having a square shape, seven cutouts for placement of buttons, and connectors resembling a parallelogram shape.

FIGS. 22A-22D show, respectively, a perspective view, a top view, a bottom view and an orthogonal side view of a tile having a square shape, seven cutouts for placement of buttons, and connectors resembling a isosceles trapezoid shape.

FIGS. 23A-23D show, respectively, a perspective view, a top view, a bottom view and an orthogonal side view of a tile having a square shape, seven cutouts for placement of buttons, and connectors resembling a trapezoid shape.

FIGS. 24A-24D show, respectively, a perspective view, a top view, a bottom view and an orthogonal side view of a tile having a square shape, seven cutouts for placement of buttons, and connectors resembling an arrow shape.

FIGS. 25A-25D show, respectively, a perspective view, a top view, a bottom view and an orthogonal side view of a tile having a hexagonal shape, seven cutouts for placement of buttons, and connectors resembling a bone shape.

FIGS. 26A-26D show, respectively, a perspective view, a top view, a bottom view and an orthogonal side view of a tile having a hexagonal shape, seven cutouts for placement of buttons, and connectors resembling a parallelogram shape.

FIGS. 27A-27D show, respectively, a perspective view, a top view, a bottom view and an orthogonal side view of a tile having a hexagonal shape, seven cutouts for placement of buttons, and connectors resembling a isosceles trapezoid shape.

FIGS. 28A-28D show, respectively, a perspective view, a top view, a bottom view and an orthogonal side view of a tile having a hexagonal shape, seven cutouts for placement of buttons, and connectors resembling a trapezoid shape.

FIGS. 29A-29D show, respectively, a perspective view, a top view, a bottom view and an orthogonal side view of a tile having a hexagonal shape, seven cutouts for placement of buttons, and connectors resembling an arrow shape.

FIGS. 30A-30D show, respectively, a perspective view, a top view, a bottom view and an orthogonal side view of a tile having a triangle shape, zero cutouts for placement of buttons, and connectors resembling a bone shape.

FIGS. 31A-31D show, respectively, a perspective view, a top view, a bottom view and an orthogonal side view of a tile having a triangle shape, one cutout for placement of small sized buttons, and connectors resembling a bone shape.

FIGS. 32A-32D show, respectively, a perspective view, a top view, a bottom view and an orthogonal side view of a tile having a triangle shape, one cutout for placement of medium sized buttons, and connectors resembling a bone shape.

FIGS. 33A-33D show, respectively, a perspective view, a top view, a bottom view and an orthogonal side view of a tile having a triangle shape, one cutout for placement of large sized buttons, and connectors resembling a bone shape.

FIGS. 34A-34D show, respectively, a perspective view, a top view, a bottom view and an orthogonal side view of a tile having a triangle shape, two cutouts for placement of small sized buttons, and connectors resembling a bone shape.

FIGS. 35A-35D show, respectively, a perspective view, a top view, a bottom view and an orthogonal side view of a tile having a triangle shape, two cutouts for placement of medium sized buttons, and connectors resembling a bone shape.

FIGS. 36A-36D show, respectively, a perspective view, a top view, a bottom view and an orthogonal side view of a tile having a triangle shape, two cutouts for placement of large sized buttons, and connectors resembling a bone shape.

FIGS. 37A-37D show, respectively, a perspective view, a top view, a bottom view and an orthogonal side view of a tile having a triangle shape, three cutouts for placement of small sized buttons, and connectors resembling a bone shape.

FIGS. 38A-38D show, respectively, a perspective view, a top view, a bottom view and an orthogonal side view of a tile having a triangle shape, three cutouts for placement of medium sized buttons, and connectors resembling a bone shape.

FIGS. 39A-39D show, respectively, a perspective view, a top view, a bottom view and an orthogonal side view of a tile having a triangle shape, three cutouts for placement of large sized buttons, and connectors resembling a bone shape.

FIGS. 40A-40D show, respectively, a perspective view, a top view, a bottom view and an orthogonal side view of a tile having a triangle shape, four cutouts for placement of small sized buttons, and connectors resembling a bone shape.

FIGS. 41A-41D show, respectively, a perspective view, a top view, a bottom view and an orthogonal side view of a tile having a triangle shape, four cutouts for placement of medium sized buttons, and connectors resembling a bone shape.

FIGS. 42A-42D show, respectively, a perspective view, a top view, a bottom view and an orthogonal side view of a tile having a triangle shape, four cutouts for placement of large sized buttons, and connectors resembling a bone shape.

FIGS. 43A-43D show, respectively, a perspective view, a top view, a bottom view and an orthogonal side view of a tile having a triangle shape, five cutouts for placement of small sized buttons, and connectors resembling a bone shape.

FIGS. 44A-44D show, respectively, a perspective view, a top view, a bottom view and an orthogonal side view of a tile having a triangle shape, five cutouts for placement of medium sized buttons, and connectors resembling a bone shape.

FIGS. 45A-45D show, respectively, a perspective view, a top view, a bottom view and an orthogonal side view of a tile having a triangle shape, five cutouts for placement of large sized buttons, and connectors resembling a bone shape.

FIGS. 46A-46D show, respectively, a perspective view, a top view, a bottom view and an orthogonal side view of a tile having a triangle shape, six cutouts for placement of small sized buttons, and connectors resembling a bone shape.

FIGS. 47A-47D show, respectively, a perspective view, a top view, a bottom view and an orthogonal side view of a tile having a triangle shape, six cutouts for placement of medium sized buttons, and connectors resembling a bone shape.

FIGS. 48A-48D show, respectively, a perspective view, a top view, a bottom view and an orthogonal side view of a tile having a triangle shape, six cutouts for placement of large sized buttons, and connectors resembling a bone shape.

FIGS. 49A-49D show, respectively, a perspective view, a top view, a bottom view and an orthogonal side view of a tile having a triangle shape, seven cutouts for placement of small sized buttons, and connectors resembling a bone shape.

FIGS. 50A-50D show, respectively, a perspective view, a top view, a bottom view and an orthogonal side view of a tile having a triangle shape, seven cutouts for placement of medium sized buttons, and connectors resembling a bone shape.

FIGS. 51A-51D show, respectively, a perspective view, a top view, a bottom view and an orthogonal side view of a tile having a triangle shape, seven cutouts for placement of large sized buttons, and connectors resembling a bone shape.

FIGS. 52A-52D show, respectively, a perspective view, a top view, a bottom view and an orthogonal side view of a tile having a square shape, zero cutouts for placement of buttons, and connectors resembling a bone shape.

FIGS. 53A-53D show, respectively, a perspective view, a top view, a bottom view and an orthogonal side view of a tile having a square shape, one cutout for placement of small sized buttons, and connectors resembling a bone shape.

FIGS. 54A-54D show, respectively, a perspective view, a top view, a bottom view and an orthogonal side view of a tile having a square shape, one cutout for placement of medium sized buttons, and connectors resembling a bone shape.

FIGS. 55A-55D show, respectively, a perspective view, a top view, a bottom view and an orthogonal side view of a tile having a square shape, one cutout for placement of large sized buttons, and connectors resembling a bone shape.

FIGS. 56A-56D show, respectively, a perspective view, a top view, a bottom view and an orthogonal side view of a tile having a square shape, two cutouts for placement of small sized buttons, and connectors resembling a bone shape.

FIGS. 57A-57D show, respectively, a perspective view, a top view, a bottom view and an orthogonal side view of a tile having a square shape, two cutouts for placement of medium sized buttons, and connectors resembling a bone shape.

FIGS. 58A-58D show, respectively, a perspective view, a top view, a bottom view and an orthogonal side view of a tile having a square shape, two cutouts for placement of large sized buttons, and connectors resembling a bone shape.

FIGS. 59A-59D show, respectively, a perspective view, a top view, a bottom view and an orthogonal side view of a tile having a square shape, three cutouts for placement of small sized buttons, and connectors resembling a bone shape.

FIGS. 60A-60D show, respectively, a perspective view, a top view, a bottom view and an orthogonal side view of a tile having a square shape, three cutouts for placement of medium sized buttons, and connectors resembling a bone shape.

FIGS. 61A-61D show, respectively, a perspective view, a top view, a bottom view and an orthogonal side view of a tile having a square shape, three cutouts for placement of large sized buttons, and connectors resembling a bone shape.

FIGS. 62A-62D show, respectively, a perspective view, a top view, a bottom view and an orthogonal side view of a tile having a square shape, four cutouts for placement of small sized buttons, and connectors resembling a bone shape.

FIGS. 63A-63D show, respectively, a perspective view, a top view, a bottom view and an orthogonal side view of a tile having a square shape, four cutouts for placement of medium sized buttons, and connectors resembling a bone shape.

FIGS. 64A-64D show, respectively, a perspective view, a top view, a bottom view and an orthogonal side view of a tile having a square shape, four cutouts for placement of large sized buttons, and connectors resembling a bone shape.

FIGS. 65A-65D show, respectively, a perspective view, a top view, a bottom view and an orthogonal side view of a tile having a square shape, five cutouts for placement of small sized buttons, and connectors resembling a bone shape.

FIGS. 66A-66D show, respectively, a perspective view, a top view, a bottom view and an orthogonal side view of a tile having a square shape, five cutouts for placement of medium sized buttons, and connectors resembling a bone shape.

FIGS. 67A-67D show, respectively, a perspective view, a top view, a bottom view and an orthogonal side view of a tile having a square shape, five cutouts for placement of large sized buttons, and connectors resembling a bone shape.

FIGS. 68A-68D show, respectively, a perspective view, a top view, a bottom view and an orthogonal side view of a tile having a square shape, six cutouts for placement of small sized buttons, and connectors resembling a bone shape.

FIGS. 69A-69D show, respectively, a perspective view, a top view, a bottom view and an orthogonal side view of a tile having a square shape, six cutouts for placement of medium sized buttons, and connectors resembling a bone shape.

FIGS. 70A-70D show, respectively, a perspective view, a top view, a bottom view and an orthogonal side view of a tile having a square shape, six cutouts for placement of large sized buttons, and connectors resembling a bone shape.

FIGS. 71A-71D show, respectively, a perspective view, a top view, a bottom view and an orthogonal side view of a tile having a square shape, seven cutouts for placement of small sized buttons, and connectors resembling a bone shape.

FIGS. 72A-72D show, respectively, a perspective view, a top view, a bottom view and an orthogonal side view of a tile having a square shape, seven cutouts for placement of medium sized buttons, and connectors resembling a bone shape.

FIGS. 73A-73D show, respectively, a perspective view, a top view, a bottom view and an orthogonal side view of a tile having a square shape, seven cutouts for placement of large sized buttons, and connectors resembling a bone shape.

FIGS. 74A-74D show, respectively, a perspective view, a top view, a bottom view and an orthogonal side view of a tile having a hexagonal shape, zero cutouts for placement of buttons, and connectors resembling a bone shape.

FIGS. 75A-75D show, respectively, a perspective view, a top view, a bottom view and an orthogonal side view of a tile having a hexagonal shape, one cutout for placement of small sized buttons, and connectors resembling a bone shape.

FIGS. 76A-76D show, respectively, a perspective view, a top view, a bottom view and an orthogonal side view of a tile having a hexagonal shape, one cutout for placement of medium sized buttons, and connectors resembling a bone shape.

FIGS. 77A-77D show, respectively, a perspective view, a top view, a bottom view and an orthogonal side view of a tile having a hexagonal shape, one cutout for placement of large sized buttons, and connectors resembling a bone shape.

FIGS. 78A-78D show, respectively, a perspective view, a top view, a bottom view and an orthogonal side view of a tile having a hexagonal shape, two cutouts for placement of small sized buttons, and connectors resembling a bone shape.

FIGS. 79A-79D show, respectively, a perspective view, a top view, a bottom view and an orthogonal side view of a tile having a hexagonal shape, two cutouts for placement of medium sized buttons, and connectors resembling a bone shape.

FIGS. 80A-80D show, respectively, a perspective view, a top view, a bottom view and an orthogonal side view of a tile having a hexagonal shape, two cutouts for placement of large sized buttons, and connectors resembling a bone shape.

FIGS. 81A-81D show, respectively, a perspective view, a top view, a bottom view and an orthogonal side view of a tile having a hexagonal shape, three cutouts for placement of small sized buttons, and connectors resembling a bone shape.

FIGS. 82A-82D show, respectively, a perspective view, a top view, a bottom view and an orthogonal side view of a tile having a hexagonal shape, three cutouts for placement of medium sized buttons, and connectors resembling a bone shape.

FIGS. 83A-83D show, respectively, a perspective view, a top view, a bottom view and an orthogonal side view of a tile having a hexagonal shape, three cutouts for placement of large sized buttons, and connectors resembling a bone shape.

FIGS. 84A-84D show, respectively, a perspective view, a top view, a bottom view and an orthogonal side view of a tile having a hexagonal shape, four cutouts for placement of small sized buttons, and connectors resembling a bone shape.

FIGS. 85A-85D show, respectively, a perspective view, a top view, a bottom view and an orthogonal side view of a tile having a hexagonal shape, four cutouts for placement of medium sized buttons, and connectors resembling a bone shape.

FIGS. 86A-86D show, respectively, a perspective view, a top view, a bottom view and an orthogonal side view of a tile having a hexagonal shape, four cutouts for placement of large sized buttons, and connectors resembling a bone shape.

FIGS. 87A-87D show, respectively, a perspective view, a top view, a bottom view and an orthogonal side view of a tile having a hexagonal shape, five cutouts for placement of small sized buttons, and connectors resembling a bone shape.

FIGS. 88A-88D show, respectively, a perspective view, a top view, a bottom view and an orthogonal side view of a tile having a hexagonal shape, five cutouts for placement of medium sized buttons, and connectors resembling a bone shape.

FIGS. 89A-89D show, respectively, a perspective view, a top view, a bottom view and an orthogonal side view of a tile having a hexagonal shape, five cutouts for placement of large sized buttons, and connectors resembling a bone shape.

FIGS. 90A-90D show, respectively, a perspective view, a top view, a bottom view and an orthogonal side view of a tile having a hexagonal shape, six cutouts for placement of small sized buttons, and connectors resembling a bone shape.

FIGS. 91A-91D show, respectively, a perspective view, a top view, a bottom view and an orthogonal side view of a tile having a hexagonal shape, six cutouts for placement of medium sized buttons, and connectors resembling a bone shape.

FIGS. 92A-92D show, respectively, a perspective view, a top view, a bottom view and an orthogonal side view of a tile having a hexagonal shape, six cutouts for placement of large sized buttons, and connectors resembling a bone shape.

FIGS. 93A-93D show, respectively, a perspective view, a top view, a bottom view and an orthogonal side view of a tile having a hexagonal shape, seven cutouts for placement of small sized buttons, and connectors resembling a bone shape.

FIGS. 94A-94D show, respectively, a perspective view, a top view, a bottom view and an orthogonal side view of a tile having a hexagonal shape, seven cutouts for placement of medium sized buttons, and connectors resembling a bone shape.

FIGS. 95A-95D show, respectively, a perspective view, a top view, a bottom view and an orthogonal side view of a tile having a hexagonal shape, seven cutouts for placement of large sized buttons, and connectors resembling a bone shape.

FIGS. 96A-96D show, respectively, a perspective view, a top view, a bottom view and an orthogonal side view of a hexagonal tile that can accommodate two different sizes of buttons, and connectors resembling a bone shape.

FIGS. 97A-97D show, respectively, a perspective view, a top view, a bottom view and an orthogonal side view of a hexagonal tile that can be disassembled into six separate kite shaped pieces, with each piece having four connectors resembling a bone shape.

FIGS. 98A-98D show, respectively, a perspective view, a top view, a bottom view and an orthogonal side view of a hexagonal tile that can accommodate two different sizes of buttons.

FIGS. 99A-99D show, respectively, a perspective view, a top view, a bottom view and an orthogonal side view of a hexagonal tile that can be disassembled into 6 separate kite shaped pieces, with each piece having 4 connectors resembling a bone shape.

The boards are designed to be placed next to, or attached, to each other, permitting the boards' expansion. A top view of the layout of the hexagonal board and the cutouts (spaces or indentations) to accommodate the buttons is presented in, for example, FIGS. 2A-2B and 3.

Compactness

In Christina Hunger's videos, the layout she presents of the buttons is a square-based Cartesian grid, in which every button is an equal distance from the ones above, below and to the left and right sides. While this allows for space for the dog to move within the grid, the distribution is inefficient, limiting the amount of buttons that can be usefully placed within a given area. As a dog's vocabulary grows, a Cartesian grid interface quickly expands to become too big to be practicably useful in most settings. Furthermore, a Cartesian grid does not lend itself to an organizational structure easily used by dogs.

Figure 8:
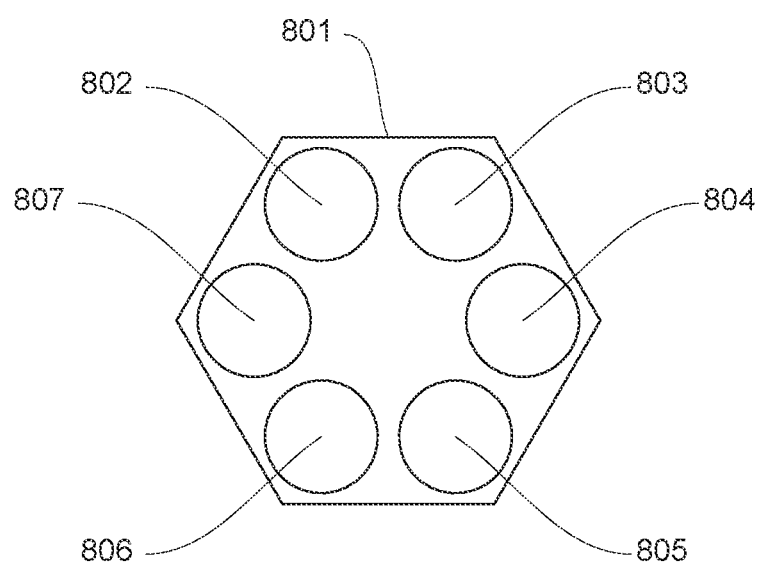
FIG. 8 is a hexagonal grid (tiled) with holes for button placement.
Figure 9A:
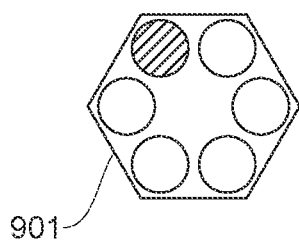
FIGS. 9A-9F are hexagonal grids showing utilization of a variety of numbers of buttons.
Figure 9B:
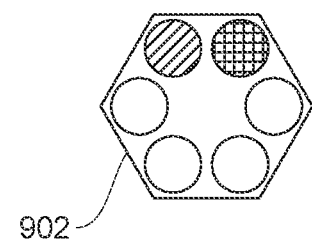
Figure 9C:
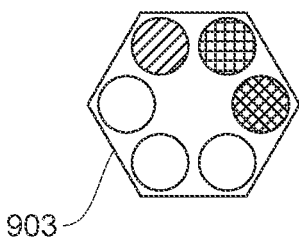
Figure 9D:
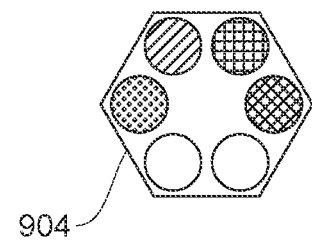
Figure 9E:
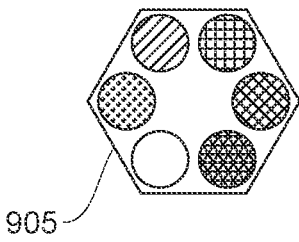
Figure 9F:
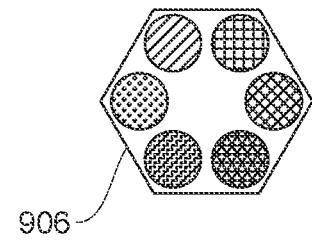

The FluentPet Board's hexagonal layout permits a high density of buttons within a given area while still allowing spaces in which the dog can walk and stand, as depicted in FIG. 8. Buttons 802-807 can be placed in immediate proximity to each other around the edge of the hexagon board 801, while providing space in the middle for a dog's paw to be located. In another embodiment, the open space in the center of the six buttons can accommodate a button. If this occurs, it may be necessary to add additional margin around the button edges.

In FIGS. 9A-9F, we see depicted how buttons can be gradually added to a single word board, with 901 indicating a board with one button, 902 indicating a board with two buttons, 903 indicating a board with three buttons, 904, indicating a board with four buttons, 905 indicating a board with five buttons, and 906 indicating a board with six buttons.

Figure 11A:
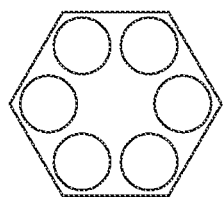
FIGS. 11A-11F are diagrams showing an exemplary build-out of a plurality of interconnected tiles according to an embodiment of the invention.
Figure 11B:
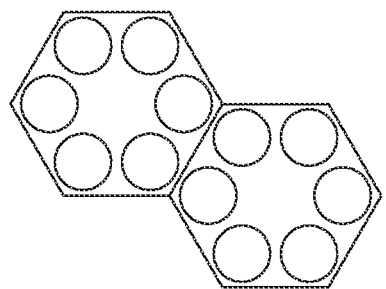
Figure 11C:
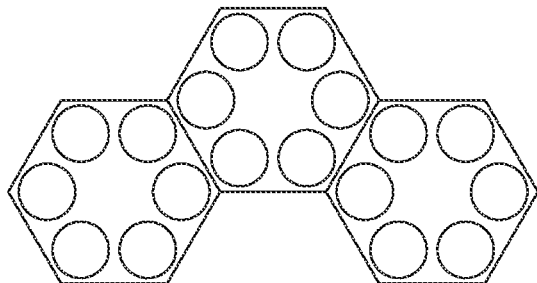
Figure 11D:
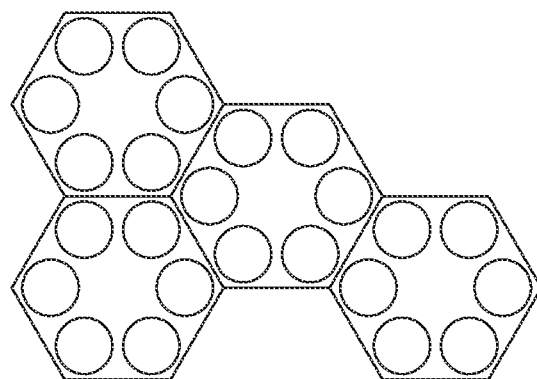
Figure 11E:
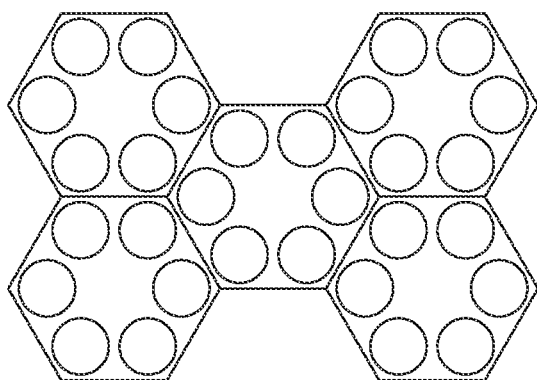
Figure 11F:
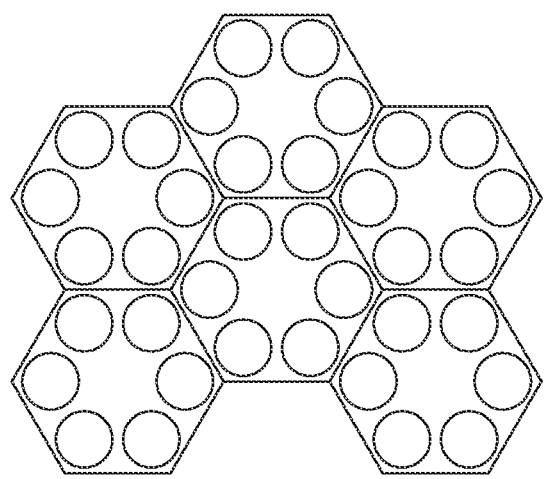
Figure 12:
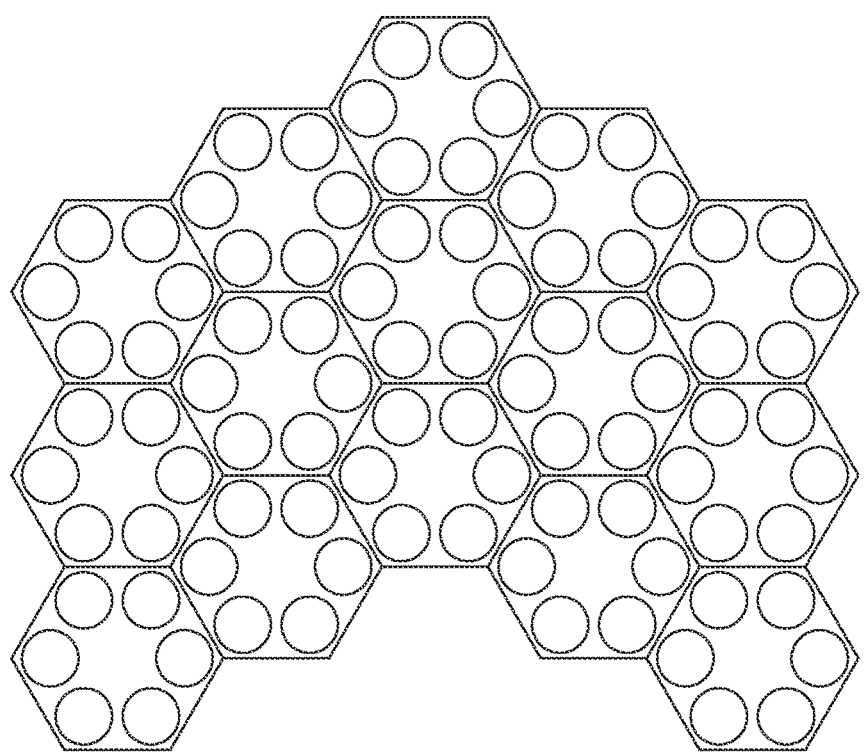
FIG. 12 is a diagram showing an exemplary arrangement of numerous hexagonal tiles according to an embodiment of the invention.

Additional boards with buttons can easily be added to the six adjacent sides of the board while preserving the compact layout of the buttons (see e.g., FIG. 12). By gradually adding boards while preserving the organization of the others, disruption of the dog's representation of the already learned buttons can be minimized. In addition, boards can be added so that the distance between newly added buttons is minimized, and a central, primary area is preserved. For example, beginning with FIG. 11A, we can add another board to the bottom right (FIG. 11B), and then continue to preserve the overall intrinsic orientation of the layout by subsequently adding a board to the bottom left (FIG. 11C). By subsequently adding a board to the top left (FIG. 11D) and the top right (FIG. 11E), the overall orientation of the boards' layout remains preserved. By adding another board in the top location FIG. 11F), a six board layout has been completed while minimizing disruption to a dog's board layout mental representation.

The utility of this layout is recognized, for example, in the hexagonal grid layout used by the Apple Watch—in their case, there is no clear semantic meaning associated with the button images' layout, and it is likely that the hexagonal grid was instead used because it allows for a denser layout of circles.

Learnability

The square Cartesian grid design provides very few cues to facilitate learning. Dogs must memorize the location of buttons distributed seemingly at random around a grid of arbitrary size. The lack of organization imposes a high cognitive load, which rapidly increases as the number of words to be remembered increases.

Figure 13:
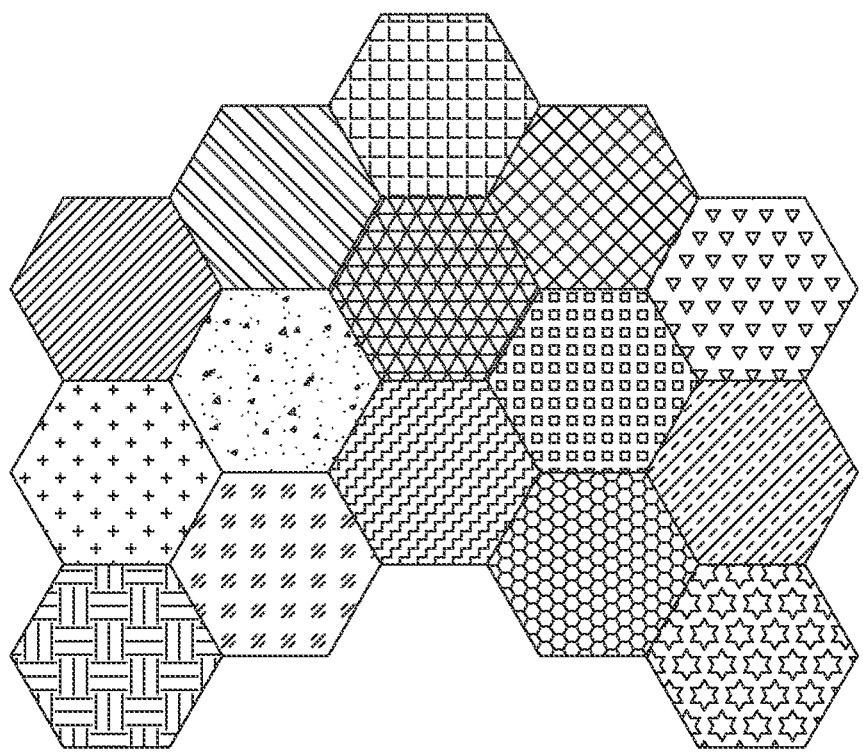
FIG. 13 is a diagram showing an exemplary arrangement of numerous different hexagonal tiles with patterns according to an embodiment of the invention.

By distributing the buttons 211-216 on a series of hexagonal tiles 201-206 (see FIG. 2A), the FluentPet Board provides numerous strongly disambiguating spatial cues. In addition to the Cartesian X, Y coordinates currently used, buttons can be distinguished by their angle relative to each other on a single board (polar coordinates), and by a multi-scale "addressing" through identification of the board that the buttons are on. Different boards can be identified using a range of cues, for example the board's color, shape, smell, texture, pattern, or a flag or other vertically protruding cue may be used to distinguish one board from another (see e.g., FIG. 13). The board's visual appearance can additionally be distinguished through the addition of a descriptive image on the board, or a word.

In another embodiment, some or all of each of one or more of the buttons, tiles, or other items may be scented, as smell is a far more important sense to dogs than to humans. There are a variety of scent organizations that are beneficial. For example, each tile may have a general scent category. For example, a tile for social words 201 may be scented florally, with each specific social word button (i.e. 260, 211) given a different floral scent. A tile for verbs 203 may be scented with a grass scent, and each verb button given a specific scent of a kind of grass, such as rye grass for "run" or bluegrass for "sit". By grouping word categories by scent category, the tiles may be utilized in the dark or by a visually impaired dog. It may also facilitate quicker learning of the tiles. It should be understood that the tile itself need not have a master scent in some implementations. In others, the tile may have a scent but the buttons may not.

Given the differential olfactory capabilities of dogs and humans, dogs may have scent categories that may be difficult or impossible for humans to fully understand, in that they likely do not map to the brain in the same way that human's less capable olfactory capabilities do.

In one embodiment, an apparatus is designed to allow dogs to create their own scent groupings. One approach would be to place a plurality of buttons on a surface, such as a tile. The tile in this case might be set to slowly rotate so that the button positioning relative to the dog is not fixed. A particular smell ("Smell X") is present and perceptible to the dog, whether on the tile, a button, a separate item, or otherwise. Smell X is applied to one or more buttons. When the dog presses a button with Smell X, the dog receives a reward. Smell X may then be modified slightly, such as by aging, intermixing with a small amount of another smell or otherwise, to form Smell $X_1$. When the dog presses the button for smell $X_1$, the dog is rewarded. This may be iterated with a plurality of modifications to smell X. In this way, the dog is trained such that it believes pressing a button with a similar smell to a primary smell is rewarded. Once so trained, the dog may then be presented with a new primary smell and a variety of smells on a variety of buttons. The dog, having been trained to do so, will press the button or buttons with smells that the dog perceives as similar or adjacent.

In one embodiment, a scent collection device, such as "The Madeline" (see https://www.theguardian.com/artand-design/architecture-design-blog/2013/jun/28/scentography-camera-records-smells-memory) may be utilized to capture scents and the captured scents then used in conjunction with the buttons.

Figure 7:
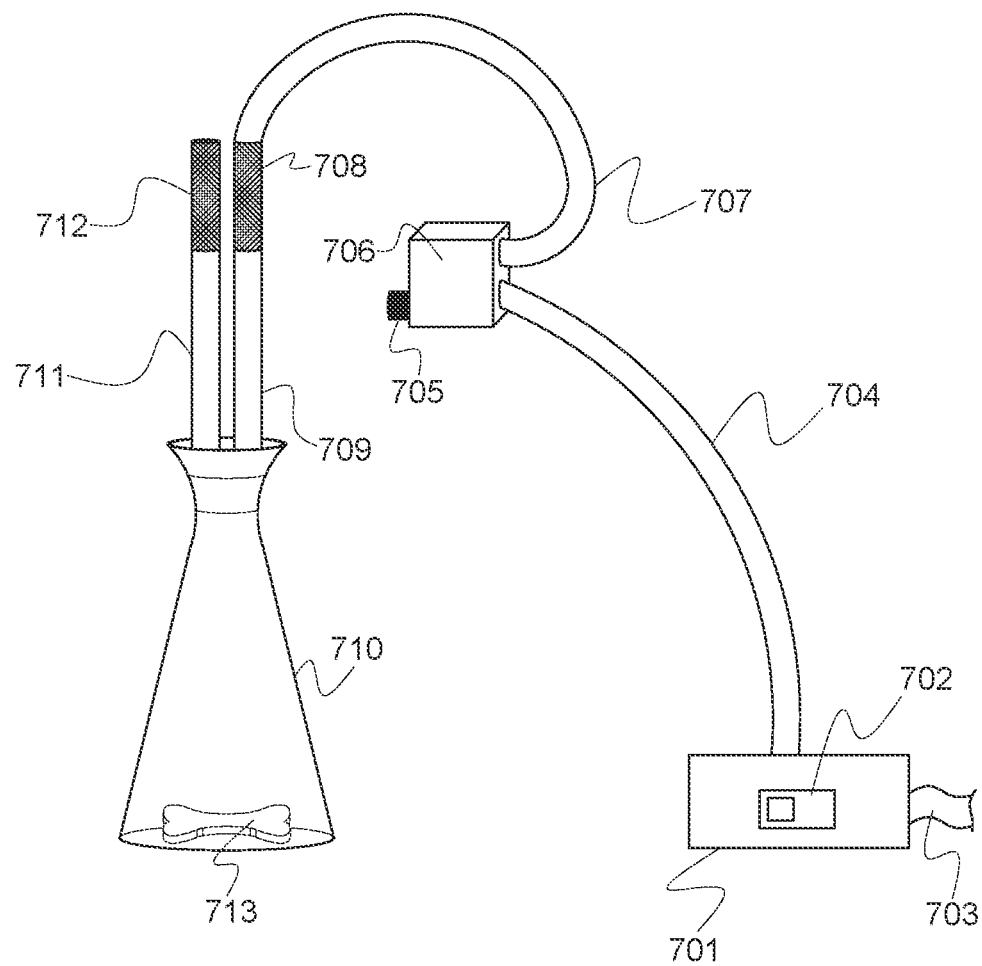
FIG. 7 is a drawing of an absorbent scent capturing device.

Turning to FIG. 7, we present a device that may be utilized to extract and/or release scents. An air pump 701 is actuated by a switch (which may be binary, a potentiometer, a computer-controlled flow controller, etc.). Air enters through an intake 703 and is transferred to a gas conduit 704. The gas conduit 704 optionally enters flow regulator 705 and/or flow meter 706 before returning to a second gas conduit 407. The gas then enters a filter 708 where scents are isolated. In one embodiment the filter is zeolite. If collecting ambient scents, the flow terminates at filter 708. Filter 708 may then be used as a scent source. In one embodiment, a scented object may be placed in front of intake 703, allowing collection of scent from a specific source without requiring the equipment following filter 708. However, ambient scents may intermix with the scent emanating from the scented object.

In another embodiment, filter 708 removes some or all of the scent from the gas before passing the less scented gas through conduit 709 and into a chamber 710 containing a source of one or more scents 713, such as a bone, socks, or grass. The newly scented gas then transits conduit 711 to filter 712. In one embodiment, filter 712 is a zeolite filter and may adsorb scent.

The filters 712 and 708 may be a gel, matrix, foam, liquid or other substance that can adopt an emissive or attractive state. Electrostatic energy or heat may be utilized for this purpose.

It is possible to develop scent categories utilizing an examination of the olfactory receptive fields of dogs, although for ethical reasons that may not be practicable. Similarly, one can look at the connectivity structures involved to make deductions as to categories perceptible as such by dogs. Abstract scent relationships may be difficult to associate, and may be approximated by using ecological cues.

In one implementation, the buttons may contain little fans (which term includes for this purpose other air movement devices or scent release devices as well as heat, pressure or partial vacuum) in the buttons that contain pieces of smell-triggers (scents of known dogs, locations, people, toys) that can be turned on to get more of the scent to the dog. Such smell-triggers may comprise the filter 708 or 712. Such fans may be triggered by proximity of the dog.

An embodiment may also be to tie time to scent explicitly by having a "yesterday" button that captures an average smell of a "today" day while re-presenting the smell of the previous day, swapping over the following day, indeed, one could have an array of such time-oriented buttons/smells, all representing days (or months, or years) further in the past. This design leverages a cognitive science approach. Alexandra Horowitz has hypothesized that dogs have a distinct sense of time that's smell driven, being able to tell how long it has been since someone was last in a room, and noticing the gradual change in their potency of their scent over time.

It is possible that the most promising smell-based dog communication technology will make use of the smells of different environments themselves. Having a plurality of little devices, such as balls, that the operator could bring with them to different locations to capture the smells of them. This may incorporate the Madeline technology and/or a miniaturized version of some or all of the elements shown in FIG. 7. The devices may be able to pull in air with smells from which smells could get embedded into a filter or gel or liquid, and then subsequently when the flow is reversed emit the same smell. Such a device could be quite useful if connected to a dog language sound board.

In one embodiment, the scent capture system is used in conjunction with animals (or other sensors) that are capable of detecting medical issues. For example, some canines are able to detect and alert to a smell indicating the presence of cancer, COVID-19, or other condition. However, it is not always possible to bring the canine to the patient or the patient to the canine. By capturing the scent and shipping it for analysis by the dog (or other sensor), scent-based animal diagnosis is made possible.

For further discussion, see the Scent Gathering section herein.

A major advantage of the proposed design is that it permits a natural semantic expansion outward from a center board along the horizontal axis 102, 104, the vertical axis 103, and diagonal axes 112, 113, 114, 116, 117, 118 as shown in FIG. 1B, enabling greater opportunities for spatial-association-driven semantic learning. By using an as-needed hexagonal tile for the boards, the set of words the dog chooses from only includes those the dog already knows, making the process of learning and expression easier. Further, memorization by the dog is made easier through the provision of multiple mutually supporting cues: memorization can proceed thanks to the identity of the tile, the location of the tile relative to the center, and the location of the tile relative to the ones near it. The board's spatial context itself can support understanding, memory, or generalization of the meaning of the buttons for the dog to press via the meaning of adjacent groupings.

Figure 10:
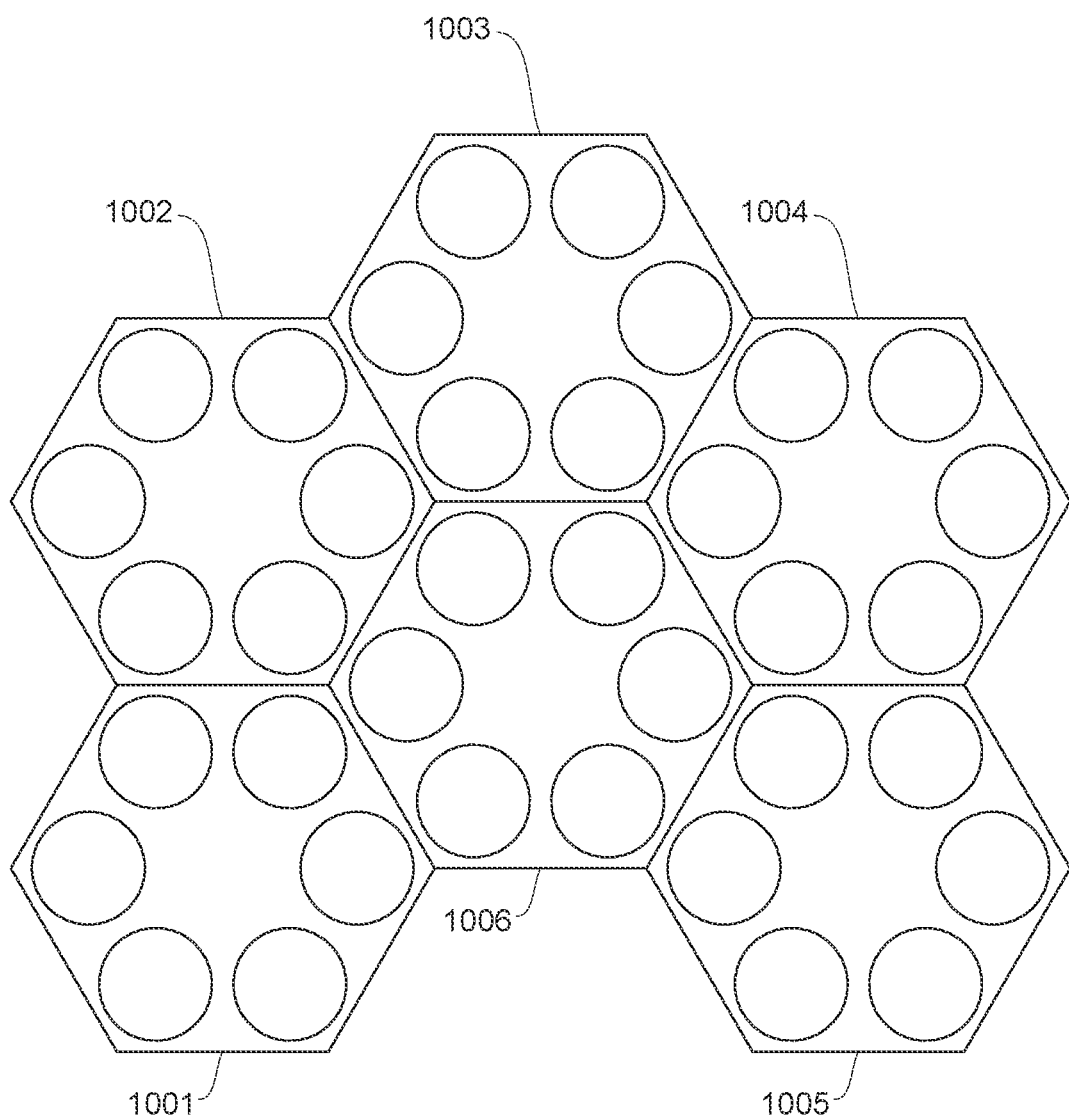
FIG. 10 is an exemplary diagram of six tiles organized by word category according to an embodiment of the invention.

For example, in FIG. 10, a button for the word "help" may be located at the far left of tile 1006, a button for "look" may be located at the bottom right of tile 1002 and a button for "Person 1" (primary guardian) may be located at the top right of tile 1001, thus yielding buttons that are all immediately adjacent while being on different tiles, conferring a sense that the buttons have related, but nonetheless importantly distinct, meanings. "Help" is a personal expression of need, "look" is asking a person to take an action, and "person 1" is usually the target of requests for help. They are, however, on different tiles, so while they are semantically related to each other, the fact that they are each within their own group implies that they are "similar, but different" and further demonstrates the manner in which they are different. The same applies to a button for "eat", which may be at the far right side of tile 1006, a button for "good", which may be at the bottom left of tile 1004, and a button for "yes", which may be at the top left of tile 1005 Similarly, we may place a button for "park", which may be at bottom left of tile 1003, a button for "play", which may be at the far right of tile 1002, and a button for "outside", which may be at the top right of tile 1006.

Other groupings may bear a semantic relationship with each other that is less semantically close: "play", "park", and "outside" are all things that the dog likes, but their semantic relationship doesn't go much further than this—because the mapping corresponds to the contingent idiosyncrasies of the world, it is likely impossible for every physical button spatial, location-based association to correspond to a rich semantic one. The layout is not intended to be "perfect", but instead to speed up and facilitate learning and word knowledge expansion. The board makes use of semantic similarities in its organization as well: "no", a button for which may be located at the bottom right of tile 1006, and "bye", a button for which may be located at the far left of tile 1005, but nonetheless adjacent to the button for the word "no" on tile 1006; "bed", a button for which may be located at the far right of tile 1003 and "later," a button for which may be located at the top left of tile 1004, but nonetheless located adjacent to the button for the word "bed" on tile 1003; "happy", a button for which may be located at the bottom right of tile 1004, and "friend", a button for which may be located at the top right of tile 1005, but nonetheless located adjacent to the button for the button for the word "happy" on tile 1004; and "want", a button for which may be located at the bottom left of tile 1006, and the dog's name, a button for which may be located at the far right of tile 1001, but nonetheless located adjacent to the button for the word "want" on tile 1006. These location-enhanced semantic associations are accomplished while minimizing the physical space required for the buttons, since the empty place in a tile center can be a space in which a dog may place his or her feet.

In one embodiment, a dog may be trained to communicate using the tiles and buttons, whether before or after an event. The dog may then provide either confirmatory/non-confirmatory responses or even a narrative as to events that the dog has witnessed. For example, in an animal cruelty case, a dog may be trained to learn the words "they" (as a pronoun regardless of gender identity), "kick", "hit", "me", "not", and "did". The dog might also be trained to give identifying characteristics, such as "mustache", "male", "female", etc. While it is anticipated that the various tests for admissibility of evidence may take a long time to accept dog testimony in court, it may be treated in the same way as a lie detector test. That is, it may help investigators to rule in or rule out possible suspects.

Further to this embodiment, the buttons may be laid out using a combination of cognitive behavioral science and forensic science. Words related to descriptions may be grouped together, words related to events grouped together, etc. In another embodiment, a dog may be trained to communicate rudimentary terms used by sketch artists and may even drive composition of a sketch of a suspect.

In the brain, semantically similar concepts are often co-located. Since the brain's organization is well-described as a series of two-dimensional maps, similarly organizing a linguistic semantic space simplifies the memorization process.

Figure 6:
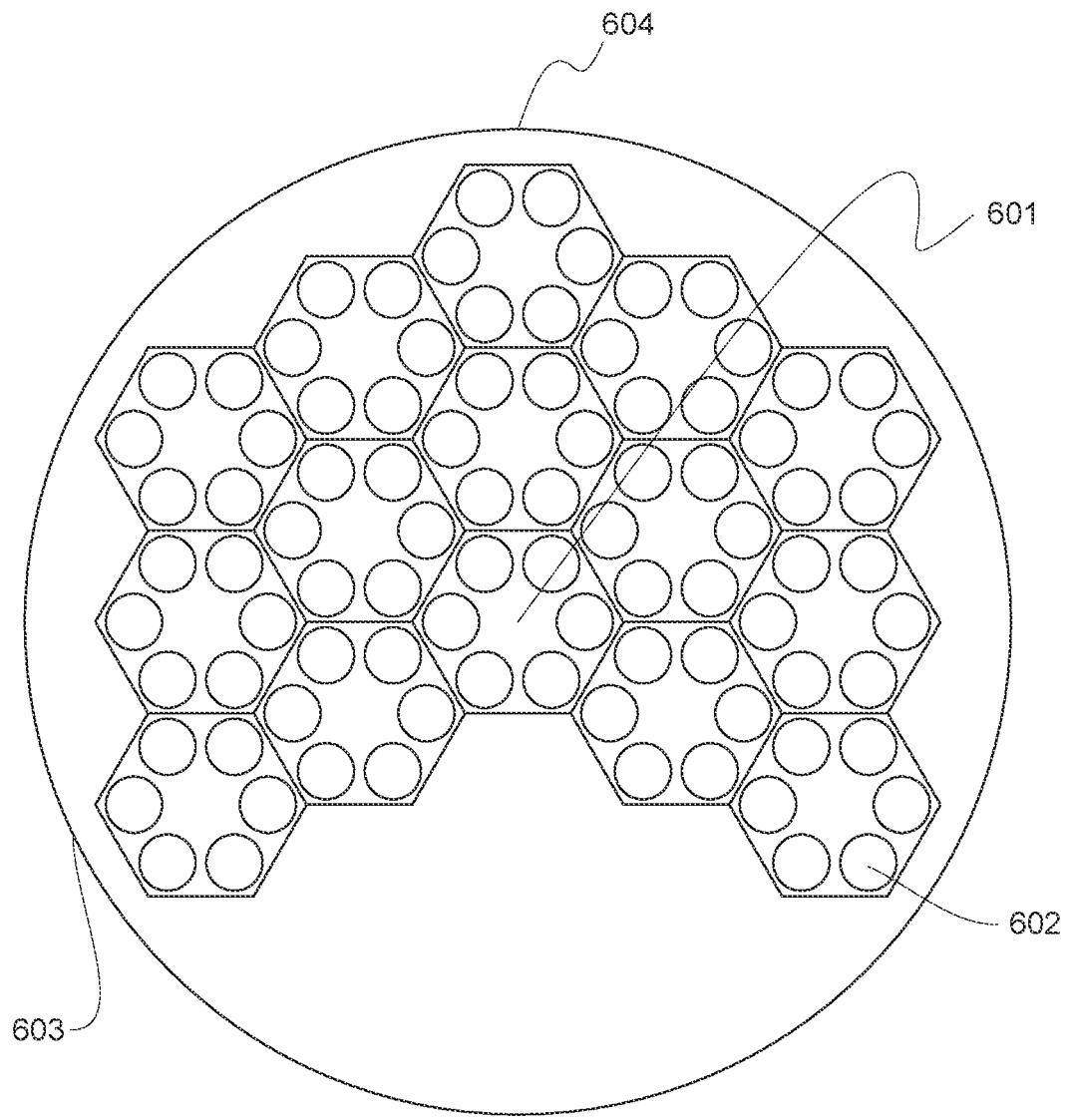
FIG. 6 is a color wheel with semantic grid overlaid, where rotation around the color wheel can refer to different kinds of words.

Recreational board games (such as Heroscape) often use "hex" tiles because they naturally fill a space while enabling direct expansion along the diagonal. In the context of the distribution of tiles, outward-from-center expansion can mean something akin to "same class of meanings, but more so", while radial expansion clockwise/counter-clockwise changes the class of meanings entirely. This is analogous to color specification using polar coordinates: hue can be specified by the location around a clock-face, while distance from the center can refer to saturation (color intensity). As roughly depicted in FIG. 6, rotation around the color wheel (e.g., from 603 to 604) may be thought of as referring to entirely different kinds of words. Movement out from center 601 may be thought of as an increase in intensity/saturation. In the case of semantics, this is best thought of as greater detail, specificity, elaboration, etc. This is equivalent to the meaning of words being mapped to a polar coordinate axis, in which amplitude corresponds to meaning specificity, and rotation corresponds to semantic category. Thus, a button

602 located toward an outer edge of the wheel may be highly detailed, specific or elaborate.

This is also analogous to the structure of the brain itself, in which primary auditory, visual, motor, and somatosensory cortex are all distributed on a single "sheet" of cortex. In addition, the design corresponds to the hexagonal layout of "grid cells" in the brain, cells believed to underlie the representation of space in most mammals. Grid cells are further described on http://www.scholarpedia.org/article/Grid_cells as follows: "A grid cell is a place-modulated neuron whose multiple firing locations define a periodic triangular array covering the entire available surface of an open two-dimensional environment. Grid cells are thought to form an essential part of the brain's coordinate system for metric navigation. They have attracted attention because the crystal-like structure underlying their firing fields is not imported from the outside world, but created within the nervous system. Understanding the origin and properties of grid cells is an attractive challenge for anybody wanting to know how brain circuits compute."

As dogs and their people are getting started with the hexagonal board system, they can use a single board, adding boards (e.g. as presented in FIGS. 9A-9F and 11A-11F), as needed. In one embodiment, in order to maximize disambiguation and speed up learning or for other reasons, the additional tiles can be placed even before the others have been filled. In one embodiment, the tiles and buttons can be grouped into a set that includes all the six tiles found in FIG. 10.

In one aspect, the tiles themselves can be multi-colored (see FIG. 13) to serve as mnemonic and semantic cues, and could even have within them the image of the kind of information to which they're referring, with each of the buttons also showing a symbol that refers to the word that's being spoken.

Ease of Use

The square Cartesian layout, in which buttons have larger spaces between them, requires that the dog engage in significant movement in order to produce sounds.

By adding buttons to the proposed board design in the sequence presented in FIG. 9A-9F, the buttons continue to present a convenient interface that "wraps" around the dog, minimizing movement required to shift from one touchpad to the other.

Further, the Cartesian layout currently in use requires that a dog move their entire body in random and unpredictable directions around the board. Dogs are often less aware of their hind legs, and thus there is greater risk of accidentally pressing a button when too much movement around the board is required. This causes the dog to have to expend more energy, and fails to take advantage of the natural structure of language. This likely also impedes the dog's desire to be creative, and their ability and confidence in how multi-word constructions should be created.

With the hexagonal board design described here, once a board has been filled with buttons (which occurs once the dog has learned them), additional boards can be added as depicted in FIG. 11A-11F. These boards are designed to have a multi-scale semantic structure, and semantics are marked both by which board a word is on, and where on the board it is. Words that are often used together, but which are in different word categories, are located on different boards, but ideally closer to each other.

Figure 5A:
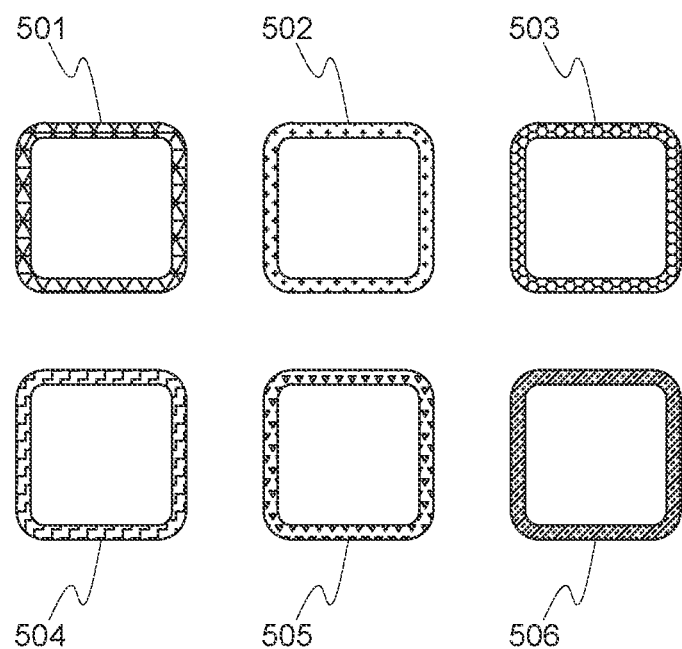
FIG. 5A is a diagram of the Fitzgerald Key.
Figure 5B:
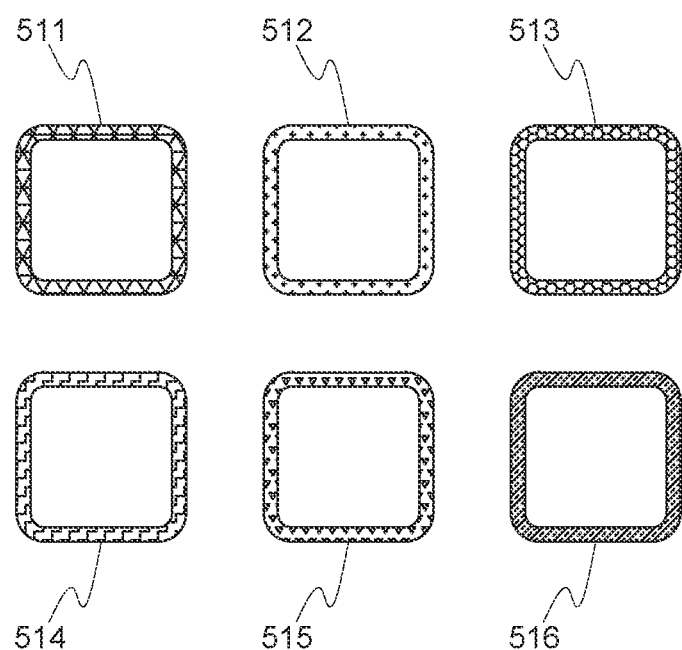
FIG. 5B is a diagram of a modified Fitzgerald key.

The overall organization is designed to support word order as is found in human language, partially corresponding to the layout of a "Fitzgerald Key" or a modified "Modified Fitzgerald Key" (see FIG. 5A and FIG. 5B, respectively), commonly used by speech language pathologists as they try and develop a communication strategy for a non-verbal human. In the Fitzgerald Key of FIG. 5A, box 501 represents people and pronouns, box 502 represents nouns (things), box 503 represents verbs (actions), box 504 represents descriptions (adjectives and adverbs), box 505 represents social, and box 506 represents miscellaneous). In the Modified Fitzgerald Key, box 511 represents people and pronouns, box 512 represents nouns (things), box 513 represents verbs (actions), box 514 represents descriptions (adjectives and adverbs), box 515 represents prepositions (e.g., on, with, by, etc.) and box 516 represents miscellaneous including social.

That the hexagonal structure is not used by Christina Hunger, a person having ordinary skill in the art who herself chose to use a plain Cartesian grid, is indicative that this layout is non-obvious. Indeed, a search through the literature revealed no word boards that use an expandable hexagonal approach: all use only a standard square, and usually fairly static grid.

Location Independence

At first, buttons are learned by association. For example, "outside" can be learned by placing the button close to the door that the dog would like to use to go out. Once an association has been learned, the button can be added to the group of other buttons.

The current Cartesian layout of buttons does not permit easy or natural addition of buttons. For instance, if the Cartesian grid is 3×3 buttons, absent other cues, adding 3 buttons from one side or the other immediately leads to ambiguity as to the side to which the buttons were added.

Through the use of the board described here, the hexagonal boards can be separated while, through the dog's learning of the identity of the boards themselves, preserving the meaning of the buttons on the boards. For example, a board that names different toys can be placed in a room in which there are toys. This board can be used independently of the larger complex of boards.

As noted above, the training method used involves placement of the buttons in different locations around the house, to facilitate the development of associations by the dog. Dogs and their trainers then experience a challenge when the buttons are centralized. Through the use of independent, easily moved tiles, a training method is enabled whereby the buttons can be first placed immediately adjacent to the object that the trainer would like the dog to learn the meaning of (e.g. "water"), and then once the meaning is learned, the buttons can be added to a tile proximal to the referent of the concept be learned (the water bowl), and then the entire tile can subsequently be then placed elsewhere while preserving the association the dog learned through the dog's learning of the identity of the tile and the placement of the button on it.

The use of movable tiles also permits the reverse: the tiles can be shifted elsewhere, or separated, or copied while still preserving the dog's association of meaning to each of the buttons through the dog's contextual knowledge of the tile's identity and the meaning conferred by the button on the tile (based on the button's location on the tile). In one embodiment, each tile used in the home is identifiable by a unique texture. In another embodiment, each tile is identifiable by a visual pattern on the tile, in yet another embodiment, the tile is identifiable by an embedded smell. In another embodiment, each tile is identifiable to the dog by its color. In another embodiment, the tile is identifiable by a unique pattern of lights that the tile displays. In another embodiment, the tile is made of a different material. In yet another embodiment, tile identity information is presented to the dog by combining one or more of the above features, thereby providing a range of distinguishing cues of which dogs may avail themselves.

Tile Orientation and Attachment

In order to improve ease of use for the dog, the board can have a visual orientation cue that disambiguates which orientation the board is in. In one embodiment, this cue could be a gap or marker along one side of the board. In another, it may be a color on one side of the board, or a color gradient, or a texture gradient, or asymmetrically distributed lights, or an asymmetric logo in the middle of the board.

The tiles can be semi-permanently attached to one-another. In one embodiment, they may be joined in a way that would allow them to be folded along the joining line.

In another embodiment, the tiles can be joined through the use of flat rope hinges. In other embodiments, seat buckle material, metal, plastic, rubber, or Tyvek could also be used. The hinges may run the entire length of one side, or may be paired. They may be removable, and potentially affixed from one button indentation to the other (so as to hide their attachment points).

In another embodiment, the tiles can be connected to each other gaps and inserts, perhaps made of the same material as the tile, that then hold the tiles together.

By appropriately choosing the sides of the tiles to locate the hinges on, the tiles can be made to stack indefinitely high for transportation or storage. The hinges are designed to be easy to add-to and remove, for instance by using snaps or Velcro. Velcro, strong magnets, snaps, or other such things can also be used to keep the tiles affixed to each other. The actual distribution and spacing of the buttons can be adjusted to ensure that every different size of dog can easily navigate the semantic "world" their guardian is helping them create.

Figure 14:
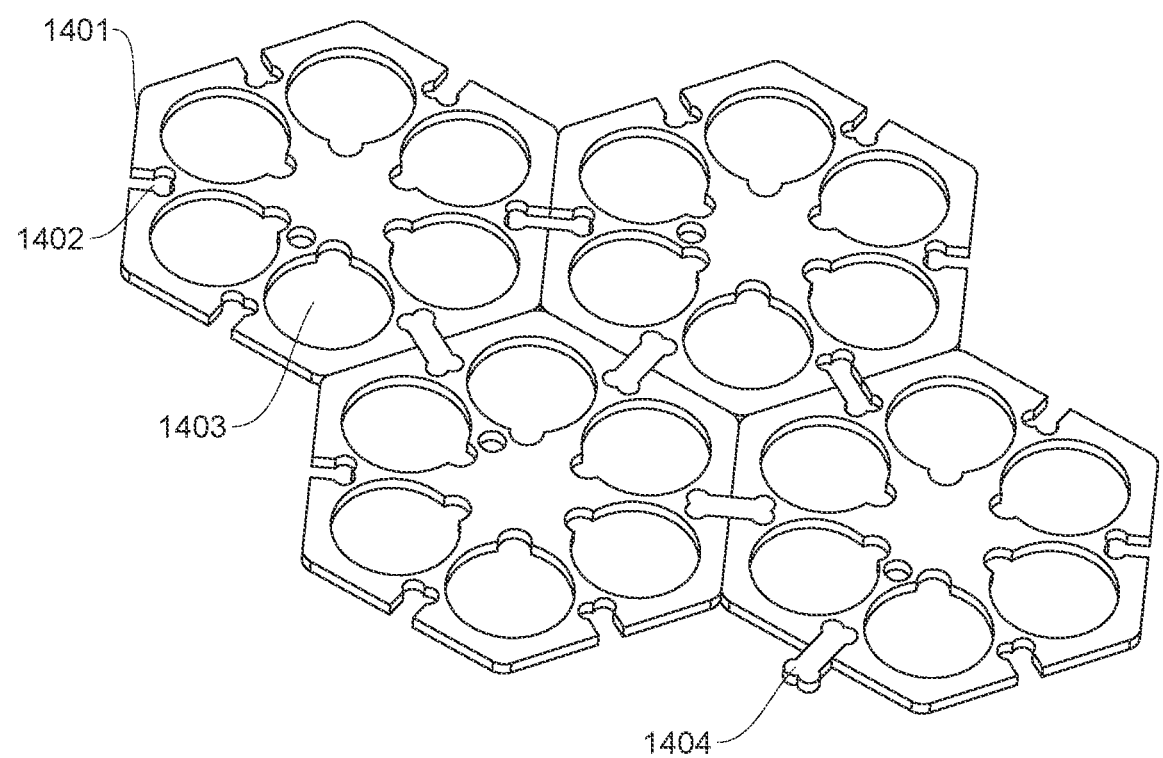
FIG. 14 is a perspective view showing tiles and interconnections.
Figure 99A:
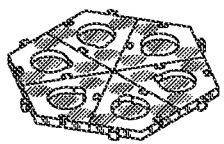
FIGS. 99A-99D show, respectively, a perspective view, a top view, a bottom view and an orthogonal side view of a hexagonal tile that can be disassembled into six separate kite shaped pieces, with each piece having 4 connectors resembling a bone shape, according to an embodiment of the invention.
Figure 99B:
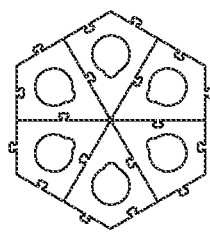
Figure 99C:
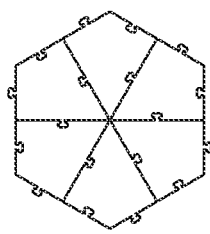
Figure 99D:
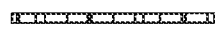

The exact layout and sizing of the hexagons and indentations can vary depending on the size of the buttons they are designed for, the size of the space they should occupy, and the size of the dog who will be using it, among other considerations. FIG. 14 shows an embodiment of an arrangement of hexagonal boards (e.g. board 1401) that accommodate a number of different features. In the embodiment of FIG. 14, hexagonal board 1401 has connector cutouts 1402 in a half bone shape that accommodate a bone-shaped connector (e.g., connector 1404). Additionally, hexagonal board 1401 has six button cutouts 1403 to accommodate round buttons (not shown), while providing a semi-circular "finger hole" for ease of button placement and removal.

Dog Portability and Semantic Expandability

Although not required for the advanced functionality the board design enables, through the use of a standardized arrangement of button meanings on individual tiles, dogs who visit other dogs can interact with each other through their shared knowledge of the buttons' location and meaning relationship. Much as all computer keyboards have a similar arrangement, enabling individuals to use any computer keyboard, a standardized word board enables dogs to "converse" using the words that they know.

FIG. 10 describes a layout of buttons based on button meanings that are currently in use, arranged to maximize the potential they have for providing semantic cues, and to speed learning. Through semantic expansion of the board as depicted in FIG. 10, additional meanings can be added while preserving (and even reinforcing) existing learned semantic relationships of the buttons to their location. For instance, individuals who have taught their dog a new word can "claim" the location of the button and tile on the "standard grid", much as domain names are claimed on the internet. This can facilitate the development of a competition in individuals' work to claim semantic "real estate" on the standard board.

Facilitation of Human Training

Dogs have coexisted with humans for approximately 20,000 years, yet we're only now learning of their abilities to learn words. This is partly due to the availability of technology such as talking buttons, but Christina Hunger's discovery could have occurred with technology that existed 40 years ago. A crucial ingredient here is that training dogs to use words requires skill on the part of the trainer. There are many kinds of training that are likely to be aversive to the dog, perhaps because too much correction is used, or because the words are used outside of a social ecology.

One potential cause of training failure is trying to train words that the dog isn't yet ready for. By providing a standardized layout, and movable tiles, trainers can themselves be cued as to how to order and pace the dog's learning. This should minimize the possibility that the dog will be confused by being asked to learn inappropriate concepts—the layout of the words itself can helpfully throttle dog pedagogy.

Scale Independence

Unfortunately, because of the relatively few spatial cues provided by a square Cartesian button layout, changing the size or spacing of the buttons is likely to lead to confusion on the part of the dog. On the other hand, by identifying the meaning of the buttons through their position within a tile, increases or decreases in the size of the tile preserve all other spatial and visual cues. Thus, if the user would like to shift to a more compact organization of the tiles, they can do so with minimal or no retraining of the dog.

The tile-based design can thus permit the dog to use the "keyboard" in a range of different contexts: a larger board for the home context, and a smaller, more travel-friendly scale elsewhere. Additionally, the tile-based board design permits transfer of the word board to a digital context, such as a tablet computer, a more distant digital display, a grid created on a surface using a projector or laser, or other media.

Use of the FluentPet Board

Training of the dog may be accomplished using various methods, alone, or in combination, such as providing to each button a different meaning, ensuring that more common meanings are located at the center of the array of boards and more specific meanings located toward the center of the array, arranging the words so that words' categories change as one travels rotationally about the center of the board, ensuring that words on a given tile have a relationship to each other, through a process of having the dog "tell" people where the button should go, and by ensuring the dog learns one button at a time.

Word Board Physical Design

Certain additional challenges exist for a word board to be used by dogs. Among them are:

Manufacturing cost: The device should be inexpensive to produce. To accomplish this, the device can be made of stamped rubber or silicone, which is then glued together. Alternatively, it can be made of rubber or silicone that has been injected into a mold. It may also be made using a 3D printer, using a material such as ninjaflex. In another embodiment, the board could be made using cardboard, which in a preferred embodiment would be provided with a waterproof coating to rubberize it, leading the board to have many of the properties that would be available were it made entirely of silicone or rubber. The board may also be made of a die-cut foam material, such as Ethylene-Vinyl Acetate.

Visual appeal: The device should be visually appealing and distinctive for both canine and human alike. This can be accomplished by using attractive colors, compelling textures, and appealing visual designs. The visual design should, in addition, respect and reflect the different dichromatic color sensitivity of dogs and cats.

Tactile appeal: The device should be comfortable for the dog to walk and step on. This can be accomplished through the use of a material that is neither too hard nor too soft. In addition, it should be grippy when walked on by dog paws, preventing the dog from slipping—slippery surfaces being intrinsically unappealing to dogs. In one embodiment, the texture could be a rubber or silicone, less hard than wood but harder than a mattress. The texture of the tile could be made easier for the dog to walk on through the addition of dimples or knurling or other kinds of texture. In another embodiment, the board is made of a hard material but covered with a coating that makes the board more comfortable to walk and stand on and ensures that the buttons placed within it fit snugly and cannot be accidentally removed (while still being removable intentionally).

Location integrity: The design of the word board should minimize unintentional movement of the buttons from their intended location. It cannot be the case that the buttons move unintentionally when they are pressed by the dog. As such, the buttons should be held in place. This can be done, as shown by Christina Hunger, through the use of velcro. Preferably, the user does not need to add velcro to the buttons to keep them from moving. Thus, in a preferred embodiment, a stretchy rubber, silicone, or foam stretches slightly to accommodate the buttons, thereby holding them in place. By creating additional overlap of the rubber material over the buttons the force required for removing them can be increased, thereby further preventing them from being removed accidentally. In addition, the stretchiness of the material they are pressed into can be adjusted upward or downward to increase or decrease the force required to remove the button.

Cleanability: The design should minimize time required and maximize ease of its cleaning. This can be accomplished by making the tiles out of rubber or silicone, rather than out of cardboard. If made out of cardboard, cleanability could be achieved by ensuring the board has been coated with a waterproof coating. Ideally, the material that the board is made out of would be dishwasher friendly, and could be fully immersed in water without a reduction in performance or visual appeal. In addition, the buttons themselves should be easy to clean. This can be achieved using the proposed design by making it easy for trainers to remove the buttons. In one embodiment, the cutout for placement of a button may be raised sufficiently to protect some or all of the side and/or button surfaces of the button. In another aspect, the cutout may accommodate a covering for the top of the bottom. In one aspect, the covering may be clear or semi-transparent. But protecting some or all of the button within an enclosure integral to a tile, the button would need either far less cleaning or no cleaning, while removal of the buttons from the tile would allow the tile—which bears the vast majority of the exposure to environmental elements—to be cleaned without concern for damage to the buttons.

Ease of arrangement: The boards should be designed such that it is easy for users to arrange and rearrange them as needed. This can be accomplished by having the boards either be attached to each other, for instance via straps that connect them underneath the boards. Alternatively, the boards can have a design that minimizes the boards' movement as they're being used, resulting in boards' not requiring attachment to each other. In one aspect, magnets may be utilized. The magnets are preferably embedded into the boards in a manner that prevents ingestion by dogs.

Integration of the Boards and Buttons

The button and board design presented here is a novel combination of design elements that, in combination with each other, greatly enhance the speed and efficacy of training. The buttons are designed to be arranged regularly on the board, and used in sets as small in size as one button. Through the acquisition of additional buttons and boards, the array of buttons and boards can be expanded in an unlimited way.

Prior device designs are typically a stand-alone button meant to supplement human learning rather than dog learning. Using insights gained from years of experience in training dogs and cats to use physical interfaces and perform novel behaviors, and from one of the author's 15 years of research in the cognitive sciences, we add key features that yield new benefits that expand the range of people and dogs who can benefit from this device.

The novel button and board combination described here is designed to:

Enable easy integration of the sounds made by the buttons into the life of the person and dog(s) involved.

Facilitate dog learning by providing consistent visual and spatial cues regarding button meaning.

Facilitate dog learning by creating "groupings" of buttons on the board that reflect the semantics of the words involved, and the timing of when the words were learned.

Facilitate dog learning by providing strong visual, spatial, and tactile cues regarding the meaning of the button groupings.

Facilitate dog learning by enabling tracking and quantification of buttons pressed.

Facilitate dog learning by enabling integration of the buttons into software-driven training and interaction, thereby increasing rate, speed, and complexity of learning.

Enable integration of activation of the buttons into a system for entertaining the dog.

Enable integration of activation of the buttons into a system that provides food rewards.

Enable integration of activation of the buttons to enable the dog to control aspects of his or her environment, including what is displayed on a screen, whether the lights are on or off, music or speech emitted by a sound system, opening or closing doors or access gates, etc.

None of the above are permitted by any prior design or layout of buttons. The combination of features for the purpose of facilitating learning in both humans and non-humans, described herein, is unique and novel.

Button Physical Design

The button includes the features of the one presented in FIG. 1: a microphone, or set of microphones, for recording a sound (e.g., a person saying the dog's name). A way to trigger recording and storing of the sounds transduced by the microphone. A speaker for playing back the sound recorded at sufficiently high fidelity. A button that is easy to depress in order to trigger playback via the speaker.

While the button in FIG. 1 is approximately 3.5″ in diameter, that width is not a requirement for the device to work. It could instead range in size from 0.1″ to 6″, depending on the size of the animal using it. The pressure required to depress the button, also, can vary depending on the weight of the animal pressing it. The button may also display an image of a symbol or picture. This image may be inserted by the user, e.g. on a piece of paper, or may be manufactured into the button.

Button Illumination

Touch buttons such as these that already exist on the market may have lights within them that serve to act as further cues and/or sources of amusement. Here we describe how the addition of illumination and integration with connectivity can serve to significantly enhance training, learning, and engagement with the buttons.

When in communication with a display showing images or videos of objects or actions or commands for the dog to learn, the light within the button can be activated to "hint" or "suggest" to the dog the meaning of the object being presented. The lights may be a range of colors, ideally wavelengths tuned to a dog's different visual system. In addition, through illumination of a sequence of buttons, the system can hint or suggest more complex meanings associated with images or videos displayed. The display may be an e-ink, OLED, LCD, LED, or similar display technology that changes dynamically as needed.

In addition, the button may be illuminated proactively during the dog's production of a sequence, in order to assist the dog in finding the next button to be pressed. This could be used to assist the dog's learning of the button locations as well as the parts of speech and word order. In another embodiment, after pressing a button, multiple sequences of subsequent presses could be presented to the dog, allowing them to choose a path of expression.

Connectivity

The buttons may also have added to them a smart, low-power, network connected module, or system on chip, that enables the buttons to be connected to each other, to the home, and to the Internet. This connectivity enables:

Recording within a remote database when the button was activated, enabling logging and data analysis for analysis and use by humans and interaction software.

Informing software that the button was activated, improving training by associating the button's activation with the presentation of videos or images on a display viewable by the dog.

Remote triggering of the sound played by the button, enabling such things as trainer's integration of the sound of the button into normal speech flow, further reinforcing the animal's learning. Additionally, remote triggering of the button can enable communication of phrases that the dog understands, either by a human or by a computer artificial intelligence.

Uploading and downloading of new sounds to the module or system on chip, enabling easy re-programming of the sounds presented.

Intelligent recombination and modification of the sounds played by the button.

Automatic adjustment of the volume of the button based on the ambient noise level.

Remote triggering of actuation of objects in the surrounding of the device and animal, like opening doors or turning lights or devices on or off.

Integration of the device into existing home automation platforms or smart-home voice assistants.

To limit cost and maintenance of the device, e.g. charging or replacing batteries, two different versions of the device could exist: one higher-power version and one lower-power version. All devices would be interconnected with a low-power personal area network technology, like IEEE 802.15.4, BLUETOOTH® Low Energy or ZIGBEE®. The higher-power version of the device, or hub/sink/congregator, would provide a connection to the wider internet via e.g. WiFi, LTE, LTE-M, NB-IoT, LoRaWAN. Lower-power devices or nodes would be configured in a star or mesh network topology and are able to communicate with devices inside the home or on the wider internet via the internet connected higher-power device. Thus, customers could buy "kits" of devices, where one device serves as a more expensive "hub" and the others as more economical "peripherals". The "hub" in this scenario could function as a button itself, just like the "peripherals", but doesn't have to, it could also be mains powered instead of battery powered like the lower-power "peripherals" devices.

Connectivity allows the buttons to be connected to a system that can provide rewards to the dog, enhancing the dog's learning. These rewards may take a variety of forms, such as food or treats, videos the dog finds pleasant or exciting, familiar speech from a favorite human, sounds of another dog, or the production of smell of a favored dog, human, cat, or other object the dog finds rewarding.

Additional Features and Functions

Animals frequently have certain senses that humans do not have and/or senses that function differently than they do in humans. For example, bats and certain marine mammals use echolocation. For every scent receptor a human has, a dog has about fifty scent receptors. Bears have been observed travelling over 25 kilometers in a straight line to a food source—and to follow the scent of a sexually receptive female for hundreds of kilometers. Sharks can not only detect trace amounts of blood in water, but can also sense electrical currents and pressure changes. Rats, mice and other rodents can communicate with other members of their species using ultrasonic noise, avoiding becoming audible to many predators. While we discuss this in the context of dogs and scents, it should be understood that the inventions described throughout this document may apply to other species and/or other senses than the ones directly discussed. Indeed, some aspects of these inventions may be used with pre-verbal or non-verbal humans (such as babies).

In teaching a dog how to use the inventions, it may be important to disambiguate similar things. For example, if Fido lives near two dog parks, both close-by and on the beach, the smells will largely be the same. If one button meant "North Beach" and the other "South Beach", the dog would have great difficulty in identifying which button meant which beach. Because of the importance of smell in a dog's sensory hierarchy, it is possible to solve for this in multiple ways.

In the first solution, a sample of something present at each beach (and preferably unique to each beach, or at least unique or substantially unique among the scents a dog is regularly exposed to) may be taken and that scent applied to the button corresponding to the beach. In one aspect, the scent may be integrated into the plastic of the button during manufacturing. In another aspect, a glue, epoxy, silicone, or other material that dries (and if preferably safe around dogs)

may be mixed with the sample and applied to the button. Another approach may be to simply rub the scent on the button, place the scent inside of a recess or compartment within or proximate to the button (whether recessed behind a bars or a grid or not), or otherwise apply the scent to the button. In another aspect, the cutout in a tile for a button may integrate or have in proximity a holder for a scent, be imbued with a scent, or otherwise bear a scent.

It may not be possible to uniquely identify a scent present in one place but not the other. In other cases, it may not be desirable to do so. It may also be desirable to avoid the risk of the scent degrading or changing as it ages after being applied to the button. In such a case (or for other reasons), it may be desirable to create a series of unique scents. In one aspect, each button has a scent embedded within the materials that make up some or all of the button or the surrounding area. In another aspect, the scent may be applied to the button or a compartment therein. The corresponding substantially identical scent would be provided to the user, often in portable form. The user would then take the scent with them when going to the place that is to be identified. Using the beach as an example, when Fido goes to North Beach, the scent may be applied to a tissue and the dog would smell it. It may also be mounted on the dog in some manner (such as application to a scent-retaining material attached to the dog's collar or harness). In this way, the animal will be trained to associate the scent with the location.

In another aspect, there are things that simply are not naturally associated with a scent. For example, a dog may simply wish to go for a run. Because running is location-independent, there is no scent naturally associated with running. In such a case, when the dog performs the action (such as running), the artificial scent (which in this context means both artificial scent and naturally occurring scent not naturally present in a place) may be sprayed in the air, placed on the dog's collar or otherwise made detectible to the dog. The scent would also be applied to (or present within) one of the buttons, allowing the dog to later press the "run" button—or even construct primitive sentences, such as "run North Beach".

In another aspect, while the location independence of running means no specific scent is associated with it, running may be associated with a more abstract property of scents: the rate at which they change. Running involves a different kind of breathing than sniffing which will therefore lead to a different kind of sequence of scents perceived. This different rate of scents change could be embedded in a button that had a capacity to change the scents that it emits at a rate similar to that that would be perceived when running. Where the broad range of scents may not be easily reproduced, simply alternating between a plurality of scents may be sufficient. In such a case, a plurality of scent chambers may be opened and closed; fans may be used to make different smells dominant at different times; or other methods may be utilized to cause a variety of smells to be perceived at a desirable rate of change.

The technology to read neural signals is developing rapidly. Companies such as "Neuralink" are designing neural implants that allow the brain to send signals to digital devices. The opposite is possible as well. FMRI and other scanning technologies, as well as electrical and electronic measurement of the brain are additional methods to obtain data about which areas of the brain are active and in what way.

We teach measuring neural signals while a dog is doing or experiencing a thing. In one aspect, in combination with other data regarding the animal's condition, the dataset of which areas of the brain are active, and/or the levels of activity, and/or the patterns of neural activity, is used to train an artificial intelligence system. This can be done by capturing measurements of neural activity patterns associated with the dog's pressing of buttons. Each intentional button press has a unique signature associated with the button pressed that can be identified through analysis of neural recordings made before, or during, or after the button press event. After such training is complete, the system would be able to identify which button presses the dog is considering. For example, once the pattern associated with pressing the 'hungry' button can be reliably identified though neural signals alone, then it is possible to infer that the dog is hungry even when no button is pressed. Once this is inferred, the signal can be sent to a food dispensing device directly. It may also be sent to a human, such as by actuating a speaker to say "food", or by sending to a human's mobile device a notification.

Figure 105:
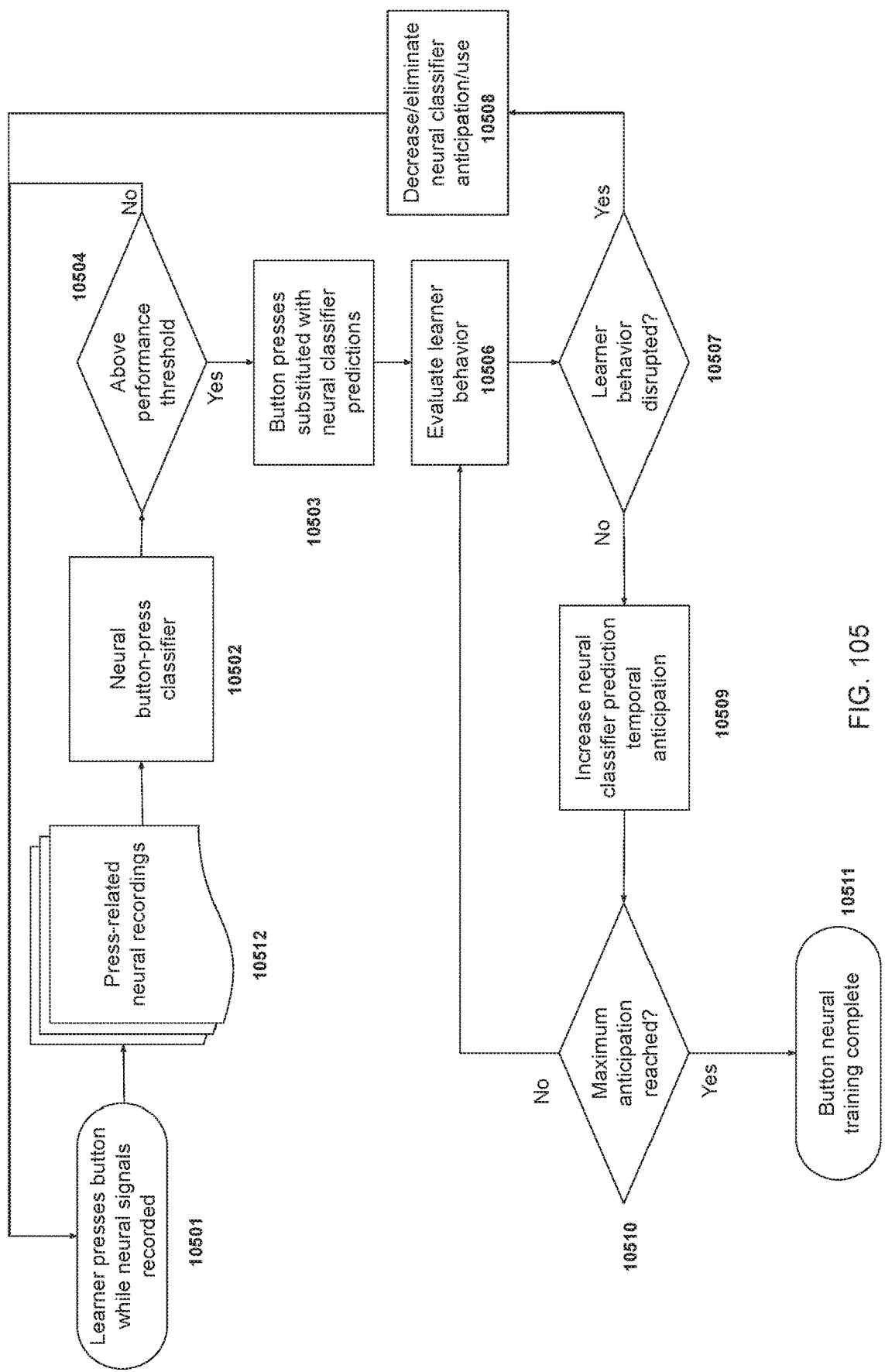
FIG. 105 is a flow diagram of a method for button neural training.

Referring now to FIG. 105, therein is shown a method for button neural training. As suggested above, the existence of a repeated external event, the pressing of a button 10501, paired with neural measurement makes possible the cognitive internalization (in the sense of psychology Lev Vygotsky) of a sound board through the recording and training of a classifier using a number of recorded press-related neural activity events 10512. Once the predictive ability of the measured neural activity 10502 associated with a button press has reached a sufficient threshold 10504, it is possible to deactivate the buttons as triggers 10503, and instead rely entirely on recognition of the neural activity associated with a button trigger. For example, the system might play the sound corresponding to the word "outside" even though the button hadn't been physically triggered, and instead was "neurally triggered" because the dog generated the neural activity pattern associated with the pressing of the button for 'outside'. The dog's response to his/her perception of the sound generated by the neural triggering can be used by the system to verify whether this was the outcome the dog expected 10506. Additionally, through identification of the temporal evolution of the neural pattern that gives rise to the pressing of a button, it is possible to predict which button will be pressed before the dog makes contact with the button. This allows the dog to trigger the button through thought alone. Training the dog to do this involves having the neural trigger activate further and further in time from the moment of the buttons' press 10509. For example, earlier in the dog's neural trigger training, the neural triggering could occur at the moment of mere physical contact (rather than depression) of the button. Once the dog is familiar with this, triggering of the button can occur when the dog is close to, but not physically touching, the button. Eventually, once maximum anticipation has been reached 10510 the dog will be able to trigger the button without the generation of any physical movement 10511. Because neural activity is always changing, the system will continuously adapt to the dog's always changing neural patterns. In particular, it will monitor whether the dog's behavior and neural activity in response to a neural triggering (for example, in response to the associated word sound emitted) indicates that the dog was surprised or had his/her expectations violated 10507, and if so, to decrease or eliminate the amount the classifier anticipates the dog's behavior 10508 until there are no longer any indications that the neural trigger was disrupting the dog's communication behavior. In the case of physical activity, this could manifest as the physical behavior associated with a startle response. Since the motor activity associated with surprise can be negligible or suppressed, neural signals indicating surprise can be monitored. For example, the system could use the "N400" Event Related Potential (ERP), a neural signature whose amplitude peaks 400 ms after a semantically surprising event. In this way, a dog can eventually be freed entirely form the need to physically actuate buttons on a sound board.

Even absent measurement of neural signals, data classification can be used to infer and predict the dog's intentions using other measurements of the animal's condition. For example, using physical context. This system may be analogous to predictive text, utilizing behavior and other cues about the animal, including in some implementations swiping, pushing, etc., as the data with which to for a prediction.

Through use of a device that tracks the dog's gaze it is possible to augment the dog's learning of the buttons by having the dog's visual fixation of a button cause the button to trigger. In another embodiment, the sound triggered by a gaze at the button could cause the sound to be emitted in the ear of the dog quietly, helping them identify which buttons they wish to press.

In combination with an augmented reality apparatus, the dog's gaze can trigger the naming of objects the dog has visually fixated, helping him/her learn the names of the different objects. Note that a traditional "augmented reality" apparatus is not the only embodiment of this. For example, a camera that follows the dog's gaze (something present in many AR systems) may be sufficient to identify the button being identified. The sound need not be quiet in such a case, and instead may emit from a speaker (whether co-located with the button or otherwise).

Once the animal has been trained to use the buttons, an emergent problem is that the button simply cannot travel easily with the dog. It would be incredibly helpful for a dog on a walk to be able to signal "thirsty" or "water", for example. In addition to the brain pattern approach described above, it is possible to use a portable subset of buttons. Preferably, the buttons would be laid out in a pattern that is as similar as possible to the pattern the dog was trained on. The addition of scents to the buttons would also be desirable in certain cases.

In another approach, a set of virtual buttons can be projected on the ground. One implementation, which may be done in whole or in part, is to have a projection device present somewhere on the dog (such as affixed to the collar), on a leash, and/or on a human accompanying the dog. There may also be fixed projection devices that can be actuated by the proximity of the dog (whether detected through near field computing signals, computer vision or otherwise). In a preferred embodiment, the dog would have a transmitter that would instruct the projector as to which virtual buttons to project in which location. In another embodiment, the dog may be identified by gait measurement, computer vision, or other means and a database accessed (in certain cases over a wide area network) to identify the correct layout and responses of the buttons, which may include downloading the voice or sound associated with each of the virtual buttons. The dog's primary set of buttons would be configured to transmit the necessary information to a database to facilitate such access.

In the case of a portable projector, one or more elements may be used to keep the projected image sufficiently stable to permit the dog to interact with it. One or more gyroscopic or other movement sensors may be utilized to determine the movement of the projector, and via optical or digital adjustments, the image may be moved relative to the projector in a manner that keeps the projection more stable despite movement of the projector itself (such as one hanging off of a leash). In another aspect, the projector may utilize a camera and use optical or digital modifications to the light it projects to keep the image stable relative to an object or marker detected by the camera. In another aspect, it may be desirable to have the buttons move with the animal, such as when the animal is walking. Such movement may be identified and excluded from the movement that the projector compensates for. In another aspect, a vocalization and/or movement may be used to actuate the projector. In another aspect, a speaker would respond to the "press" of a virtual button. In addition to the foregoing methods of stabilizing the projector, gyroscopic rigidity in space may be utilized.

To detect the press of a virtual button, a sensor, in most applications a camera, is used to determine which button that the dog has "pressed".

When humans find a point particularly relevant or important, it is not uncommon to speak with added emphasis or volume. The same would apply to animals. If a dog needs to urinate urgently, the dog might press the "pee" or "walk" button repeatedly and firmly. If a dog just wants to get outside, the press might be light. On the very lightest end, the dog may accidentally press a button. The buttons may be designed with increasing resistance as the button is pressed.

The amount of force exerted on the button may be quantified and utilized to convey the sense of urgency. In one implementation, hard cut-off points may be used. For example, pressing the button ⅓ or less of the way down would be treated as an accidental press; pressing between ⅓ and ⅔ of the way down would be treated as a light press; pressing down ⅔ of the way or more would be treated as an urgent press. In one alternative, the amount of force may be measured and utilized with or without cutoffs to convey the amount of urgency. In another aspect, the speed and/or length of time with which the button is pressed may be utilized. In addition to or instead of cut-off points, an AI may be trained using the dog's press data combined with input from the human. For example, after the dog presses "walk", the owner would input (via an operatively connected device or directly) the urgency with which the dog needed to urinate. Over time the AI would be able to determine the press pattern and urgency. Similarly, where dogs combine presses, such as "walk pee", the speed or cadence of the presses individually and/or relative to each other may be utilized.

In one embodiment, the amount of force used to press a button may be correlated to the amount of feedback provided to the dog. For example, a press at 50% may result in a verbal confirmation ("walk" or "food") that is conversational volume. At 90% it would be closer to a yell volume. By increasing the buttons' expressive ability, the button' utility can be increased, making it more useful to the dog, more frequently used, and more quickly learned.

In another embodiment, the duration of the press could impact the duration of the word produced. Longer presses could correspond to a slower pronunciation of the word produced, with shorter presses corresponding to quicker, more clipped expressions. The advantages of this are similar to those of having pressure sensitive buttons. In addition, the length of time the dog holds down the button may also be correlated with the strength of the feedback. Cadence (between syllables, between words, or otherwise) may also be used to reflect the mode of button pressing, including in one embodiment the cadence of button pressing.

In one embodiment, the "button" may actually be a virtual or real sensor along the line between tiles. In another embodiment, the entire tile may be a button. In another embodiment, the sizes and/or shapes and/or height of the buttons may be varied.

It may be confusing to an animal to have multiple buttons playing feedback simultaneously. In one embodiment, the button being pressed sends a signal to the other buttons to be silent and/or to become deactivated (the length of time for such silence and/or deactivation may be correlated with the completion of playing the sound from the tile sending the signal). In another embodiment, pressing a second button may send a signal to the first button to discontinue the sound or other feedback.

It may be important that the human be able to actuate the buttons in a manner that is known to the device to be human. In one embodiment, capacitive touch measurement is used to determine whether a finger has touched the button (whereas a dog's nails would have a different impact on the capacitive touch sensor). In another embodiment, the button would have a smaller button. In one embodiment the smaller button is present on top of the button. In another embodiment, the smaller button may be slightly, moderately or profoundly recessed so that pressing the smaller button would be difficult to achieve by a dog. In another embodiment a fingerprint sensor is present on the touch surface of the button, which can differentiate between human and dog input, but can also uniquely identify which human or dog is activating the button. In another embodiment, the sensor may utilize nose prints or paw prints as well. These embodiments may be combined if desired.

In one aspect, compound concepts, such as "goodbye", may start out as a single button or two contiguous or nearly contiguous buttons. Over time, the buttons may move so that "good" and "bye" become separate locations.

It should be understood that while we discuss buttons as physical objects, they may be virtual (as in the projection version), they may be locations on a touch-sensitive surface, they may give haptic or force feedback, and inflatable bladders or extensible pins may be used to identify where the buttons on a touch-sensitive surface are located.

Where some form of press by the dog is measured to be an accidental press, the button may emit a noise or vibratory feedback or a combination thereof to indicate that the press did not "count". Vibratory feedback may be utilized, including different vibration strength and patterns, as feedback from the buttons. Temperature feedback may be utilized, particularly among animals that are temperature sensitive. It should be understood that the buttons themselves may be heated or cooled. Buttons may be different temperatures from each other, allowing for another cue to the dog. Buttons with related meanings may be grouped in similar (or even substantially identical) temperature zones.

In one embodiment, it is desirable to utilize an artificial intelligence (AI) to self-program the buttons. The AI would measure the button presses and correlate them to behavior taking place before and/or after the press. In another embodiment, the layout of buttons is associated with the particular dog. When the dog approaches another one of the devices (perhaps in a friend's house), the buttons would automatically reconfigure to match the layout at home. This may be done by identifying the animal via computer vision, identifying an object (such as a QR Code) on the dog, collar or other thing affixed to the dog, measuring the output of a near field computing network, or otherwise. In a preferred embodiment, the buttons at the dog's home upload their configuration to a common server and are associated with the particular dog. The automated reconfiguration may then reconfigure the buttons to match what the database has. In another embodiment, the layout at home may be communicated via a network interface to a device on the dog or owner (such as a FOB on the dog's collar). The device would then communicate with the new set of buttons to send them configuration information.

In terms of identifying a dog, the button may also read the dog's pawprint and/or noseprint in order to identify the dog. In another embodiment, a sleeve may be constructed to fit over a dog's nail (such as a duclaw). The sleeve may be marked with a code (such as a QR code). The sleeve may contain a radio-frequency identification device such as a passive or active tag. In this way the sleeve may uniquely identify the dog. In another aspect, a light (in one embodiment, outside of the human and canine sight range, such as near infrared) may be mounted on the dog (such as on the collar) and may emit a distinguishing pattern to identify the animal. In another embodiment, a unique barcode, like a QR-code, would be mounted on the dog which can be read by a camera mounted in the button or otherwise operably connected to the button.

It should be understood that the use of buttons in conjunction with canines may be adopted to the needs and abilities of other animals. For example, if the system is utilized in conjunction with dolphins or other marine mammals, it may be useful to place the tiles on a vertical surface in water, modify the sounds or other feedback for water conditions and the needs of the animal, and/or to modify the buttons for pressing in a manner compatible with the animal. Using the dolphin example, the buttons may need to be larger so that they can be pressed with the snout. With rats, the buttons and tiles may need to be tiny.

There are several exemplary embodiments. These embodiments are to show examples only, and are not intended to be limiting.

In one embodiment, there is a button, comprising an enclosure, a first button on the enclosure that is suitable for actuation by a dog, a second button on the enclosure that is not suitable for actuation by a dog, a processor operably connected to the first and second buttons, and the first and second buttons actuating different functions of the processor.

In other aspects of this embodiment, the second button must be pressed in conjunction with a third button in order to actuate the second button. In another aspect, changes to capacitance in response to touch are measured and at least one function is activated or deactivated based on the magnitude of the changes to capacitance. In another aspect, one or both of the first or second buttons may be actuated only in response to a nose print. In another aspect, one or both of the first or second buttons may be actuated only in response to a paw print. In another aspect, the first and second buttons are co-located and the second button actuated by detection of a human fingerprint. In another aspect, the second button may be slightly recessed, moderately recessed, or profoundly recessed. In another aspect, there may be a scent that is associated with one semantic meaning of the button and is a different scent and association than a second button.

In another exemplary embodiment, there may be a button apparatus, comprising at least one enclosure, a first button that is suitable for actuation by a dog, a first processor operably connected to the first button, the first button actuating a first function of the first processor, the first button bearing a scent, the first button associated with a meaning, a second button that is suitable for actuation by a dog, the first or a second processor operably connected to the second button, the second button actuating a second function of the first processor or the second processor, the first processor detecting the actuation of the second button and terminating the first function upon said detection.

In another aspect, the detecting is done by detecting an audible signal from the first button. In another aspect, the detecting is done by detecting a network signal from the first button. In another aspect, the detecting is done by detecting a radio signal from the first button.

In another exemplary embodiment, we may have a semantic teaching apparatus, comprising at least a first button and a second button, the first button co-located with a first scent, the second button co-located with a second scent different than the first scent, the first button associated with a first meaning; the second button associated with a second meaning; the first button and the second button suitable for actuation by a dog.

In another aspect, at least one button has scent incorporated into some or all of the materials used in the button or the mounting for the button. In another aspect, at least one button has a housing that contains zeolite bearing a scent. In another aspect, the zeolite is heated; this heating may be done manually, at specified times, while the button detects interaction with itself or other buttons, or in response to detecting a dog in proximity to the button. In another aspect, at least the first button contains a scent-bearing substance associated with the meaning of the first button. In another aspect, a fan, an air compressor, and/or compressed gas is utilized to create airflow over the scent-bearing substance.

In another exemplary embodiment, we may have a button apparatus, comprising at least one enclosure, a first button that is suitable for actuation by a dog, a first processor operably connected to the first button, the first processor measuring the amount of pressure exerted on the first button, the processor altering its response to actuation based at least in part on the amount of pressure exerted.

In another exemplary embodiment, we may have a button apparatus, comprising at least one enclosure, a first button that is suitable for actuation by a dog, a first processor operably connected to the first button, the first processor detecting multiple presses of the first button within a set time period, the processor altering its response to actuation based at least in part on the number of presses within the set time period.

In another exemplary embodiment, we may have a button apparatus, comprising at least one enclosure, a first button that is suitable for actuation by a dog, a first processor operably connected to the first button, the first processor detecting accidental presses of the first button, the processor causing one or more of noise, vibration, scent release, or temperature change in response to the detecting.

In another exemplary embodiment, we may have a a dog identification apparatus, comprising a sleeve fitting around a portion of a dog's leg, which portion may be any portion from the where the leg joins the torso to the nails on the paw, the sleeve bearing an identification mechanism comprising one or more of a near field computing signal, a FOB, a QR code, a radio signal, or a sound signal, The apparatus of claim 79, where the mechanism is a near field computing signal.

In one aspect, the sleeve fits around a duclaw. In another aspect, the sleeve fits around a nail. In another aspect, the sleeve fits around the portion of the leg most distal from the torso but before the paw.

In terms of interlocking mechanisms for the tiles, there are a variety of embodiments, including:
Basic Butt
Mitered Butt
Magnetic connector
Electromagnetic connector
Tongue and Groove
Half-Lap
Mortise and Tenon
Biscuit Joint
Pocket Joint
Rabbet Joint
Half-Blind Dovetail
Velcro® (hook and loop)
Glue
Adhesive
Hinge
Slot+Pin
Static electrical The type of surface finish may also be altered. For example, the tile may rise between buttons to create a ridge or other separation between tiles and/or buttons. Among other things, this may be utilized to prevent the user from touching multiple buttons simultaneously and/or to reduce the amount of inadvertent button pressing.

Button depth may also be varied.

In one embodiment, the tile shapes may be any variant of a fractal. Indeed, there is a method to design such tiles whereby fractal generating software is utilized.

In another embodiment, a dog-mounted system can assist the dog by describing in real time the world the dog is perceiving, using words that the system has learned that the dog knows. It may describe videos seen on a screen, name the people the dog is looking at, and describing events around the dog. This may happen either publicly or through a quieter ear-mounted interface, among other methods. In another embodiment, the dog may be presented with new words (which may or may not comprise or compose a list of words that the user of the system desires the dog to learn).

A similar system may be used to respond to the dog's button presses, helping the dog learn how to combine buttons together in a comprehensible way. By responding to interpretable button press sequences with relevant images, sounds, or response phrases, the dog can test out his or her understanding more rapidly, and learn to express themselves irrespective of whether there is a human available to provide feedback.

Scent Gathering

Figure 102:
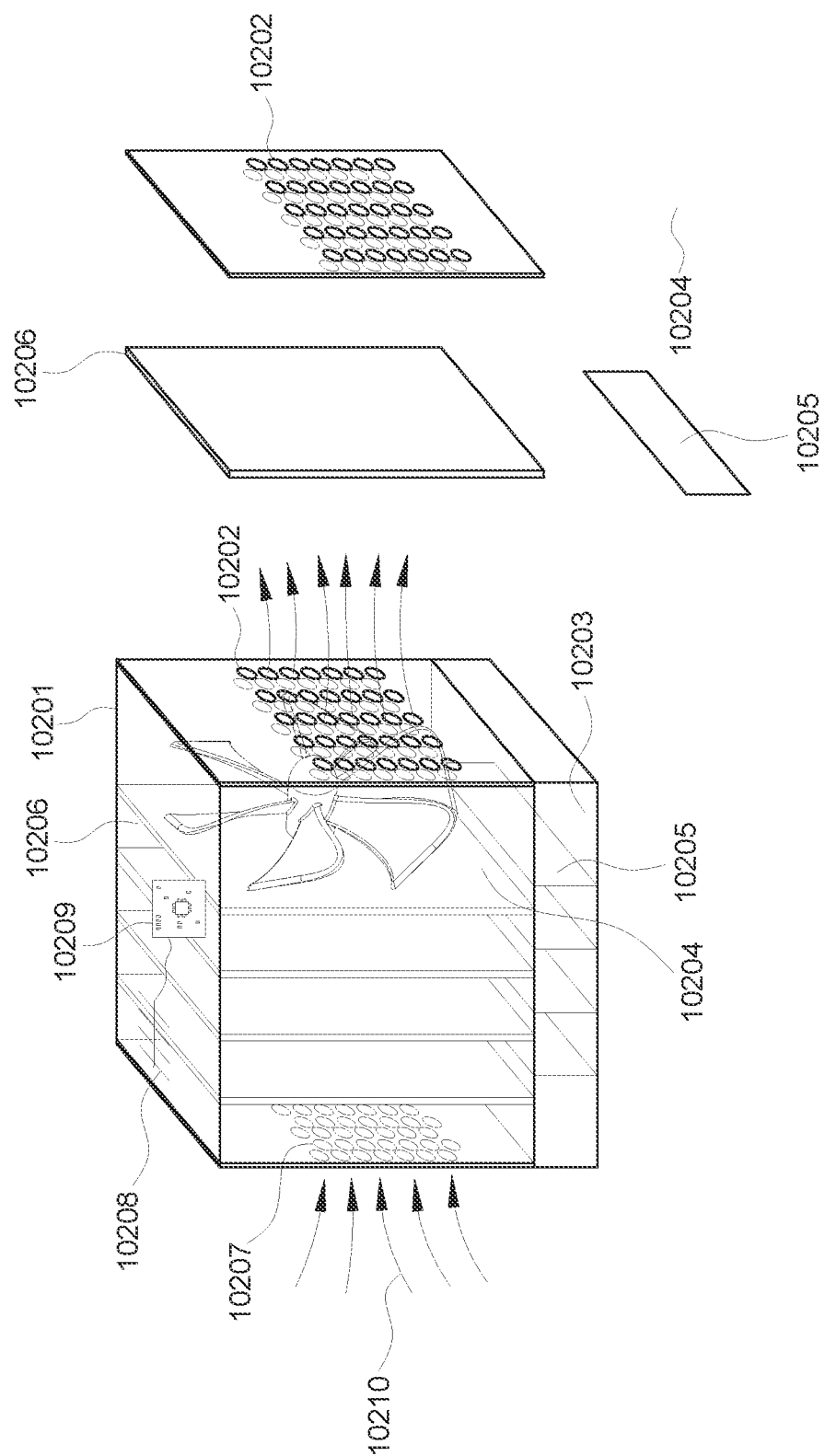
FIG. 102 shows a scent camera (adsorbent capture device).

FIG. 102 is one embodiment of an adsorbent capture device that we call here a "Scent Camera" (although the term is intended to make teaching this technology simpler, and is not intended as limiting). When used in this specification, the term "zeolite" means zeolite as well as any other substance capable of scent capture and release.

In one embodiment, the device 10201 starts sealed (airtight). In one embodiment there are solid sides and an actuated air seal (10202, 10207) on each end. Air enters through the actuated air seal 10202 into the airspace 10203. In one embodiment, the air is drawn in by a fan 10204 or other air movement device, whether inside of the Scent Camera 10201 or externally located. The scent may be captured in a zeolite-embedded filter 10206.

A GPS antenna 10208 and system may be utilized in conjunction with a computing device 10209. In one embodiment, the computer may capture and store the location of the device, images captured by a camera, sounds captured by a microphone, or other data. In one aspect, the stored data may be associated with a time, location, or specific portion of the zeolite filter. The computer may communicate by near field computing, wireless network, or other mode. In one embodiment, the computer may also control the operation of the apparatus. A GPS system should be understood to include other geolocation systems, such as wifi triangulation.

In one embodiment, the zeolite is marked in a unique manner, such as with a QR code. The code (or other marker) present on the zeolite "frame" is read and associated with the GPS position within a dataset or database. In one embodiment, the texture, appearance, and/or unique markings on a zeolite frame (or portion thereof) may be used as the code or marker.

In one embodiment, when the user actuates scent capture and/or release, the ports open on both sides, and the fan pulls/pushes air from the environment through the zeolite embedded filters which adsorb the odors and then subsequently push the air out, continuously or intermittently, for a period of time. The period of time for scent capture and/or release may vary depending on a range of factors, including the strength of the smell emitted and the kinds of contaminants that may be present. In one aspect, the capture period may continue until the system detects movement away from the scent source.

After the "exposure time" is over, the fan stops and the seals close. When it is time for the smell to be generated, the heating elements (which include any additional mode of actuating scent release] are activated, causing the zeolite to desorb and release whatever smell it's trapped. At a certain temperature and/or time duration, the fan activates (or, potentially, a tank of compressed nitrogen or other gas, or a highly filtered atmospheric gas, is provided), and one or more of the seals open, pushing out gas which now includes the desorbed odors. By using pure compressed nitrogen or other gas, only the smell trapped is released.

It is likely that the zeolite filters will need to have a range of different kinds of zeolites to capture a "full color" rendition of different odors. Ensuring that the outgoing smell ratio matches incoming smell ratio will likely require that the filters have different proportions of the various different zeolites embedded within them (much as photographic cameras have different proportions of color transducers). Different combinations and proportions of zeolite may be used to tune the odor production to the different smelling capabilities of different individuals or classes of individuals.

In addition, the materials used in the camera will preferably be designed to be entirely odorless, even when heated. The heating element may itself be sealed, eliminating the need for it to also be made of an odor-free material. When utilized for certain purposes, such as dog use, it may be more important to eliminate other scent sources. For other purposes, such as having a blind human witness identify a location by scent, the lack of trace odors may be less critical. In one aspect, the ability of the "smeller" of the released scent to understand that the system itself may have a trace odor may dictate how scent-free the apparatus must be. In one embodiment, the entire structure may be designed to withstand high temperatures and may be heated (either via an internal heating ability or an external heat source, or a combination) to a temperature at which any extent scents are reduced, nearly eliminated, or fully eliminated.

In one aspect, the cameras may be "single use", with the seals only opened when it is time to capture the initial scent. Over time, though, it may be possible to "reset" the system with enough heat and simultaneous nitrogen flushing (nitrogen itself being able to be generated by a different Zeolite-based system). In one embodiment, the Zeolite may be moved out of the airflow after being used, or the airflow moved around it.

Figure 100:
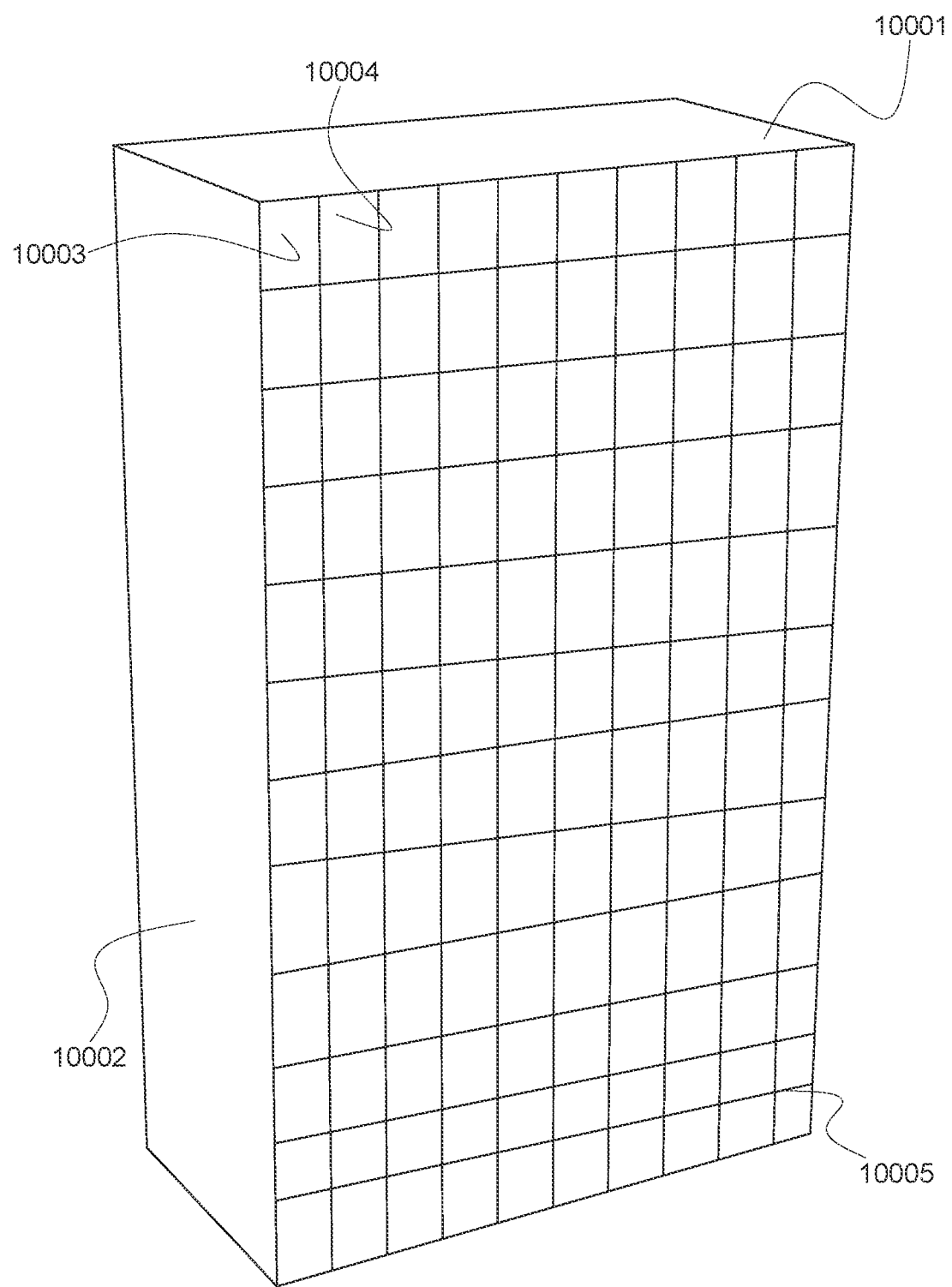
FIG. 100 shows a multiple capture (adsorbent) device.

In another embodiment, a multiple capture (adsorbent) device may be utilized. One implementation is shown in FIG. 100. There is a zeolite block 10001, 10002. The block is divided into a series of separate zones 10003, 10004, etc. In one embodiment, there are dividers between the zones 10005. In aspect, the dividers may be substantially or fully not permeable by air or scent. In another aspect, the dividers may penetrate the full depth of the zeolite block 10001, 10002, and may terminate against an air seal or part thereof. In such an embodiment, a first scent may be captured by moving opening one portion of an actuated air seal. In another embodiment, the air source may travel through a conduit that moves the conduit termination point between cells 10003, 10004, etc. The size of the zones may vary. For example, where capture of a large number of scent events is considered important, the zones may be quite small. By contrast, where replay of the smells multiple times is considered important, the zones may be larger.

Figure 101:
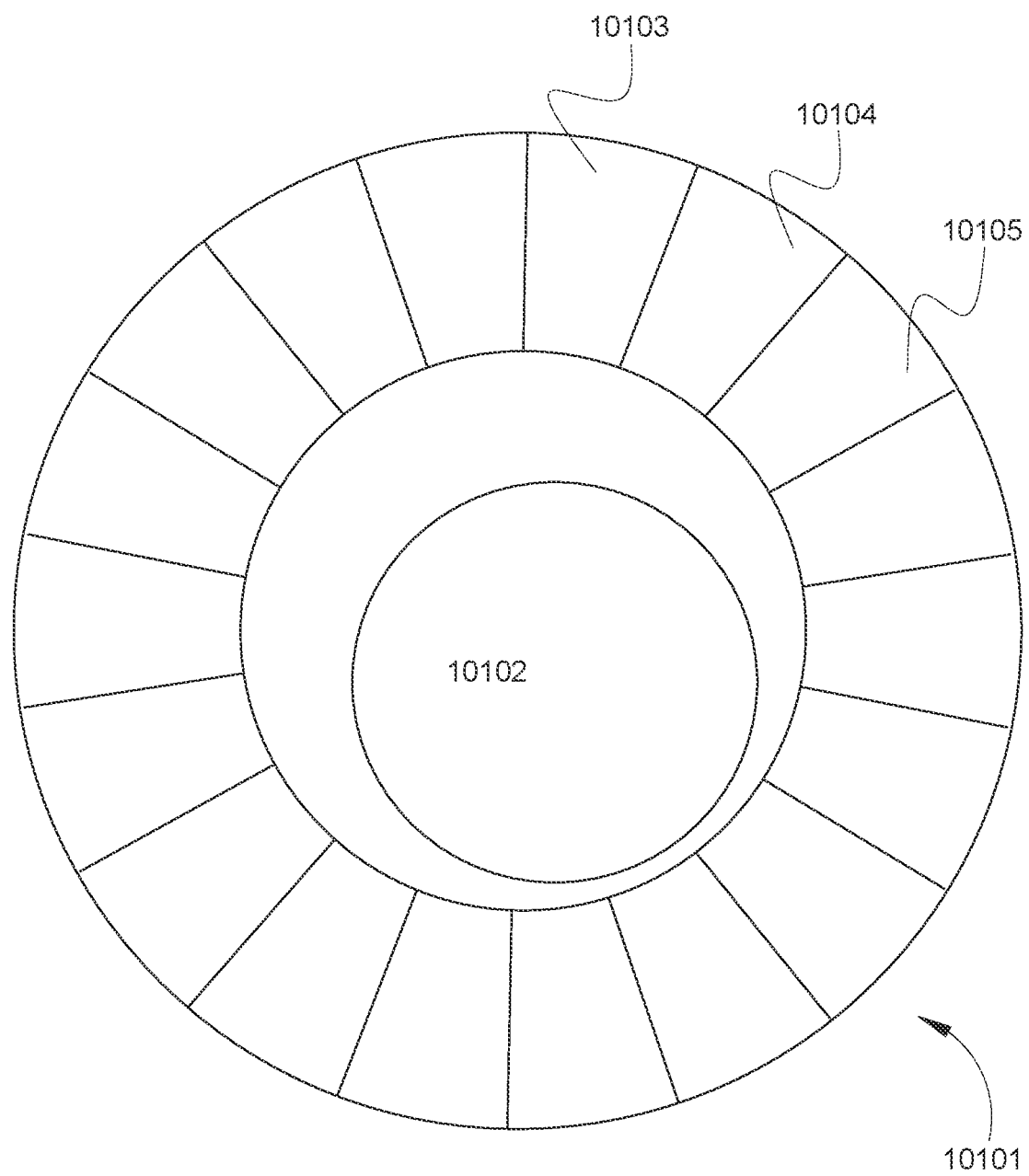
FIG. 101 shows an adsorbent capture device.

In another embodiment, a multiple capture system may utilize a rotating piece of zeolite. It will usually be preferable for the rotating piece to be circular, though other shapes may be utilized. Turning to FIG. 101, therein is shown an adsorbent capture device comprising a circular piece of zeolite with an optional cut-out in the middle 10102. The line dividers split the zeolite into distinct areas 10103, 10104, 10105, etc. As with FIG. 100, lines comprising the dividers may penetrate into the zeolite. In one embodiment, the penetration is through the entire depth. In another the penetration may terminate in an air-seal. For both the FIG. 101 and FIG. 100 configurations, the termination in an air seal may be an air seal that is actuated to be open when scent is being captured and/or released. The zeolite may be rotated so that one segment 10103 is inline with the air path for the scent capture and/or release. After the segment has been utilized, the zeolite may rotate to the next adjacent section 10104 or to a non-adjacent section 10105. The zone sizes for a circular zeolite system may vary as they may with the system shown in FIG. 100.

It should be understood that other systems may be utilized, such as a system with a flexible zeolite source and/or zeolite particles embedded in a flexible material. In one aspect, rolls of zeolite may be utilized much like motion picture film. They would unspool and pass over the scent capture (or release) location and then be rolled back up. In one aspect, a scent barrier may be utilized between layers of the rolled zeolite (particularly the zeolite already bearing a scent) to prevent cross-contamination of scents.

With all capture systems, some or all of the captured scent may be released into a spectrogram, gas chromatography device, or other device capable of measuring the components of the scent.

Another approach is to do something more akin to (or comprising) FIG. 7. This approach may be focused on maximally capturing the scent of a particular object. In this case, a preferred gas would be odorless nitrogen (or another odorless and/or highly filtered gas source], but this time it would be pushed over the object whose scent we aim to subsequently capture using the Zeolite. By using nitrogen (or similarly unscented gas) exclusively, we can avoid environmental contamination of the object's smell.

Heat driven odor release, in combination with nitrogen sealing, could also enable the selling of pre-made large pre-scented kits, in which, when a particular scent is demanded, one or more holes quickly heat, open, have nitrogen pushed through them, and then close. With adequate scent concentrations, and appropriately designed zeolites, these could last a very long time.

In one embodiment, it is anticipated that the user would create custom scents for dogs, such as the scent of the dog's mother. Such a scent may be utilized to calm a newly adopted puppy, for example.

Figure 103A:
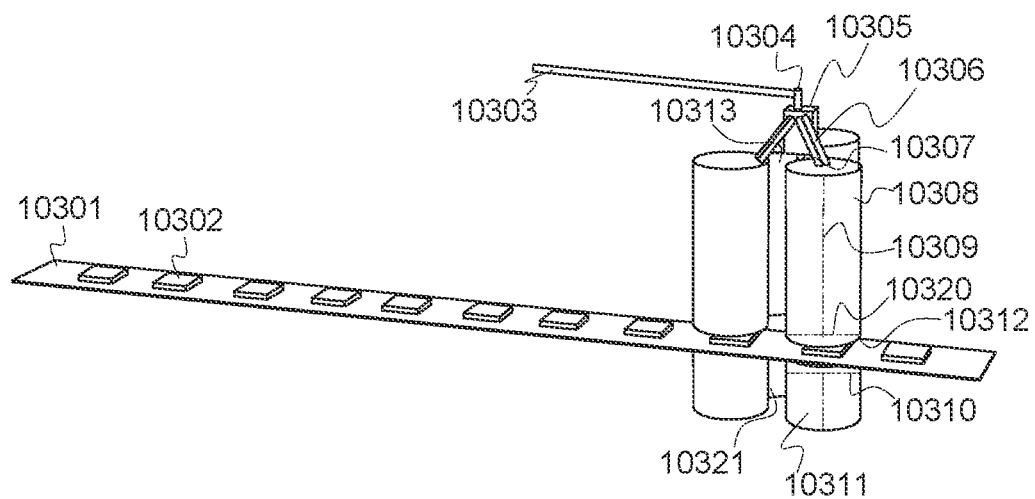
FIGS. 103A-103D shows a scent absorption system.

It may also be possible to use a similar approach to the one originally articulated above to make a "motion odor-picture", in which a reel of zeolite is exposed to air one "frame" at a time (one embodiment is shown in FIG. 103A). Again, one embodiment is using heat to release it. To get more odor, air could be compressed and the zeolite held under pressure.

Indeed, another approach to this is to not use zeolite at all, and to instead use air compression. CO2 cartridges hold 12 grams of CO2, amounting to around 6 liters uncompressed (at standard temperature and pressure). These small cartridges are cheap and abundant. Prior to compressing the air into the cartridge, the odors involved may be first concentrated, perhaps by using a zeolite-based odor concentration system that utilizes the greater adsorption capabilities of a larger mass of zeolite to quickly capture scents from a greater air volume, and releasing it, e.g. through thermal desorption, into a volume of air that is smaller than the original volume used to capture the odors. Indeed, this odor concentration technique could also be used to generate progressively higher and higher odor concentrations for subsequent capture in the same or a different mass of zeolite. Through successive steps of adsorption and desorption utilizing progressively smaller volumes of air and zeolite, it may be possible to achieve odor concentrations levels higher than would be achievable with a single step. In another aspect, zeolite may be desorbed in a lower air pressure environment than the environment in which the scent capture took place. Because there are less gas molecules in a partial vacuum, the ratio of scent molecules to gas molecules will be larger.

Another kind of motion odor-picture camera would continuously capture a "scent history" of a given experience, to be subsequently replayed. This could be used to train concepts of "today" and "tomorrow" by always constantly re-calibrating a button or semantic tile so that it always elicits the "smell" recorded yesterday in a given physical location, and (perhaps) even include the "smell" of tomorrow by using the weather forecast for the following morning (given that heat, humidity, and perhaps even air pressure affect how the world smells).

There are multiple methods that can be articulated for calibrating odor adsorption material, determining whether they're dog compatible (including ensuring that they do not themselves possess an objectionable odor, where objectionable may mean an odor that interferes with identification of the scent), ensuring that they are well-distributed within a filter membrane, and ensuring a sufficiently even distribution. It is likely that the adsorption filter membrane will need a mix of different zeolite types to capture the full range of dogs' advanced olfaction. Zeolite may need to be contained within a flexible cylindrical rope-like filament that can progressively expose and seal the adsorbent material over time, either through a flexible membrane that expands and contracts with an electrical charge, or, by using a membrane that expands and contracts with thermal contact, thereby allowing the same thermal influence that causes desorption to also cause the membrane to temporarily open and expose itself to the nitrogen scent provider. Another approach would be to have a series of mechanical capsules, each containing the adsorption material. This would likely be mechanically easier to design initially, but then lose the analog, continuous quality of a progressively expanding and contracting rope-like reel.

In order to maximize adsorption in a given moment, the motion odor-picture camera may use a rapidly passing flow of air over the zeolite, and concentrate the odor in the passing material. Another approach would be to rapidly bring air from the environment into a chamber around the adsorbent material, compress it, and then eject the air, bringing new air in in the process. This latter approach would likely necessitate capsules of adsorbent material, rather than a continuous "rope", as the air pressure might otherwise push axially in unwanted ways. One approach is to compress the air into the zeolite capsule, letting it cool, and then either keeping it at pressure or releasing the pressure once it's estimated that the needed odors have been adsorbed, thereby allowing the use of zeolites that cannot adsorb at a high enough rate at lower pressures. Through the use of coolant, the cooling that may be required to adsorb the odors (and prevent thermal desorption) could be accomplished more quickly, thereby eliminating the need for pressurized adsorbent capsules. Rapidly compressing a large volume of air into a capsule's worth of adsorbent material will lead to the creation of considerable heat, which would prevent odor fixing while the adsorbent material remains at a high temperature. Subsequent depressurization would lead to considerable cooling, but to be accomplished without loss of odor would require that the gas around the adsorbent material already be cool. For this an external coolant would be required. The energy consumption of such a system could be minimized by using the cooling associated with depressurization of an earlier volume of air to offset the heat generated by pressurization of the next one (much as elevators use counterweights).

In one embodiment, a peltier device may be utilized to provide both heating and cooling. Using the peltier, the air, zeolite, and/or other elements may be cooled; by reversing the polarity of the current, the element and/or elements may be heated. Indeed, if used in a system designed to collect scent from an object, for example a system such as the one shown in FIG. 7, one side of the peltier may be used to on the "object" side of the system to heat the object, and the cool side of the peltier used on the "zeolite" side of the system to cool the air for better adsorption.

"Playing back" the recorded "smell movie" would necessarily lead to a reduction in odor strength, as desorption caused the release of odors. Through the compression and cooling process articulated earlier it should be possible to significantly concentrate odor, enabling more than one playback opportunity. Note, as well, that the creation of the "smell movie" could, if large volumes of air were processed and their odors adsorbed, lead to a reduction of environmental smells. This can be compensated by modulating the volume processed based on the overall air volume of the space that is having its smells recorded.

By mounting such a system on a dog, a playback of his or her day could be re-created. In combination with a computer vision system, odor capture could be modulated so that more or less air volume was captured depending on the interestingness of the environment, analogous to a variable "bitrate". Particular events, e.g. the first exit from a car, approaching another dog, or the hug of a special individual, could trigger additional recording. A simpler approach would likely be to track the olfaction frequency of the dog him or herself—when the dog is smelling a lot, the odor capture device would process more air than when the dog had satisfied himself as to his or her smell environment. This could be accomplished by using a heart rate monitor to measure excitement, a breath monitor, an acoustic sensing of the sound of sniffs, a gyroscope for recording distinctive smelling head movements, among other approaches.

Accompanied by a video monitor, odor playback could be synchronized to smell playback, increasing a dog's engagement with video based training or entertainment. In addition, through human-curated or automated classification of events, the associated smells and images could be used as compelling training cues, richly identifying other dogs and people, places, events, and objects.

To minimize the amount of limited available odor, smell emission could be directed immediately into a dog's nose, at much lower concentrations that would be necessary were the emissions to be sent into the general environment. This could be accomplished with tubes, potentially very thin so that they aren't noticeable to the dog, or by directing a stream of air at the dog's nose through a device mounted on the dog, one on a stationary appliance, or one that's on a movable device that can track the dog's movements.

Indeed, tubes mounted on the dog for scent simulation would be ideally positioned for capturing the specific smells the dog is most interested in. Such a device would need to be designed so that it didn't interfere with the dog's own scent capture, perhaps timing its scent in order to accomplish this (e.g., either by pulling in air simultaneously or at opposite times that the dog does so).

Referring to FIGS. 103A-103D, a large number of smell "photos" (each a collection of one or more scent adsorbed) can be captured through use of a smell "film" 10301, consisting of a reel of smell "frames" 10302, each of which containing the appropriate mix of zeolites. Each frame can be quickly opened and exposed to the air on both sides. In a preferred embodiment, the frame is exposed through the application of a mechanical force to a side or border of the frame, such as on the peripheral element 10314. In another embodiment, each frame has on one side a valve-like opening, which will, at a set gas pressure level (either external or internal to the frame), open and put into communication the zeolite and the air. In a preferred embodiment, on the back side of the frame is a thermally conductive material, such as copper, as well as a potentially smaller valve that opens at a particular pressure. In a preferred embodiment, the frames consist of a pliable, rubber-like material, and are embedded into a pliable, rubber-like frame reel. The zeolite material in each frame is contained within material, such as a fine mesh 10317, that permits the easy flow of gases while preventing the escape of zeolite. In another embodiment, on the underside of the frame is a thermally conductive material or structure able to more quickly heat the zeolite and desorb the smells contained therein.

Figure 103B:
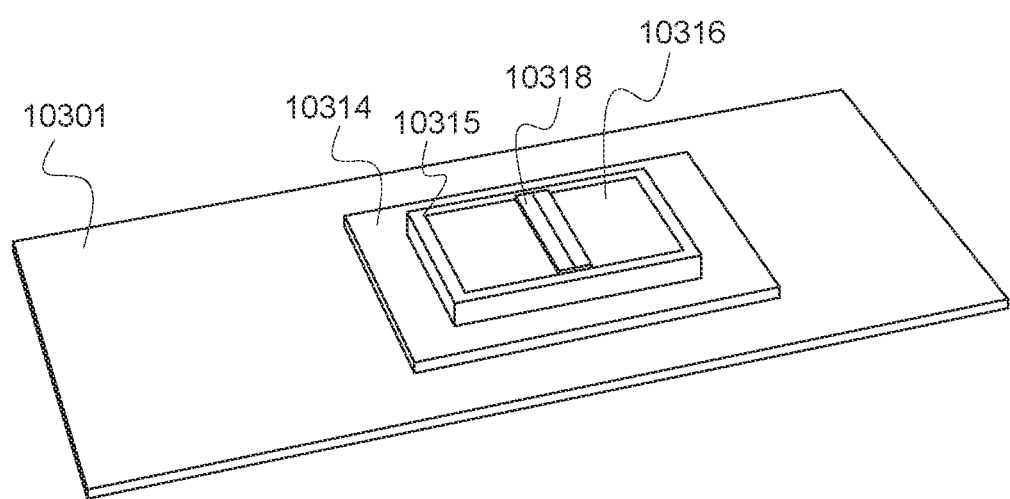
Figure 103C:
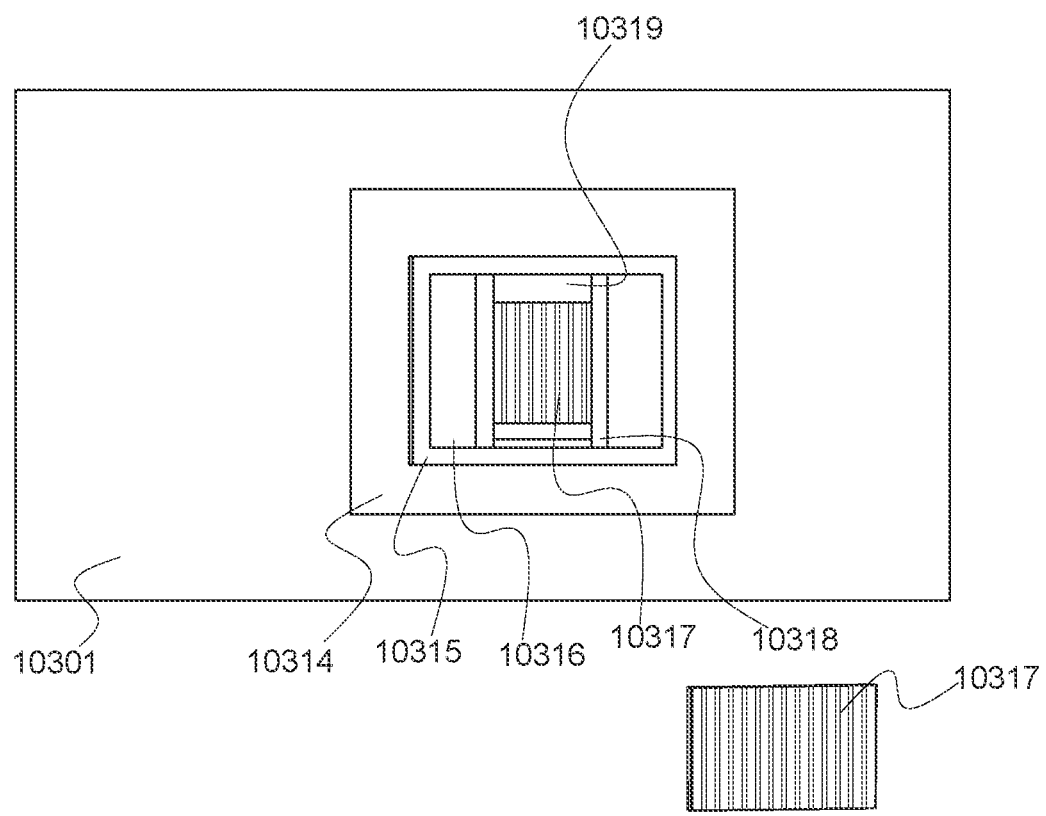

While heat can lead to zeolite desorption, increased air pressure can lead to increased adsorption, reducing the amount of time required to capture the odors from a given mass of air. In a preferred embodiment, zeolite is exposed to gas contained in a pressurizing cylinder, the pressure being caused by an air-pushing piston within the cylinder. By having the piston push the air through the frame while it is compressing the air, it is possible to expose more or all of the air to the zeolite, maximizing adsorption and ensuring that low concentration odors are not missed. To regulate the air pressure generated, the volume into which the air is being pushed, after having made contact with the zeolite, may have within it a "regulating piston" that recedes. In one embodiment, this piston may recede at a specified rate. In another embodiment, the piston may be held in place by a spring and recede as gas pressure increases. In another embodiment, the pressurizing cylinder 10308 can be opened and pressurized after having created a seal with a receiving cylinder 103011, by pressing on the potentially rubber area around an odor capturing frame (as shown in FIG. 103B) in which the compression of two faces 10318, and a frame cover 10316, prevents exposure of the zeolite to the air. To expose a single zeolite frame, the edge 10312 of two cylinders 10308, 10311 arranged in a line, presses against a space around the frame 10314 that when compressed causes the frame to open, as shown in FIG. 103C. In a preferred embodiment, the area around the frame 10314 is a rubber-like material, enabling an effective seal to be created when the pressurizing cylinder 10308 and the gas receiving cylinder 10311 push against each other at the edge 10312. In a preferred embodiment, the air volume within the connected cylinders is minimized by having two pistons 10320, 10310 in close proximity to, or in contact with, the frame. With the cylinder sealed, a piston connecting arm 10309 retracts, causing air with odors to be adsorbed to flow into the cylinder. In a preferred embodiment, the air will flow first into the receiving end of the cylinder through a one-way valve, thus causing it to pass through the zeolite into the pressurizing cylinder. In another embodiment, the air may first pass into the pressurizing cylinder, bypassing the zeolite. Subsequently, a piston 10320, which is now retracted and located at the far end of the cylinder, presses toward the frame, simultaneously compressing the air and pressing the air through the frame and through the zeolite matrix contained therein. The regulating piston on the other side of the frame may then retract and in doing so regulate the total air pressure reached, lowering the energy required to move the compressing piston 10320 and compress the air, and thereby decreasing the heat generated. With the piston extended and the cylinder under pressure, the entire apparatus can remain in this configuration for a period (the "exposure time"), while also allowing the temperature to decrease in order to prevent and reduce desorption.

In another embodiment, for certain adsorbed scents and other materials, in one embodiment, decreased air pressure may be utilized, whether in conjunction with heating or not, in order to release the scents or other materials. This is a particularly interesting embodiment in cases where the scent molecules are subject to pyrolysis or other alteration at increased temperatures.

By embedding the frames onto a rubber-like reel that is longer and wider than any given frame, closing and opening a cylinder around the frame can ensure a seal adequate for maintaining the desired pressure during adsorption.

Figure 103D:
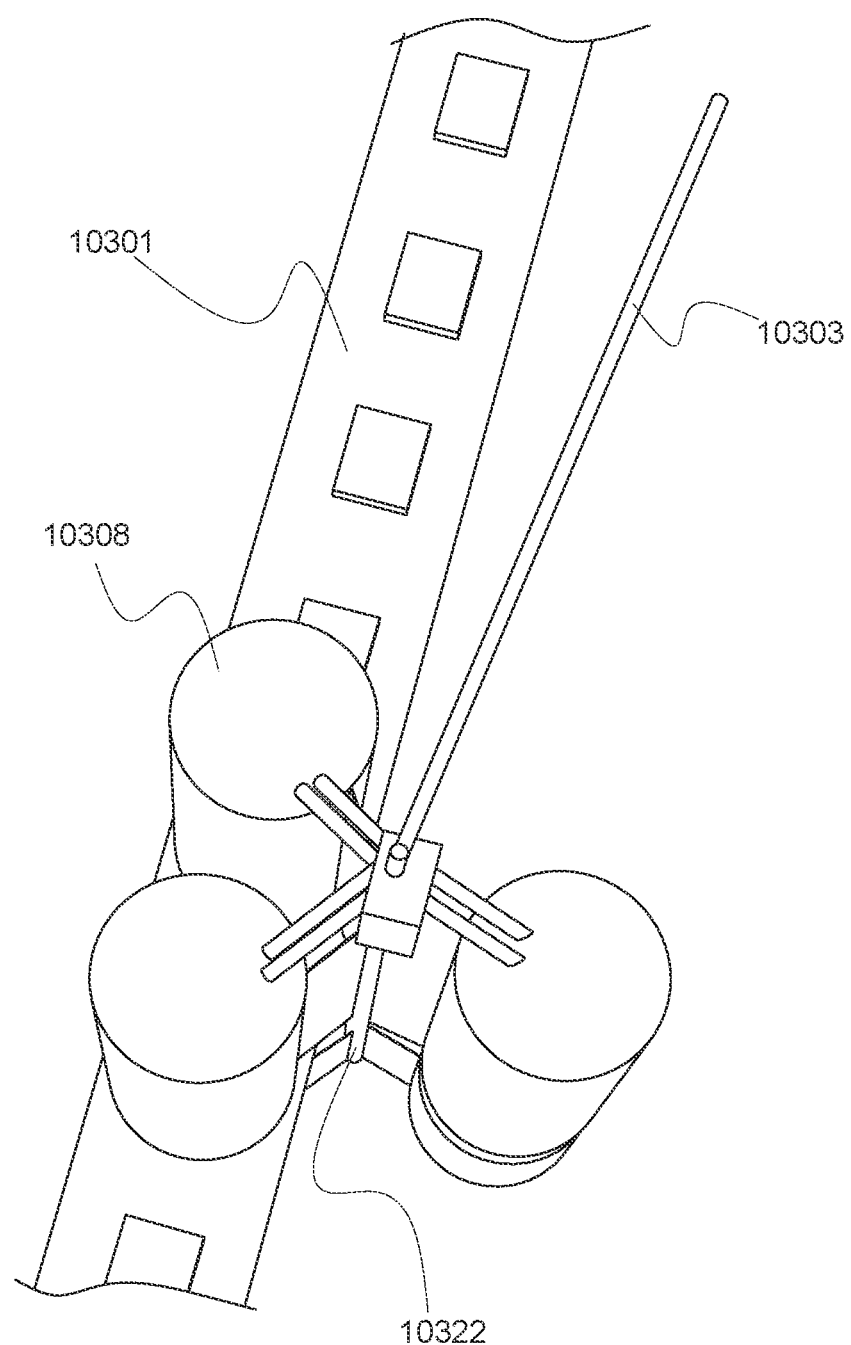

In a preferred embodiment, by having three such cylinder apparatuses, as depicted in FIGS. 103A and 103D, it is possible to continuously record odors from the environment onto a moving reel of frames while minimizing the compression energy required. In this case, the three cylinders are located parallel to each other, rotating about a common axis 10322, the points of their centers creating a triangle along the plane. The cylinders may all be contained within an enclosure (not shown) to thermally isolate the cylinders from the environment. The arms connecting each of the cylinders, e.g. 10321, to the axis can extend or contract, allowing the rotating apparatus to follow the straight reel line. The apparatus operates as follows:

An unexposed frame is positioned between the larger air holding volume of the compression cylinder (the cylinder 10308 depicted in FIG. 103A) and the air-receiving volume of the compression cylinder.

The cylinder top and bottom are pushed toward each other, forming an airtight seal using the cylinder edges (one of which is denoted by 10312) around the frame 10315. The frame, which has a pressure sensitive opening mechanism around it 10314 that opens while under pressure, opens and exposes the zeolite matrix to the air.

A piston positioned immediately above the frame rises in the cylinder, potentially actuated hydraulically (pipe indicated with 10307) pulling air containing odors to be adsorbed into the volume of the cylinder 10320 through an intake 10303, through a connector 10304, into a junction 10305, and through a connecting tube 10306, until it passes through a one-way intake valve (not shown). In doing so it may pull the air through the frame, providing a first exposure of the zeolite to the air.

The piston then pushes the air captured back through the opened frame into the bottom cylinder, causing a spring-loaded surface located there to retract, ensuring the flow of air through the frame while avoiding regulating the air pressure in the cylinder. The heat generated is removed while this is occurring using a cooling mechanism.

While at pressure, the reel 10301 advances one half of a frame, with the cylinder rotating about an axis 10322 to remain sealed on the reel, giving the zeolite time to adsorb any odors in the air while under pressure. Cooling continues to occur while this is taking place. While this is occurring, an identical top and bottom pair of cylinders are positioned above a new frame.

While at pressure, the reel and cylinder continue to move to the decompression stage. At this point the air inside the cylinder is compressed but has cooled.

While at the decompression stage, the piston retracts and the frame closes, sealing the odor-exposed zeolite in the frame. The mechanical energy to do so may be transferred to compress the cylinder that follows it, and the cooling that results can, for example through the use of a heat pipe, be used to offset the heat generated in the previous stage.

The piston descends in the joined cylinder, flushing the air from the volume through an outflow valve.

The cylinder can now be repositioned above the next available unexposed frame, and the process repeats.

Several exemplary embodiments are now explored. It is important to understand that these embodiments are examples of specific implementations of one or more aspects of the inventions, and do not in any way limit the use of additional or different embodiments, implementations, or aspects.

In one embodiment, a scent capture device may comprise a vessel 710 to hold an item 713, the item having at least one scent; a source of air 703; an air movement device comprised of one or more of a fan 402, the source of air being a compressed gas, or a gas compression apparatus 702; a first conduit 704, 709 for the air to travel from an intake to the vessel; a second conduit 711 for the air to travel out of the vessel; and a collector zeolite 712 placed between the vessel and the exhaust for the air.

In one embodiment, filtering zeolite 708 is placed between the entrance to the first conduit and the entrance to the vessel, preventing at least some scent from entering the vessel. A flow controller 706 may be present between the source of air and the vessel.

Another exemplary embodiment may be an ambient scent capture device, comprising a source of air; an air movement device comprised of one or more of a fan or a gas compression apparatus; a first conduit for the air to travel from an intake to a zeolite adsorption filter; wherein the air movement device moves air from the intake to the zeolite adsorption filter.

This embodiment may be further refined if the zeolite adsorption filter is enclosed within a vessel capable of holding greater than ambient air pressure. The air movement device may force air into the vessel at a pressure greater than ambient air pressure. In one aspect, pressure may be increased or otherwise managed by having an air exhaust to release air after it passes the zeolite adsorption filter where the air exhaust has a flow controller (where a fixed flow rate or adjustable) that releases air at a rate slow enough, relative to the air movement device pressure, so that the pressure in the vessel reaches a point above ambient air pressure.

In another aspect, the zeolite may be comprised of at least two pieces of zeolite separated by a barrier. The barrier may be a scent barrier, and may completely or partially separate portions of zeolite. In one aspect, the first conduit is movable in a manner that permits the air to pass through first one, then another of at least two of the at least two pieces of zeolite separated by a barrier. In another aspect the zeolite may be movable in a manner that permits the air to pass through first one, then another of at least two of the at least two pieces of zeolite separated by a barrier. These two approaches—movement of the zeolite and movement of the air source—may be combined as well. In one embodiment, the recording may take place on a zeolite that rotates, with recording taking place in a manner resembling a vinyl album, with a spiral recording shape.

In another aspect, the zeolite is incorporated into a flexible material that may be passed in front of the air source over time. The zeolite may be divided into frames with a barrier between frames. The zeolite may be stored within a substantially scent-proof enclosure. Indeed, each frame of the zeolite may be stored within a substantially scent-proof enclosure.

There are several use cases that may utilize additional embodiments.

In one use case, the smells of foods may be captured and presented to people to assist them in determining items such as menu selections. In such an embodiment, association of the scents with images or names of selections would be desirable. By creating a "scent menu", it is possible for those with simultaneous hearing and sight impairments to order food (or other scented) items. Such a system may be utilized to assist a dog in selecting a reward. In one implementation, the menu may be a board (which may be arranged in a manner similar to menus, similar to the dog boards described herein, arranged as a deck of separate tiles, or otherwise). In one aspect, the scent of foods as prepared are regularly captured so that the smells more closely resemble the smells of the current method of preparation. Scents provided the customers may vary so that they match the current kitchen crew.

The regions of the brain the process scents are adjacent to (and in some cases overlapping with) those regions responsible for memories and emotions. In patients with memory loss, nascent dementia, or simply a need to maximize recollection, it may be desirable to capture scents associated with life events to aid in later recall. If a contemporaneous capture is not possible, scents similar to those associated with the memories may be utilized. As a simple example, if a child spent summer camp after grade 3 in an area with a certain mix of flowers and scents, it is likely that (for human purposes, and potentially some animals) the mixture of scents present years or even decades later may be similar enough to those experienced previously as to trigger emotional response or memory recall. It is quite common for people who experienced hospitalizations as children to recoil—even as adults—at the scent of cleaners, alcohol, and other scents associated with hospitals.

In one aspect, the ability to evoke one or both of emotional and factual recall may be utilized in psychological treatment for conditions such as post-traumatic stress disorder. If a returning soldier suffered trauma, by bringing that trauma to the surface, a mental health professional may be able to better address the trauma. EMDR (Eye Movement Desensitization and Reprocessing) is a form of psychotherapy that brings images, self-thoughts, emotions and body sensations associated with trauma to the surface, essentially making the trauma more accessible and therefore more treatable. The biological relationship between scent processing and memory and emotions is such that it would provide strong assistance in trauma processing, whether in conjunction with EMDR or otherwise.

In another embodiment, smells may have diagnostic value in a medical setting. For example, the smell of sweat may be diagnostic. Trimethylaminuria is a disorder in which the body is unable to break down trimethylamine, a pungent chemical compound. Trimethylamine presents with a particular unpleasant scent. As this compound builds up in the body, it may be expressed in sweat (or breath and urine). Because the intensity of the odor varies with time, it may be difficult to diagnose as the physician examining a patient may not be able to smell it. The use of a scent capture system while the scent is at a peak may allow the scent to be "played back" for a physician's analysis. It may also allow scent to be concentrated so that spectrographic or gas chromatography analysis is possible. Similar uses exist for identification of ketoacidosis (associated with poorly controlled diabetes), detection of bladder infections via concentration of urine scent, detection of vaginosis, detection of the genetic disorder 3-Methylcrotonylglycinuria ("3MCC"), or certain bacterial infections, among other things. The concentration of smells by a patient and later playback by a physician would enable a new range of remote diagnostic work. People who are in physically isolated situations, or who simply cannot get to a physician due to cost, distance, or disability, would be able to have the same kind of scent analysis done as those who are located in a doctor's office. To the extent that dogs (or other animals) are capable of diagnosing medical or other issues via scent, scent capture may be utilized to bring the scent to the dog.

Additional Innovations Permitted by the Connected Button Design

Button should be trigger-able remotely
        In one embodiment, the button can be triggered from another location, in order to assist the user to communicate with the dog in sounds that the dog understands.
        To those proficient in a language, words sound distinct. In reality, words are not clearly distinguished from each other with audible gaps—in a sentence, words flow together acoustically, requiring comprehension to distinguish. Thus, in another embodiment, the buttons can be connected electronically, either through wires or wirelessly, to a speech recognition system (e.g. a Google Home or Amazon Echo device). In another embodiment, the buttons themselves may recognize speech and/or recognize one or more trigger words. The speech recognition system can then recognize the words said, and cause the button corresponding to the word recognized to emit a light, sound, scent or other cue, helping the dog recognize words despite their proximity to one another.
        In another embodiment, the sound emitted by the button can be the voice of a trainer, perhaps one known to the dog, and thus better able to capture the dog's attention.
        transmission of sound from button to a virtual board that exists on the phone
    word games using buttons
        system makes sound of animal, dog must press button corresponding to animal
            i. guardian rewards with excitement and confirmation
            ii. screen shows video of guardian being excited
            iii. device can provide food reward
        system shows color on screen, dog presses button that makes color
        big vs little
        yes vs no
            i. train dog to nod, shake head
        earn names of food/smells
            i. chicken
            ii. beef
            iii. pork
            iv. fish
            v. cheese
            vi. peanut butter
        go to part-of-house
            i. record videos of guardian saying "go to the . . . . X!"
            ii. video camera detects whether dog went to X
        toys game
            i. toys are in a bin
            ii. announces which toy should go into the bin
            iii. reward sound when toy goes into the bin
            iv. bin announces which toy just went into it
            v. toys announce their name when they're played with
        tiles can be distributed around house
            i. context sensitive
            ii. food words in kitchen, e.g.
        Memory games
            i. dog describes which objects it saw or is seeing in other room As used herein, the term "animal condition" or "animal's condition" is broadly defined to include any behavior, movement, postural position, change in postural position, or any physiological or physical characteristics or change in physiological or physical characteristics of an animal.

Animal condition may reflect the state of the animal with respect to its physical characteristics, for example the animal's location (or the location or change in location of a particular part or parts of the animal) with respect to a defined space, the animal's orientation (or the orientation or change in orientation of a particular part or parts of the animal) in that space, likewise its position or its orientation (or the position or orientation or change in position or orientation of a particular part or parts of the animal) relative to a specific object, for example, pressing a button (with a paw or nose), pressing a lever, touching a touchpad, licking a lickometer, rolling a wheel or ball, flipping a switch.

Animal condition may refer to the posture or change in posture of the animal, including movement of the whole or part or parts of the animal. Some examples include: sitting, standing, walking, running (including different types of gaits), turning, laying down, laying on stomach, lying on side, lying on back, standing on two legs, standing on four legs, holding one paw up, pressing a button, touching a touchpad, moving a lever, holding tail up, holding tail down, wagging tail. Animal condition also includes facial postures or changes in facial posture, including the position and movement of the mouth, lips, tongue, ears, eyes, eyelids, eyebrows, cheeks, nose, or whiskers.

Animal condition may also refer to physiological characteristics or changes in physiological characteristics such as level of satiation or hunger, level of thirst, the need to urinate or defecate, temperature, rate of breathing, level of certain compounds in the bloodstream, lymph, ocular fluids (tears), or cerebrospinal fluid, the physiological activity of the nervous system or a part or parts of the nervous system. Animal condition may also refer broadly to the physiological characteristics of the animal with respect to health or sickness.

Animal condition may also include inferred affective characteristics, for example: level of arousal or excitement, level of interest, boredom, happiness, sadness, frustration, anger, level of motivation, humor, jealousy, shame, guilt.

Animal condition may also be a combination of one or more of the above mentioned types of characteristics, and may be describable by a commonly recognized behavior such as: wagging its tail, turning, moving in a particular direction by, for example, running or walking or rolling or sliding, chasing its tail. The behaviors may be vocalizations or audible behaviors, for example: barking, singing, whining, crying, growling, purring, sniffing, breathing, coughing, sneezing. The behaviors may be finer movements, for example, chewing, biting, licking, sniffing, turning head, tilting head. The behaviors might be linked in some way to the animal's physiology, for example: urinating, defecating, shedding fur or hair, scratching, scraping, rubbing, or grooming.

The animal's condition may refer to something that is sensed directly by sensors, deduced by combinations of information from one or more sensors, or it may be inferred via information from zero or more sensors using indirect methods. For example, if it was known that the animal had last eaten at a particular time, say 8 AM, then it might be inferred that the animal would be less satiated at 4 PM than it was at 9 AM.

Finally, the animal's condition may refer to measurements of an animal's brain state, or a particular brain activity pattern, as detected, inferred, or measured by a device either outside or inside the animal's cranium. This may be done using EEG, EMG, MEG, MRI, ultrasound, ECoG, intracellular implanted electrodes, extracellular implanted electrodes, electrode arrays, implanted electrode arrays connected to a chip, optical detection of brain activity, automated analysis of microexpressions, optical detection of brain activity illuminated by genetically modified neurons, among others.

What is claimed is:

1. A language expression method, comprising:
   locating one or more sound-producing buttons on a hexagonal board proximal to a referent such that a trained learner may use the one or more sound-producing buttons; and
   connecting the hexagonal board with one or more other hexagonal boards, wherein the one or more other hexagonal boards are added along semantic vectors.

2. The language expression method of claim 1, wherein at least one of the hexagonal board and the other hexagonal boards comprise between one and seven sound-producing buttons.

3. The language expression method of claim 1, further comprising infusing a scent in each sound-producing button to aid in the training.

4. The language expression method of claim 1, further comprising placing an object to which the learner ascribes a meaning in the one or more sound-producing buttons to aid in the training.

5. The language expression method of claim 1, further comprising emission of a sound outside of the range of human hearing from at least one of the one or more sound-producing buttons.

6. The language expression method of claim 1, wherein at least one of the buttons is located on a vertical or sloped surface.

7. A language training method, comprising:
   locating two or more sound-producing buttons proximal to a referent;
   training a learner to use the two or more sound-producing buttons; and
   arranging the two or more sound-producing buttons along semantic vectors.

8. The language training method of claim 7, wherein at least one of the buttons is located on a polygonal board.

9. The language training method of claim 7, further comprising infusing a scent in each sound-producing button to aid in the training.

10. The language training device of claim 7, further comprising placing an object to which the learner ascribes a meaning in the one or more sound-producing buttons to aid in the training.

11. The language training method of claim 7, further comprising emission of a sound outside of the range of human hearing from at least one of the one or more sound-producing buttons.

12. The language training method of claim 7, wherein at least one of the buttons is located on a vertical or sloped surface.

13. A language training device, comprising:
   a plurality of polygonal boards placed on a horizontal, a vertical or a sloped surface, each polygonal board comprising a face;
   one or more semantic buttons, each semantic button connected to the face; wherein:
   (i) a corner of each polygonal board is without a semantic button so as to provide a cue as to the board's orientation; (ii) the plurality of polygonal boards are arranged to facilitate the learning of words and word categories; and (iii) the plurality of polygonal boards further comprise an olfactory cue to help a learner identify a category of words located on the board.

14. The language training device of claim 13, wherein the surface is vertical.

15. The language training device of claim 13, wherein the surface is sloped.

16. The language training device of claim 13, wherein the polygonal shape is rectangular.

17. The language training device of claim 13, wherein the polygonal shape is triangular.

18. The language training device of claim 13, wherein the polygonal shape is hexagonal.

19. A language training device, comprising:
   a plurality of polygonal boards placed on a horizontal, a vertical or a sloped surface, each polygonal board comprising a face;
   one or more semantic buttons, each semantic button connected to the face; wherein:
   (i) a corner of each polygonal board is without a semantic button so as to provide a cue as to the board's orientation; (ii) the plurality of polygonal boards are arranged to facilitate the learning of words and word categories; and (iii) new polygonal boards are added to the device along semantic vectors.

20. The language training device of claim 19, wherein the surface is vertical.

21. The language training device of claim 19, wherein the surface is sloped.

22. The language training device of claim 19, wherein the polygonal shape is rectangular.

23. The language training device of claim 19, wherein the polygonal shape is triangular.

24. The language training device of claim 1, wherein the polygonal shape is hexagonal.

* * * * *